US011751234B2

(12) United States Patent
Ibrahim et al.

(10) Patent No.: US 11,751,234 B2
(45) Date of Patent: Sep. 5, 2023

(54) TECHNIQUES FOR COMMUNICATING OVER ASYNCHRONOUS SLOTS

(71) Applicant: QUALCOMM Incorporated, San Diego, CA (US)

(72) Inventors: Abdelrahman Mohamed Ahmed Mohamed Ibrahim, San Diego, CA (US); Muhammad Sayed Khairy Abdelghaffar, San Jose, CA (US); Ahmed Attia Abotabl, San Diego, CA (US); Huilin Xu, Temecula, CA (US); Wanshi Chen, San Diego, CA (US); Krishna Kiran Mukkavilli, San Diego, CA (US); Jing Sun, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 186 days.

(21) Appl. No.: 17/335,896

(22) Filed: Jun. 1, 2021

(65) Prior Publication Data
US 2022/0386310 A1    Dec. 1, 2022

(51) Int. Cl.
*H04W 72/541* (2023.01)
*H04L 5/14* (2006.01)
(Continued)

(52) U.S. Cl.
CPC .............. *H04W 72/541* (2023.01); *H04L 5/14* (2013.01); *H04W 56/001* (2013.01);
(Continued)

(58) Field of Classification Search
CPC .............. H04W 72/541; H04W 56/001; H04W 72/0446; H04W 72/046; H04W 72/27; H04L 5/14
See application file for complete search history.

(56) References Cited

U.S. PATENT DOCUMENTS

2012/0129560 A1    5/2012  Lunden et al.
2019/0364449 A1*  11/2019  Yang ............... H04W 72/04
(Continued)

FOREIGN PATENT DOCUMENTS

WO    WO-2017074083 A1    5/2017
WO    WO-2019213914 A1    11/2019
(Continued)

OTHER PUBLICATIONS

Partial International Search Report—PCT/US2022/031826—ISA/EPO—dated Sep. 9, 2022.
(Continued)

*Primary Examiner* — Chae S Lee
(74) *Attorney, Agent, or Firm* — Holland & Hart LLP

(57) ABSTRACT

Methods, systems, and devices for wireless communications are described. A first base station may communicate during asynchronous slots in accordance with a set of communication parameters determined from a handshake procedure performed with a second base station. For example, based on a change to a slot type of a slot to an asynchronous slot, the first base station and the second base station may perform the handshake procedure to determine the set of communication parameters and may communicate one or more messages during the slot in accordance with the set of communication parameters. Additionally, or alternatively, a user equipment (UE) may transmit a sounding reference signal (SRS) associated with a transmission configuration indicator (TCI) state based on a slot type of a first slot in which the UE transmits the SRS and a reference signal received in a second slot having the slot type.

30 Claims, 23 Drawing Sheets

(51) Int. Cl.
  *H04W 56/00* (2009.01)
  *H04W 72/0446* (2023.01)
  *H04W 72/044* (2023.01)
  *H04W 72/27* (2023.01)

(52) U.S. Cl.
  CPC ..... *H04W 72/046* (2013.01); *H04W 72/0446* (2013.01); *H04W 72/27* (2023.01)

(56) References Cited

U.S. PATENT DOCUMENTS

| | | | |
|---|---|---|---|
| 2020/0068549 A1* | 2/2020 | Kang | .................... H04W 16/28 |
| 2021/0136802 A1 | 5/2021 | Cirik et al. | |
| 2021/0168619 A1* | 6/2021 | Park | ...................... H04W 24/08 |

FOREIGN PATENT DOCUMENTS

| | | |
|---|---|---|
| WO | WO-2020222556 A1 | 11/2020 |
| WO | WO-2021076413 A1 | 4/2021 |

OTHER PUBLICATIONS

International Search Report and Written Opinion—PCT/US2022/031826—ISA/EPO—dated Nov. 28, 2022.
NEC: "Remaining Issues on Non-Codebook Based UL Transmission", 3GPP TSG RAN WG1 Meeting #93, R1-1806672, 3rd Generation Partnership Project, Mobile Competence Centre, 650, Route Des Lucioles, F-06921 Sophia-Antipolis, vol. RAN WG1, No. Busan, Korea, May 21, 2018-May 25, 2018, May 20, 2018, 3 Pages, XP051441874.

* cited by examiner

TECHNIQUES FOR COMMUNICATING OVER ASYNCHRONOUS SLOTS

FIELD OF TECHNOLOGY

The following relates to wireless communications, including techniques for communicating over asynchronous slots.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support techniques for communicating over asynchronous slots. Generally, the described techniques provide for determining and managing changes to slot pattern configurations based on performing a handshake procedure to determine communication parameters for communicating over asynchronous slots and based on implementing slot type dependent transmission configuration indicator (TCI) state reporting. For example, a communication device (e.g., a base station, a user equipment (UE)) may communicate according to a slot pattern (e.g., a time division duplexing (TDD) slot pattern) in which slots are scheduled as downlink slots, uplink slots, or flexible slots (e.g., that may be scheduled as downlink slots or uplink slots). In some examples, the communication device may support dynamic slot patterns in which respective slot types of one or more slots may be changed (e.g., from a downlink slot to an uplink slot, an uplink slot to a downlink slot, etc.). In some cases, a slot having a changed slot type so that the slot is of a different type than another slot during a same duration (e.g., the slot corresponding to a slot for a first base station and the other slot corresponding to a slot for a second base station) may be referred to as asynchronous slots and a slot having an unchanged slot type so that the slot is of a same type as another slot during a same duration may be referred to as synchronous slots.

A first base station may perform a handshake procedure with a second base station to determine various parameters for communicating over asynchronous slots. For example, the first base station may determine to communicate over a slot, for example, by changing a slot type of a given slot (e.g., changing a slot type of one slot for one base station) of a slot pattern configuration associated with (e.g., shared by) the first base station and the second base station. Based on the change to the slot type, one or more beams at the first base station may be set to interfere with one or more beams at the second base station during the asynchronous slot. The first base station may inform the second base station of the change in the slot type (e.g., by transmitting a message indicating the change to the second base station) and may perform the handshake procedure with the second base station to determine a set of communication parameters for communicating during the slot such that the interference may be reduced or eliminated. For example, based on the handshake procedure, one or both of the first base station and the second base station may restrict communications using one or more beam pairs during the slot, adjust a transmission power of one or more beams during the slot, restrict the scheduling of one or more uplink messages during the slot, restrict the use of one or more combining matrices during the slot, restrict the use of one or more precoding matrices during the slot, or change the slot back to a synchronous slot, or a combination thereof.

Additionally, or alternatively, a UE may be configured to report TCI states based on whether the TCI state is reported in a synchronous slot or an asynchronous slot. For example, a base station may transmit a configuration message to a UE that indicates a first TCI state associated with a first slot type and a second TCI state associated with a second slot type, where the first slot type may correspond to an asynchronous slot and the second slot type may correspond to a synchronous slot (or vice versa). If the UE reports a TCI state in a first slot having the first slot type, the UE may transmit, in the first slot, a sounding reference signal (SRS) associated with the first TCI state based on a reference signal received in a second slot having the first slot type. Alternatively, if the UE reports a TCI state in a first slot having the second slot type, the UE may transmit, in the first slot, an SRS associated with the second TCI based on a reference signal received in a second slot having the second slot type. In this way, the UE may be configured to report slot type dependent TCI states.

A method for wireless communication at a first base station is described. The method may include determining a change to a slot type of a slot of a slot pattern configuration associated with the first base station and a second base station, where a first beam at the first base station is set to interfere with a second beam at the second base station during the slot based on the change to the slot type of the slot, performing, based on determining the change to the slot type of the slot, a handshake procedure with the second base station to determine a set of communication parameters for communicating during the slot in accordance with the changed slot type, and communicating one or more messages during the slot in accordance with the set of communication parameters based on the handshake procedure, the slot including an asynchronous slot.

An apparatus for wireless communication at a first base station is described. The apparatus may include a processor, memory coupled with the processor, and instructions stored in the memory. The instructions may be executable by the processor to cause the apparatus to determine a change to a slot type of a slot of a slot pattern configuration associated with the first base station and a second base station, where a first beam at the first base station is set to interfere with a second beam at the second base station during the slot based on the change to the slot type of the slot, perform, based on determining the change to the slot type of the slot, a handshake procedure with the second base station to determine a set of communication parameters for communicating during the slot in accordance with the changed slot type, and communicate one or more messages during the slot in accordance with the set of communication parameters based on the handshake procedure, the slot including an asynchronous slot.

Another apparatus for wireless communication at a first base station is described. The apparatus may include means for determining a change to a slot type of a slot of a slot pattern configuration associated with the first base station and a second base station, where a first beam at the first base station is set to interfere with a second beam at the second base station during the slot based on the change to the slot type of the slot, means for performing, based on determining the change to the slot type of the slot, a handshake procedure with the second base station to determine a set of communication parameters for communicating during the slot in accordance with the changed slot type, and means for communicating one or more messages during the slot in accordance with the set of communication parameters based on the handshake procedure, the slot including an asynchronous slot.

A non-transitory computer-readable medium storing code for wireless communication at a first base station is described. The code may include instructions executable by a processor to determine a change to a slot type of a slot of a slot pattern configuration associated with the first base station and a second base station, where a first beam at the first base station is set to interfere with a second beam at the second base station during the slot based on the change to the slot type of the slot, perform, based on determining the change to the slot type of the slot, a handshake procedure with the second base station to determine a set of communication parameters for communicating during the slot in accordance with the changed slot type, and communicate one or more messages during the slot in accordance with the set of communication parameters based on the handshake procedure, the slot including an asynchronous slot.

Some examples of the method, apparatuses, and non-transitory computer-readable medium described herein may further include operations, features, means, or instructions for transmitting, to the second base station, a message indicating the change to the slot type of the slot, where performing the handshake procedure may be based on transmitting the message.

Some examples of the method, apparatuses, and non-transitory computer-readable medium described herein may further include operations, features, means, or instructions for determining that an interference between a first set of beams at the first base station and a second set of beams at the second base station satisfies a threshold interference, the first set of beams including the first beam and the second set of beams including the second beam, where the message further indicates spatial information for at least some of the second set of beams.

In some examples of the method, apparatuses, and non-transitory computer-readable medium described herein, the message includes a set of beam identifiers each corresponding to a beam of the second set of beams.

In some examples of the method, apparatuses, and non-transitory computer-readable medium described herein, the message includes a remote interference management (RIM) reference signal.

In some examples of the method, apparatuses, and non-transitory computer-readable medium described herein, the change to the slot type of the slot includes a change from a synchronous slot of the slot pattern configuration to the asynchronous slot.

Some examples of the method, apparatuses, and non-transitory computer-readable medium described herein may further include operations, features, means, or instructions for changing a slot type of one or more slots of the slot pattern configuration to a full-duplex mode and receiving, from the second base station, one or more synchronization signal block (SSB) messages during the one or more slots based on changing the slot type of the one or more slots to the full-duplex mode, where performing the handshake procedure may include operations, features, means, or instructions for selecting, based on the one or more SSB messages, one or more beam pairs associated with the first base station and the second base station for communicating during the slot.

In some examples of the method, apparatuses, and non-transitory computer-readable medium described herein, receiving the one or more SSB messages may include operations, features, means, or instructions for receiving the one or more SSB messages using a set of beams at the first base station including the first beam, where one or more receive beams of the selected one or more beam pairs correspond to one or more beams of the set of beams.

In some examples of the method, apparatuses, and non-transitory computer-readable medium described herein, the set of communication parameters includes a restriction associated with using one or more beam pairs during the slot, a transmission power of the second beam during the slot, a restriction associated with scheduling one or more uplink messages during the slot, a restriction associated with using one or more combining matrices during the slot, or an indication to change the slot type of the slot back to an original slot type of the slot, or any combination thereof.

Some examples of the method, apparatuses, and non-transitory computer-readable medium described herein may further include operations, features, means, or instructions for adjusting a coverage zone associated with the first beam during the slot based on the handshake procedure and an interference between the first beam and the second beam satisfying a threshold interference.

In some examples of the method, apparatuses, and non-transitory computer-readable medium described herein, performing the handshake procedure with the second base station may include operations, features, means, or instructions for initiating the handshake procedure in accordance with a periodicity associated with the handshake procedure to determine one or more beam pairs associated with the first base station and the second base station for communicating during asynchronous slots of the slot pattern configuration.

In some examples of the method, apparatuses, and non-transitory computer-readable medium described herein, the handshake procedure may be performed over a backhaul link between the first base station and the second base station.

A method for wireless communication at a first base station is described. The method may include receiving, from a second base station, a message indicating a change at the second base station to a slot type of a slot of a slot pattern configuration associated with the first base station and the second base station, where a first beam at the first base station is set to interfere with a second beam at the second base station during the slot based on the change to the slot type of the slot, performing, based on receiving the message indicating the change to the slot type of the slot, a handshake procedure with the second base station to determine a set of communication parameters for communicating during the slot in accordance with the changed slot type, and communicating one or more messages during the slot in accordance with the set of communication parameters based on the handshake procedure, the slot including an asynchronous slot.

An apparatus for wireless communication at a first base station is described. The apparatus may include a processor, memory coupled with the processor, and instructions stored in the memory. The instructions may be executable by the processor to cause the apparatus to receive, from a second base station, a message indicating a change at the second base station to a slot type of a slot of a slot pattern configuration associated with the first base station and the second base station, where a first beam at the first base station is set to interfere with a second beam at the second base station during the slot based on the change to the slot type of the slot, perform, based on receiving the message indicating the change to the slot type of the slot, a handshake procedure with the second base station to determine a set of communication parameters for communicating during the slot in accordance with the changed slot type, and communicate one or more messages during the slot in accordance with the set of communication parameters based on the handshake procedure, the slot including an asynchronous slot.

Another apparatus for wireless communication at a first base station is described. The apparatus may include means for receiving, from a second base station, a message indicating a change at the second base station to a slot type of a slot of a slot pattern configuration associated with the first base station and the second base station, where a first beam at the first base station is set to interfere with a second beam at the second base station during the slot based on the change to the slot type of the slot, means for performing, based on receiving the message indicating the change to the slot type of the slot, a handshake procedure with the second base station to determine a set of communication parameters for communicating during the slot in accordance with the changed slot type, and means for communicating one or more messages during the slot in accordance with the set of communication parameters based on the handshake procedure, the slot including an asynchronous slot.

A non-transitory computer-readable medium storing code for wireless communication at a first base station is described. The code may include instructions executable by a processor to receive, from a second base station, a message indicating a change at the second base station to a slot type of a slot of a slot pattern configuration associated with the first base station and the second base station, where a first beam at the first base station is set to interfere with a second beam at the second base station during the slot based on the change to the slot type of the slot, perform, based on receiving the message indicating the change to the slot type of the slot, a handshake procedure with the second base station to determine a set of communication parameters for communicating during the slot in accordance with the changed slot type, and communicate one or more messages during the slot in accordance with the set of communication parameters based on the handshake procedure, the slot including an asynchronous slot.

Some examples of the method, apparatuses, and non-transitory computer-readable medium described herein may further include operations, features, means, or instructions for transmitting, using a set of beams at the first base station including the first beam, one or more SSB messages during one or more slots, where performing the handshake procedure may include operations, features, means, or instructions for selecting, based on the one or more SSB messages, one or more beam pairs associated with the first base station and the second base station for communicating during the slot.

In some examples of the method, apparatuses, and non-transitory computer-readable medium described herein, the message further indicates a first set of beams at the first base station including the first beam based on an interference between the first set of beams and a second set of beams at the second base station satisfying a threshold interference, the second set of beams including the second beam.

In some examples of the method, apparatuses, and non-transitory computer-readable medium described herein, the message includes a set of beam identifiers each corresponding to a beam of the first set of beams.

In some examples of the method, apparatuses, and non-transitory computer-readable medium described herein, the set of communication parameters includes a restriction associated with using one or more beam pairs during the slot, a transmission power of the first beam during the slot, a restriction associated with scheduling one or more downlink messages during the slot, a restriction associated with using one or more precoding matrices during the slot, or an indication to change the slot type of the slot back to an original slot type of the slot, or any combination thereof.

Some examples of the method, apparatuses, and non-transitory computer-readable medium described herein may further include operations, features, means, or instructions for adjusting a coverage zone associated with the first beam during the slot based on the handshake procedure and an interference between the first beam and the second beam satisfying a threshold interference.

In some examples of the method, apparatuses, and non-transitory computer-readable medium described herein, the message includes a RIM signal.

A method for wireless communication at a UE is described. The method may include receiving, from a base station, a configuration message indicating a first TCI state associated with a first slot type and a second TCI state associated with a second slot type, receiving, from the base station, a reference signal in a first slot associated with the first slot type, and transmitting an SRS associated with the first TCI state in a second slot associated with the first slot type based on the reference signal and the second slot being associated with the first slot type.

An apparatus for wireless communication at a UE is described. The apparatus may include a processor, memory coupled with the processor, and instructions stored in the memory. The instructions may be executable by the processor to cause the apparatus to receive, from a base station, a configuration message indicating a first TCI state associated with a first slot type and a second TCI state associated with a second slot type, receive, from the base station, a reference signal in a first slot associated with the first slot type, and transmit an SRS associated with the first TCI state in a second slot associated with the first slot type based on the reference signal and the second slot being associated with the first slot type.

Another apparatus for wireless communication at a UE is described. The apparatus may include means for receiving, from a base station, a configuration message indicating a first TCI state associated with a first slot type and a second TCI state associated with a second slot type, means for receiving, from the base station, a reference signal in a first slot associated with the first slot type, and means for transmitting an SRS associated with the first TCI state in a second slot associated with the first slot type based on the reference signal and the second slot being associated with the first slot type.

A non-transitory computer-readable medium storing code for wireless communication at a UE is described. The code may include instructions executable by a processor to receive, from a base station, a configuration message indicating a first TCI state associated with a first slot type and a second TCI state associated with a second slot type, receive, from the base station, a reference signal in a first slot associated with the first slot type, and transmit an SRS associated with the first TCI state in a second slot associated with the first slot type based on the reference signal and the second slot being associated with the first slot type.

In some examples of the method, apparatuses, and non-transitory computer-readable medium described herein, the configuration message further indicates a first set of SRS resources associated with the first slot type and a second set of SRS resources associated with the second slot type and transmitting the SRS includes transmitting the SRS using the first set of SRS resources based on the second slot being associated with the first slot type.

Some examples of the method, apparatuses, and non-transitory computer-readable medium described herein may further include operations, features, means, or instructions for dropping the second set of SRS resources based on the second slot being associated with the first slot type.

In some examples of the method, apparatuses, and non-transitory computer-readable medium described herein, the first set of SRS resources overlaps with the second set of SRS resources in a time domain.

Some examples of the method, apparatuses, and non-transitory computer-readable medium described herein may further include operations, features, means, or instructions for receiving, from the base station, a second reference signal in a third slot associated with the second slot type and transmitting a second SRS associated with the second TCI state in a fourth slot associated with the second slot type based on the second reference signal and the fourth slot being associated with the second slot type.

In some examples of the method, apparatuses, and non-transitory computer-readable medium described herein, transmitting the second SRS may include operations, features, means, or instructions for transmitting the second SRS in the fourth slot using a first resource associated with a same time-frequency location within a slot as a second resource used to transmit the SRS in the second slot.

Some examples of the method, apparatuses, and non-transitory computer-readable medium described herein may further include operations, features, means, or instructions for receiving, from the base station, a control message indicating that the first slot may be associated with the first slot type and the second slot may be associated with the second slot type.

Some examples of the method, apparatuses, and non-transitory computer-readable medium described herein may further include operations, features, means, or instructions for selecting, based on the second slot being associated with the first slot type, the reference signal from a set of reference signals received from the base station to determine the first TCI state.

In some examples of the method, apparatuses, and non-transitory computer-readable medium described herein, the first slot type corresponds to a synchronous slot of a TDD slot pattern configuration and the second slot type corresponds to an asynchronous slot of the TDD slot pattern configuration.

In some examples of the method, apparatuses, and non-transitory computer-readable medium described herein, the first slot type corresponds to an asynchronous slot of a TDD slot pattern configuration and the second slot type corresponds to a synchronous slot of the TDD slot pattern configuration A method for wireless communication at a base station is described. The method may include transmitting, to a UE, a configuration message indicating a first TCI state associated with a first slot type and a second TCI state associated with a second slot type, transmitting, to the UE, a reference signal in a first slot associated with the first slot type, and receiving, from the UE, an SRS associated with the first TCI state in a second slot associated with the first slot type based on the reference signal and the second slot being associated with the first slot type.

An apparatus for wireless communication at a base station is described. The apparatus may include a processor, memory coupled with the processor, and instructions stored in the memory. The instructions may be executable by the processor to cause the apparatus to transmit, to a UE, a configuration message indicating a first TCI state associated with a first slot type and a second TCI state associated with a second slot type, transmit, to the UE, a reference signal in a first slot associated with the first slot type, and receive, from the UE, an SRS associated with the first TCI state in a second slot associated with the first slot type based on the reference signal and the second slot being associated with the first slot type.

Another apparatus for wireless communication at a base station is described. The apparatus may include means for transmitting, to a UE, a configuration message indicating a first TCI state associated with a first slot type and a second TCI state associated with a second slot type, means for transmitting, to the UE, a reference signal in a first slot associated with the first slot type, and means for receiving, from the UE, an SRS associated with the first TCI state in a second slot associated with the first slot type based on the reference signal and the second slot being associated with the first slot type.

A non-transitory computer-readable medium storing code for wireless communication at a base station is described. The code may include instructions executable by a processor to transmit, to a UE, a configuration message indicating a first TCI state associated with a first slot type and a second TCI state associated with a second slot type, transmit, to the UE, a reference signal in a first slot associated with the first slot type, and receive, from the UE, an SRS associated with the first TCI state in a second slot associated with the first slot type based on the reference signal and the second slot being associated with the first slot type.

In some examples of the method, apparatuses, and non-transitory computer-readable medium described herein, the configuration message further indicates a first set of SRS resources associated with the first slot type and a second set of SRS resources associated with the second slot type. In some examples of the method, apparatuses, and non-transitory computer-readable medium described herein, receiving the SRS may include operations, features, means, or instructions for receiving the SRS using the first set of SRS resources based on the second slot being associated with the first slot type.

Some examples of the method, apparatuses, and non-transitory computer-readable medium described herein may further include operations, features, means, or instructions for transmitting, to the UE, a second reference signal in a third slot associated with the second slot type and receiving, from the UE, a second SRS associated with the second TCI state in a fourth slot associated with the second slot type based on the second reference signal and the fourth slot being associated with the second slot type.

DETAILED DESCRIPTION

Figure 1:
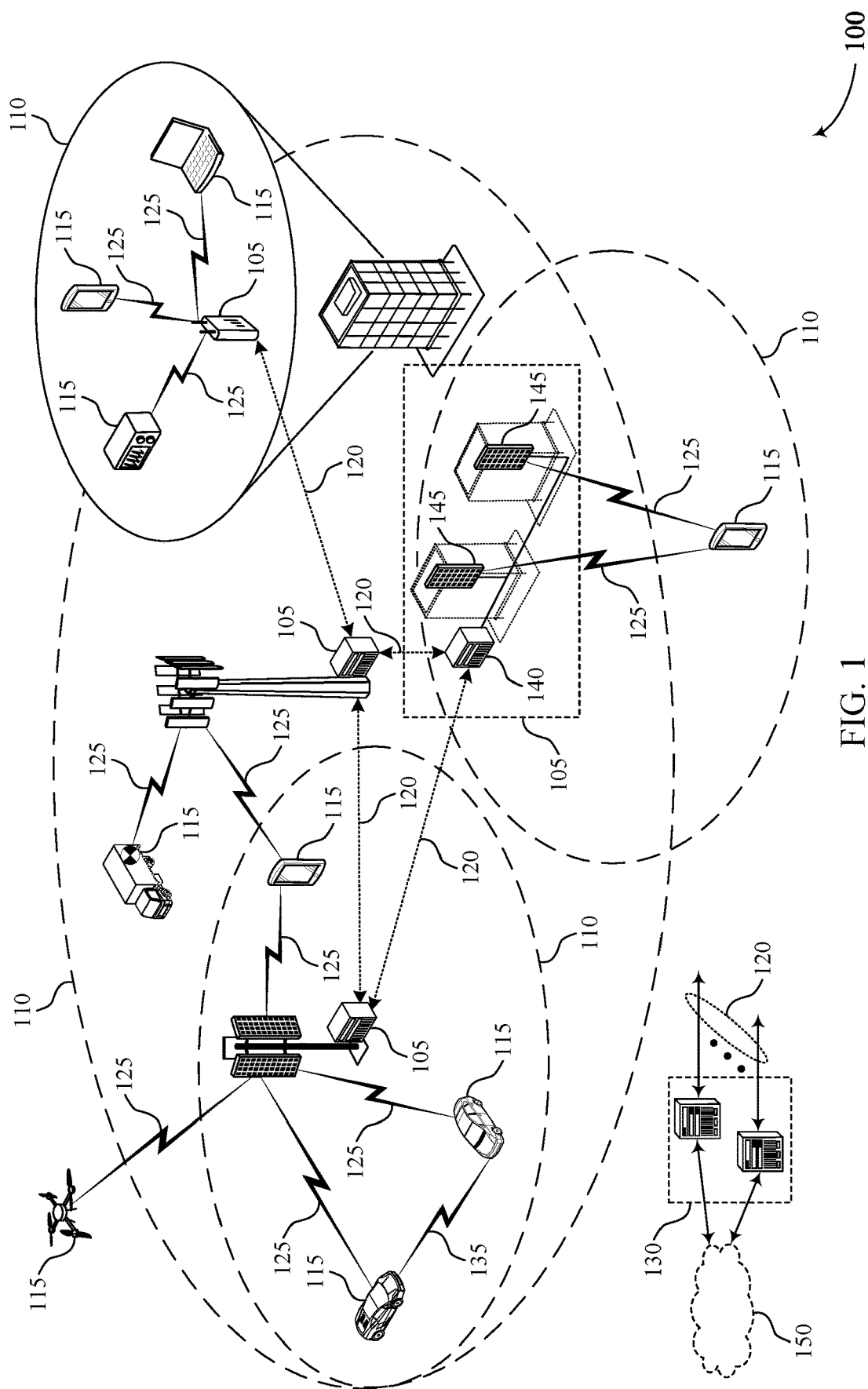
FIGS. 1, 2, 3A, and 3B illustrate examples of wireless communications systems that support techniques for communicating over asynchronous slots in accordance with aspects of the present disclosure.

Some wireless communications systems may include communication devices, such as a user equipment (UE) and a base station (e.g., an eNodeB (eNB), a next-generation NodeB or a giga-NodeB, either of which may be referred to as a gNB, or some other base station), that may support multiple radio access technologies (RATs). Examples of RATs include fourth generation (4G) systems, such as Long Term Evolution (LTE) systems, and fifth-generation (5G) systems, which may be referred to as new radio (NR) systems. In some examples, base stations and UEs may communicate in accordance with a slot pattern configuration (e.g., a time division duplexing (TDD) slot pattern configuration). For example, base stations and UEs may communicate according to a DDDDDDSUU slot pattern (among others), where "D" slots are downlink slots, "S" slots are flexible slots (e.g., that may be scheduled for downlink or uplink traffic), and "U" slots are uplink slots. In some cases, slot patterns may also include one or more full-duplex slots in which both uplink messages and downlink messages may be communicated. A slot type of a slot may refer whether the slot is a downlink slot, an uplink slot, a flexible slot, or a full-duplex slot, among other potential examples. In some examples, multiple communication devices may communicate over synchronous slots meaning the slots over which each communication device communicates at a same time (e.g., during a same duration such as a slot duration) are of a same slot type.

In some examples, a communication device may support dynamic slot patterns in which the communication device may opportunistically change a first slot of a first slot type to a second slot type. For example, to reduce latency and increase data rates, a base station may change a downlink slot to an uplink slot to receive uplink messages. In another example, the base station may opportunistically switch a half-duplex slot (e.g., a downlink, flexible, or uplink slot) to a full-duplex slot. The changed slot may be referred to as an asynchronous slot because the change may cause the base station to communicate with another communication device during the slot in a way that is different than how another base station communicates with another communication device during the slot (e.g., one communicating in a downlink manner and one communicating in an uplink manner). In other words, communication devices may communicate over asynchronous slots meaning the slots over which each communication device communicates at a same time are of a different slot type. In some cases, however, asynchronous communications may cause cross link interference between communication devices. For example, the base station may use a receive beam to receive uplink messages during the changed slot, however, a second base station may transmit downlink messages during the slot using a transmit beam that may interfere with the receive beam of the base station, thereby reducing a reliability of the uplink messages and a performance of the asynchronous communications.

Additionally, in some cases, asynchronous communications may complicate transmission configuration indicator (TCI) state reporting. For example, a UE may use a reference signal (e.g., a synchronization signal block (SSB), a channel state information-reference signal (CSI-RS), or another reference signal) transmitted by a base station to determine and transmit an SRS associated with a particular TCI state. In some cases, the base station may transmit the reference signal in an asynchronous slot, and the UE may transmit the SRS in a synchronous slot (or vice versa). However, reference signals transmitted in asynchronous slots may be subject to some downlink beam restrictions (e.g., to reduce interference), while reference signals transmitted in synchronous slots may not be subject to such restrictions. This in turn, may impact the TCI state of a resulting uplink transmit beam, for example, by causing undesired uplink beam restrictions in synchronous slots or unrestricted uplink beams in asynchronous slots.

Techniques, systems, and devices are described herein for managing communication parameters during asynchronous slots to reduce interference and increase reliability, among other benefits. For example, a first base station and a second base station may perform a handshake procedure to reduce cross link interference caused by asynchronous communications. For instance, the first base station may determine to communicate over an asynchronous slot, for example, by changing a slot type of a slot of a slot pattern configuration associated with (e.g., shared by) the first base station and the second base station. Due to the changed slot type, one or more beams at the first base station (e.g., transmit beams, receive beams) may be set to interfere with one or more beams at the second base station (e.g., receive beams, transmit beams) during the slot. The first base station may inform the second base station of the change (e.g., by transmitting a message indicating the change to the second base station) and may perform the handshake procedure with the second base station to determine a set of communication parameters for communicating during the slot such that the interference may be reduced or eliminated. For example, based on the handshake procedure, one or both of the first base station and the second base station may restrict communications using one or more beam pairs during the slot, adjust a transmission power of one or more beams during the slot, restrict the scheduling of one or more uplink messages during the slot, restrict the use of one or more combining matrices during the slot, restrict the use of one or more precoding matrices during the slot, or change the back to a synchronous slot, or a combination thereof.

Techniques, systems, and devices are further described herein for managing TCI state reporting based on slot type. For example, a base station may transmit a configuration message to a UE that indicates a first TCI state associated with a first slot type and a second TCI state associated with a second slot type, where the first slot type corresponds to an asynchronous slot and the second slot type corresponds to a synchronous slot, or vice versa. The UE may be configured to report the first TCI state or the second TCI state based on a slot type of a slot in which the TCI state is reported. For example, the UE may transmit a sounding reference signal (SRS) associated with the first TCI state in a slot having the first slot type. Here, the UE may use a reference signal received from the base station in a previous slot having the first slot type to determine the first TCI state and the SRS. Alternatively, the UE may transmit an SRS associated with the second TCI state (e.g., using same or different SRS resources) in a slot having the second slot type. Here, the UE may use a reference signal received from the base station in a previous slot having the second slot type to determine the second TCI state and the SRS.

Aspects of the subject matter described in this disclosure may be implemented to realize one or more of the following potential improvements, among others. The techniques employed by the UE and the base station may provide benefits and enhancements to the operation of the UE and the base station. For example, communicating during asynchronous slots in accordance with a handshake procedure may increase reliability, data rates, and spectral efficiency and reduce interference associated with asynchronous communications. In some examples, communicating during asynchronous slots in accordance with a handshake procedure may provide improvements to latency, power consumption, resource usage, coordination between devices, battery life, and processing capability among other benefits. Additionally, in some examples, reporting TCI states based on slot type may provide improvements to reliability, data rates, latency, power consumption, resource usage, coordination between devices, battery life, and processing capability, among other benefits.

Aspects of the disclosure are initially described in the context of wireless communications systems. Aspects of the disclosure are additionally described in the context of a process flow and a wireless communications system. Aspects of the disclosure are further illustrated by and described with reference to apparatus diagrams, system diagrams, and flowcharts that relate to techniques for communicating over asynchronous slots.

FIG. 1 illustrates an example of a wireless communications system 100 that supports techniques for communicating over asynchronous slots in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more RATs.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given RAT (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and TDD component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different RAT).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular RAT (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different RATs.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) RAT, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a CSI-RS), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

A UE 115 attempting to access a wireless network may perform an initial cell search by detecting a primary synchronization signal (PSS) from a base station 105. The PSS may enable synchronization of slot timing and may indicate a physical layer identity value. The UE 115 may then receive a secondary synchronization signal (SSS). The SSS may enable radio frame synchronization, and may provide a cell identity value, which may be combined with the physical layer identity value to identify the cell. The SSS may also enable detection of a duplexing mode and a cyclic prefix length. Some systems, such as time-division duplexing systems, may transmit an SSS but not a PSS. Both the PSS and the SSS may be located in the central 62 and 72 subcarriers of a carrier, respectively. In some cases, a base station 105 may transmit synchronization signals (e.g., PSS SSS, and the like) using multiple beams in a beam-sweeping manner through a cell coverage area. In some cases, PSS, SSS, and/or broadcast information (e.g., a physical broadcast channel (PBCH)) may be transmitted within different SSBs on respective directional beams, where one or more SSBs may be included within an synchronization signal burst or synchronization signal burst set.

A quasi co-location (QCL) relationship between one or more transmissions or signals may refer to a relationship between the antenna ports (and the corresponding signaling beams) of the respective transmissions. For example, one or more antenna ports may be implemented by a base station 105 for transmitting at least one or more reference signals (such as a downlink reference signal, an SSB, or the like) and control information transmissions to a UE 115. However, the channel properties of signals sent via the different antenna ports may be interpreted (e.g., by a receiving device) to be the same (e.g., despite the signals being transmitted from different antenna ports), and the antenna ports (and the respective beams) may be described as being quasi co-located (QCLed). QCLed signals may enable the UE 115 to derive the properties of a first signal (e.g., delay spread, Doppler spread, frequency shift, average power, etc.) transmitted on a first antenna port from measurements made on a second signal transmitted via a second antenna port. Put another way, if two antenna ports are categorized as being QCLed in terms of, for example, delay spread, then the UE 115 may determine the delay spread for one antenna port (e.g., based on a received reference signal, such as a CSI-RS) and then apply the result to both antenna ports. Such techniques may avoid the UE 115 determining the delay spread separately for each antenna port. In some cases, two antenna ports may be said to be spatially QCLed, and the properties of a signal sent over a directional beam may be derived from the properties of a different signal over another, different directional beam. That is, QCL relationships may relate to beam information for respective directional beams used for communications of various signals.

Different types of QCL relationships may describe the relation between two different signals or antenna ports. For instance, QCL-TypeA may refer to a QCL relationship between signals including Doppler shift, Doppler spread, average delay, and delay spread. QCL-TypeB may refer to a QCL relationship including Doppler shift and Doppler spread, whereas QCL-TypeC may refer to a QCL relationship including Doppler shift and average delay. A QCL-TypeD may refer to a QCL relationship of spatial parameters, which may indicate a relation between two or more directional beams used to communicate signals. Here, the spatial parameters indicate that a first beam used to transmit a first signal may be similar (or the same) as another beam used to transmit a second, different, signal, or, that the same receive beam may be used to receive both the first and the second signal. Thus, the beam information for various beams may be derived through receiving signals from a transmitting device, where, in some cases, the QCL information or spatial information may help a receiving device efficient identify communications beams (e.g., without having to sweep through a large number of beams to identify the best beam (e.g., the beam having a highest signal quality)). In addition, QCL relationships may exist for both uplink and downlink transmissions and, in some cases, a QCL relationship may also be referred to as spatial relationship information.

In some examples, a TCI state configuration may include one or more parameters associated with a QCL relationship between transmitted signals. For example, a base station 105 may configure a QCL relationship that provides a mapping between a reference signal and antenna ports of another signal (e.g., a demodulation reference signal (DMRS) antenna port for a physical downlink control channel (PDCCH), a DMRS antenna port for a physical downlink shared channel (PDSCH), a CSI-RS antenna port for CSI-RS, or the like), and the TCI state may be indicated to the UE 115 by the base station 105. In some cases, a set of TCI states may be indicated to a UE 115 via RRC signaling, where some number of TCI states (e.g., a pool of 8 TCI states from of a total of 64 TCI states may be configured via RRC) and a particular TCI state may be indicated via downlink control information (DCI) (e.g., within a control resource set (CORESET)). The QCL relationship associated with the TCI state (and further established through higher-layer parameters) may provide the UE 115 with the QCL relationship for respective antenna ports and reference signals transmitted by the base station 105. In some examples, a TCI state may be considered an uplink TCI state. Here, the uplink TCI state may indicate the QCL relationship for respective antenna ports and signals transmitted by the UE 115.

A UE 115 may transmit an SRS using a predetermined sequence (e.g., a Zadoff-Chu sequence) so that a base station 105 may estimate uplink channel quality and/or downlink channel quality. In some examples, an SRS may be scheduled on multiple antenna ports and still considered to be a single SRS transmission. An SRS transmission may be categorized as a Type 0 (periodically transmitted at equally spaced intervals) SRS or as a Type 1 (aperiodic) SRS. In either case, the base station 105 may control the timing of SRS transmissions by notifying (e.g., via an SRS configuration message) the UE 115 of which TTIs (e.g., subframes) may support the transmission of the SRS. Additionally, a sounding period (e.g., 2 to 230 subframes) and an offset within the sounding period may be configured for the UE 115. As a result, the UE 115 may transmit the SRS when a subframe that supports SRS transmissions coincides with the configured sounding period. In some cases, SRSs may be transmitted during particular symbols of the subframe (e.g., during one or more of the six temporally last OFDM symbol of the subframe) or, in some cases, may be sent during an uplink portion of a special subframe. Data gathered by a base station 105 from an SRS may be used to inform the scheduling of uplink transmissions by the UE 115, such as frequency dependent transmissions. A base station 105 may also utilize an SRS to check timing alignment status and send time alignment commands to the UE 115.

The wireless communications system 100 may support communications in accordance with a slot pattern configuration. For example, in some cases, carriers configured in a TDD mode may include any combination of uplink slots, downlink slots, full-duplex slots, and flexible slots according to a slot pattern configuration. For instance, a carrier configured in a TDD mode may be configured to include slots according to a DDDSU pattern, a DDDSUDDSUU pattern, a DDDDDDDSUU pattern, or a DDDUU pattern, among other patterns, which may repeat in time. In some examples, slot patterns may be associated with particular physical channels such as a physical uplink shared channel (PUSCH) for enhanced mobile broadband (eMBB), or a PUSCH for voice over internet protocol (VoIP), among other physical channels.

Various aspects of the described techniques support managing communication parameters during asynchronous slots to reduce interference and increase reliability, among other benefits. For example, a first base station 105 and a second base station 105 may perform a handshake procedure to reduce cross link interference caused by asynchronous communications. The handshake procedure may be based on (e.g., performed in response to) a change, by the first base station 105 or the second base station 105, to a slot type of a slot of a slot pattern configuration associated with (e.g., shared by) the first base station 105 and the second base station 105, thus resulting in an asynchronous slot. As a result, one or more beams at the first base station 105 (e.g., transmit beams, receive beams) may be set to interfere with one or more beams at the second base station 105 (e.g., receive beams, transmit beams) during the slot. The first base station 105 may perform the handshake procedure with the second base station 105 to determine a set of communication parameters for communicating during the slot such that the interference may be reduced or eliminated. The first base station 105 and the second base station 105 may then communicate during the slot according to the set of communication parameters.

Additionally, or alternatively, various aspects of the described techniques support managing TCI state reporting based on slot type. For example, a base station 105 may transmit a configuration message to a UE 115 that indicates a first TCI state associated with a first slot type and a second TCI state associated with a second slot type. The first slot type may correspond to an asynchronous slot and the second slot type may correspond to a synchronous slot, or vice versa. The UE 115 may be configured to report the first TCI state or the second TCI state based on a slot type of a slot in which the TCI state is reported. For example, the UE 115 may transmit an SRS associated with the first TCI state in a slot having the first slot type. Here, the UE 115 may use a reference signal (e.g., an SSB, a CSI-RS) received from the base station 105 in a previous slot having the first slot type to determine the first TCI state and the SRS. Alternatively, the UE 115 may transmit an SRS associated with the second TCI state (e.g., using same or different SRS resources) in a slot having the second slot type. Here, the UE 115 may use a reference signal received from the base station 105 in a previous slot having the second slot type to determine the second TCI state and the SRS.

Figure 2:
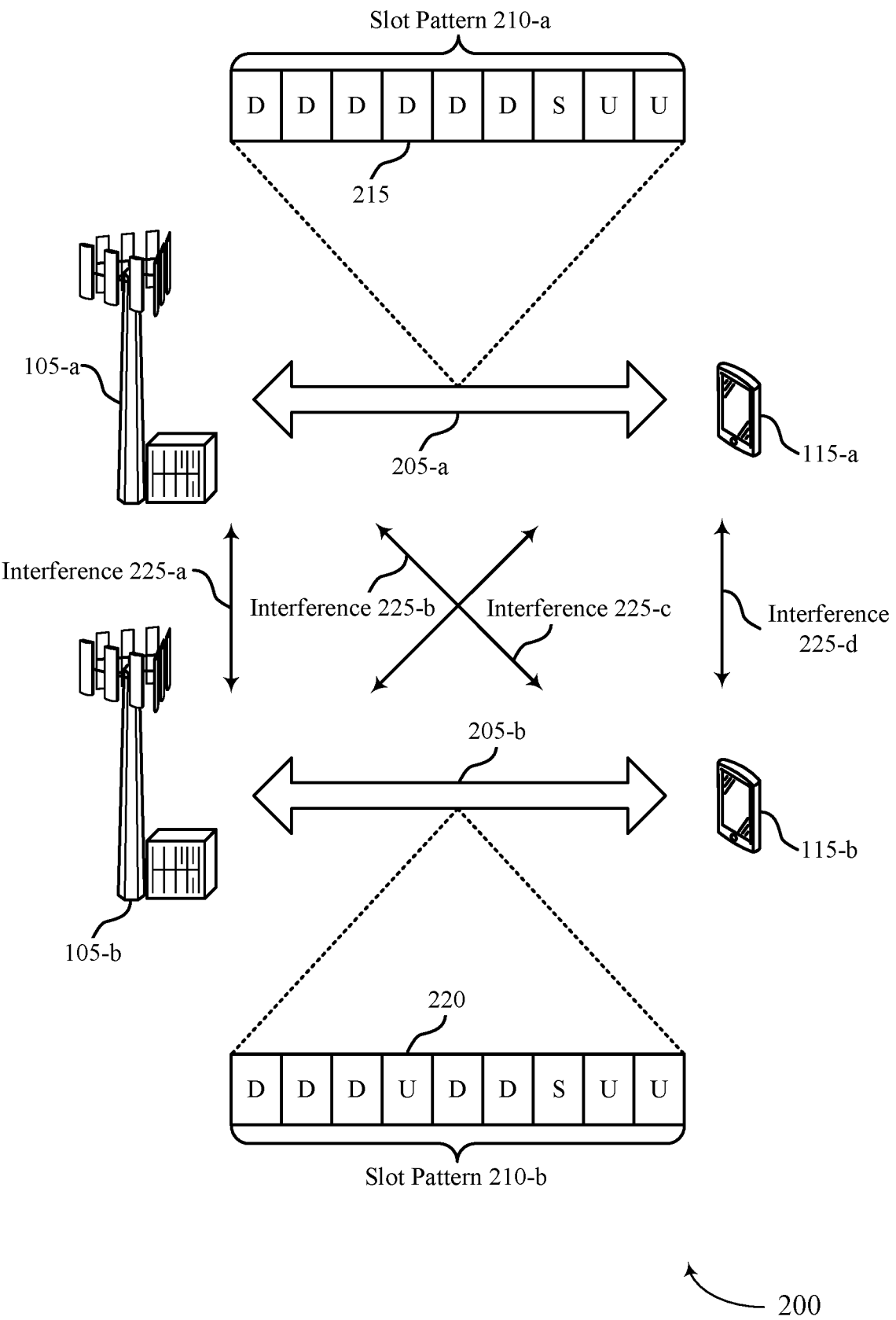

FIG. 2 illustrates an example of a wireless communications system 200 that supports techniques for communicating over asynchronous slots in accordance with aspects of the present disclosure. The wireless communications system 200 may implement aspects of the wireless communications system 100 or may be implemented by aspects of the wireless communications system 100. For example, the wireless communications system 200 may include communication devices including a base station 105-a, a base station 105-b, a UE 115-a, and a UE 115-b, which may be examples of the corresponding devices described with reference to FIG. 1. In some examples, the wireless communications system 200 may support multiple RATs including 4G systems such as LTE systems, LTE-A systems, or LTE-A Pro systems, and 5G systems which may be referred to as NR systems.

The wireless communications system 200 may support communications between the base station 105-a and the UE 115-a and between the base station 105-b and the UE 115-b. For example, the UE 115-a and the base station 105-a may communicate messages (e.g., uplink messages, downlink messages) over a channel 205-a, and the UE 115-b and the base station 105-b may communicate messages over a channel 205-b. The channel 205-a and the channel 205-b may be examples of a physical uplink channel such as a physical uplink control channel (PUCCH), a PUSCH, a physical random access channel (PRACH), or some other physical uplink channel. Additionally, or alternatively, the channel 205-a and the channel 205-b may be examples of a physical downlink channel such as a PDCCH, a PDSCH, a PRACH, a PBCH, or some other physical downlink channel. In some examples, the communication devices (e.g., the base stations 105, the UEs 115) may operate within a same or adjacent frequency band.

The communication devices may be configured to operate in a TDD mode according to a TDD slot pattern. For example, the base station 105-a and the UE 115-a may communicate according to a slot pattern 210-a, and the base station 105-b and the UE 115-b may communicate according to a slot pattern 210-b. The slots of the slot pattern 210-a and the slot pattern 210-b may be communicated at a same time with respect to each other. That is, the first slot of the slot pattern 210-a and the first slot of the slot pattern 210-b may occur during at least an overlapping time if not at a same time, the second slot of the slot pattern 210-a and the second slot of the slot pattern 210-b may occur during at least an overlapping time if not at the same time, and so on. In some examples, the slot pattern 210-a and the slot pattern 210-b may originally be configured to be a same slot pattern 210. For instance, in the example of FIG. 2, the slot pattern 210-a and the slot pattern 210-b may both originally be DDDDDDSUU slot patterns, where "D" slots are downlink slots, "S" slots are flexible slots, and "U" slots are uplink slots. It is noted that while FIG. 2 depicts particular slot patterns, any TDD slot patterns are possible.

The communication devices may support a dynamic slot pattern in which slot types of one or more slots of a slot pattern 210 may be changed. For example, the base station 105-b and the UE 115-b may support a change to slot types of one or more slots of the slot pattern 210-b to reduce latency and increase data rates. For instance, changing a downlink slot to an uplink slot or a full-duplex slot may enable a UE 115 to transmit an uplink message with lower latency. In the example of FIG. 2, the base station 105-b may change a slot 220 of the slot pattern 210-b from a downlink slot to an uplink slot, thus resulting in a DDDUDDSUU slot pattern, and a slot 215 of the slot pattern 210-a that corresponds to a temporally same slot as the slot 220 may remain a downlink slot. As a result, the slot 215 and the slot 220 may be considered asynchronous slots and communications during the slot 215 and the slot 220 may be considered asynchronous communications. Other downlink slots and uplink slots of the slot patterns 210 (e.g., and flexible slots if the flexible slots of the slot patterns 210 are scheduled for the same type of traffic) may be considered synchronous slots, and communications during the other slots may be considered synchronous communications.

In some cases, asynchronous communications may cause cross link interference at one or more communication devices of the wireless communications system 200. For example, due to a change of slot type, transmit beams of some communication devices may interfere with receive beams of other communication devices. For instance, during asynchronous slots, transmit beam(s) at the base station 105-a may interfere with receive beam(s) at the base station 105-b and/or receive beam(s) at the UE 115-b, transmit beam(s) at the base station 105-b may interfere with receive beam(s) at the base station 105-a and/or receive beam(s) at the UE 115-a, transmit beam(s) at the UE 115-a may interfere with receive beam(s) at the base station 105-b and/or receive beam(s) at the UE 115-b, transmit beam(s) at the UE 115-b may interfere with receive beam(s) at the base station 105-a and/or receive beam(s) at the UE 115-a, or a combination thereof. As a result, interference 225-a between the base station 105-a and the base station 105-b, interference 225-b between the base station 105-a and the UE 115-b, interference 225-c between the base station 105-b and the UE 115-a, interference 225-d between the UE 115-a and the UE 115-b, or a combination thereof, may occur during asynchronous slots. In some examples, interference 225 is caused by main lobes, side lobes, grating lobes, or a combination thereof, of respective transmit beams.

In the example of FIG. 2, the base station 105-a may transmit downlink messages during the slot 215 using one or more transmit beams and the UE 115-b may transmit uplink messages during the slot 220 using one or more transmit beams. In some cases, the downlink messages may interfere with the uplink messages, or vice versa. That is, the one or more transmit beams at the base station 105-a may interfere with one or more receive beams at the base station 105-b used to receive the uplink messages, thereby reducing a reliability of the uplink messages. Additionally, or alternatively, the one or more transmit beams at the UE 115-b may interfere with one or more receive beams at the UE 115-a, thereby reducing a reliability of the downlink messages.

To reduce cross link interference resulting from asynchronous communications and to increase a reliability of asynchronous communications, the base station 105-a and the base station 105-b may perform a handshake procedure to determine how to communicate during asynchronous slots (e.g., slot 215 and slot 220). For example, as part of the handshake procedure, the base station 105-a and the base station 105-b may determine which transmit-receive beam pairs may suffer, will suffer, or have suffered reduced performance due to asynchronous communications and may restrict (e.g., limit, stop) the use of such beam pairs during asynchronous slots. Additionally, or alternatively, the base station 105-a and/or the base station 105-b may adjust a transmission power of one or more beams during asynchronous slots. For example, the base station 105-a may reduce a transmission power of one or more transmit beams during the slot 215 that cause interference at the base station 105-b. In some examples of the handshake procedure, the base station 105-b may restrict (e.g., limit, postpone) the scheduling of uplink messages during the slot 220 (e.g., to avoid interference experienced during the slot 220). In some other examples of the handshake procedure, the base station 105-a may restrict (e.g., limit, postpone) the scheduling of downlink messages during the slot 215 (e.g., to avoid causing interference during the slot 215). The handshake procedure may additionally or alternatively result in the base station 105-b restricting the use of one or more combining matrices during asynchronous slots and/or the base station 105-a restricting the use of one or more precoding matrices during asynchronous slots. In some cases of the handshake procedure, the base station 105-a and/or the base station 105-b may determine to change the slot type of one or more asynchronous slots back to an original slot type (e.g., or refrain from changing the slot type of the one or more asynchronous slots). For example, the base station 105-b may change the slot 220 from an uplink slot back to a downlink slot or may refrain from changing the slot 220 to an uplink slot based on the handshake procedure.

The base station 105-a and the base station 105-b may communicate during the slot 215 and the slot 220 based on the handshake procedure. For example, the base station 105-a may transmit one or more downlink messages to the UE 115-a over the slot 215 in accordance with the handshake procedure. Additionally or alternatively, the base station 105-a may receive one or more uplink messages from the UE 115-b over the slot 220 in accordance with the handshake procedure.

Figure 3A:
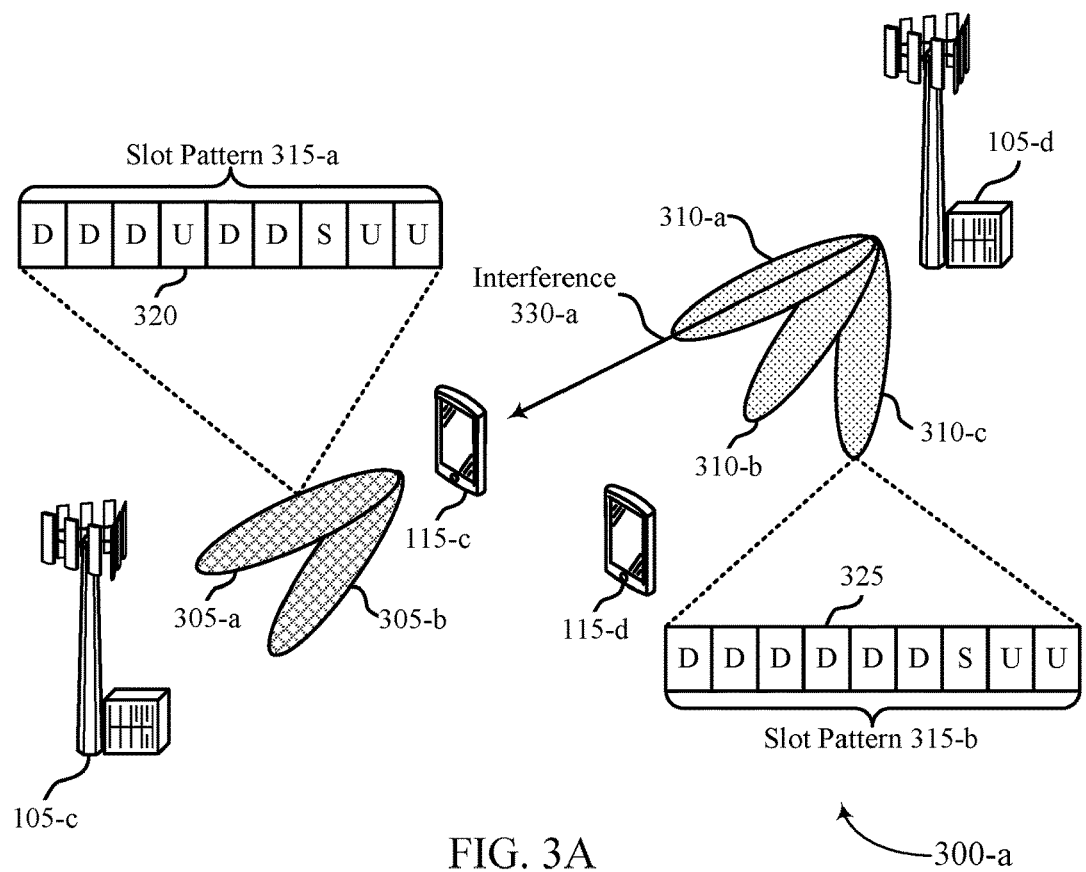

FIG. 3A illustrates an example of a wireless communications system 300-a that supports techniques for communicating over asynchronous slots in accordance with aspects of the present disclosure. The wireless communications system 300-a may implement aspects of the wireless communications systems 100 and 200 or may be implemented by aspects of the wireless communications systems 100 and 200. For example, the wireless communications system 300-a may include multiple communication devices including a base station 105-c, a base station 105-d, a UE 115-c, and a UE 115-d, which may be examples of the corresponding devices described with reference to FIGS. 1 and 2. In some examples, the wireless communications system 300-a may support multiple RATs including 4G systems such as LTE systems, LTE-A systems, or LTE-A Pro systems, and 5G systems which may be referred to as NR systems. In some cases, the communication devices may support managing communications during asynchronous slots to provide improvements to reliability, data rates, latency, coordination between the communication devices, spectral efficiency, and resource usage, among other benefits.

The wireless communications system 300-a may support beamformed communications between the base station 105-c and the UE 115-c and between the base station 105-d and the UE 115-d. For example, the UE 115-c and the UE 115-d may transmit uplink messages or receive downlink messages using one or more beams 305. Additionally, the base station 105-c and the base station 105-d may receive uplink messages or transmit downlink messages using one or more beams 310. That is, the beams 305 and the beams 310 may be examples of either transmit beams or receive beams. In the example of FIG. 3A, the UE 115-c may transmit uplink messages using a beam 305-a and a beam 305-b, and the base station 105-d may transmit downlink messages using a beam 310-a, a beam 310-b, and a beam 310-c. The base station 105-c and the UE 115-d may respectively receive uplink and downlink messages using one or more corresponding beams 310 and beams 305 (not shown).

In some examples, the base station 105-c and the UE 115-c may be associated with a different (e.g., neighboring) cell than the base station 105-d and the UE 115-d. That is, the base station 105-c and the UE 115-c may communicate in a first cell and the base station 105-d and the UE 115-d may communicate in a second cell, where the first cell and the second cell may be different or neighboring cells.

The wireless communications system 300-a may support communications between the base station 105-c and the UE 115-c and between the base station 105-d and the UE 115-d in accordance with slot patterns 315. For example, the base station 105-c and the UE 115-c may communicate according to a slot pattern 315-a, and the base station 105-d and the UE 115-d may communicate according to a slot pattern 315-b. In some examples, the slot pattern 315-a and the slot pattern 315-b may initially be configured to be a same slot pattern 315. For example, the wireless communications system 300-a may support dynamic slot patterns 315 in which slot types of one or more slots may be opportunistically changed. Accordingly, in some cases, the slot pattern 315-a and the slot pattern 315-b may initially be a same slot pattern 315 that is shared by the communication devices of the wireless communications system 300-a (e.g., the base stations 105 and the UEs 115). In the example of FIG. 3A, the communication devices may initially share a DDDDDDSUU pattern.

The base station 105-c may change (e.g., opportunistically, dynamically) a slot type of one or more slots of the slot pattern 315-a, for example, to reduce latency associated with communicating some types of messages (e.g., URLLC messages). For example, the base station 105-c may change a slot 320 of slot pattern 315-a from a downlink slot to an uplink slot to enable earlier communication of uplink messages over the slot 320, thereby changing the slot pattern 315-a to be different from the slot pattern 315-b and rendering the slot 320 and a corresponding slot 325 of the slot pattern 315-b asynchronous slots.

In some cases, the change to the slot 320 may result in cross link interference. For example, during the slot 320, the UE 115-c may transmit one or more uplink messages to the base station 105-c based on changing the slot 320 to an uplink slot. Additionally, during the slot 325 (e.g., which may occur at a same time as the slot 320), the base station 105-d may transmit one or more downlink messages to the UE 115-d based on the slot 325 being a downlink slot. In some cases, however, one or more beams 310 used to transmit the downlink messages may interfere with one or more beams 310 at the base station 105-c used to receive the uplink messages transmitted by the UE 115-c. For example, the beam 310-a (e.g., which may be a side lobe or a grating lobe of another beam 310) may cause interference 330-a between the UE 115-c and the base station 105-c, thereby reducing a reliability of the uplink messages transmitted during the slot 320.

To reduce cross link interference and increase a reliability of communications during asynchronous slots, the base station 105-c and the base station 105-d may perform a handshake procedure. The handshake procedure may initiated, triggered, or performed according to various techniques described herein. In a first example, the base station 105-c may determine the change to the slot 320 and may indicate the change to the base station 105-d. For example, the base station 105-c transmit a message to the base station 105-d indicating the change to the slot 320 and the base station 105-c and the base station 105-d may perform the handshake procedure in response to the base station 105-c transmitting the message.

In some examples, the message may be a reference signal such as a remote interference measurement (RIM) reference signal. For example, a RIM reference signal may be transmitted by a victim base station 105 to an aggressor base station 105 to indicate that the aggressor base station 105 causes interference at the victim base station 105. The RIM reference signal may include an identifier (e.g., a SET-ID) assigned to the victim base station 105 that may be used by the aggressor base station 105 to identify the victim base station 105. Accordingly, based on the identifier and in response to receiving the RIM reference signal, the aggressor base station 105 may identify the victim base station 105 and may adjust a beam configuration to reduce or eliminate the interference experienced by the victim base station 105. As such, the base station 105-c may transmit a RIM reference signal that include an identifier corresponding to the base station 105-c such that the base station 105-d may determine with which base station 105 to perform the handshake procedure.

The message may additionally or alternatively indicate which transmit beams 310 at the base station 105-d cause (e.g., will cause, are causing, have caused) interference at the base station 105-c. For example, the base station 105-c may determine that one or more transmit beams 310 at the base station 105-d (e.g., one or more of beams 310-a, 310-b, and 310-c) cause at least a threshold level of interference to one or more receive beams 310 at the base station 105-c. The message may indicate to the base station 105-d the one or more transmit beams 310 causing the interference. In some examples, the message may indicate the one or more transmit beams 310 by including spatial information (e.g., adding a spatial dimension to a RIM reference signal) corresponding to the one or more transmit beams 310. For example, each base station 105 may be assigned multiple identifiers that each correspond to a different beam 310 of the base station 105. Accordingly, the message may include a set of identifiers that each correspond to one of the one or more transmit beams 310.

The message may additionally or alternatively indicate which receive beams 310 at the base station 105-c experience (e.g., suffer from) interference caused by the base station 105-d. For example, the base station 105-c may determine the one or more transmit beams 310 that cause at least the threshold level of interference to the one or more receive beams 310 at the base station 105-c. The message may indicate the one or more receive beams 310 to the base station 105-d, for example, by including spatial information corresponding to the one or more receive beams 310 (e.g., including a set of identifiers corresponding to the one or more receive beams 310).

The base station 105-c and the base station 105-d may perform the handshake procedure based on the information included in the message (e.g., the RIM reference signal, the identifier corresponding to the base station 105-c, the interference indication, the beam indications, or a combination thereof).

In a second example, the base station 105-c may monitor SSB messages transmitted by the base station 105-d to identify beam pairs for use during asynchronous slots. For example, the base station 105-c may change one or more slots of the slot pattern 315-a to full-duplex slots to receive SSB messages transmitted by the base station 105-d during the one or more slots. Each SSB message may correspond to a transmit beam 310 at the base station 105-d. Accordingly, based on the SSB messages, the base station 105-c may identify which transmit beams 310 may cause interference at the base station 105-c during asynchronous slots. In some examples, the base station 105-c may receive the SSB messages over multiple SSB burst cycles. Here, the base station 105-c may select one or more different receive beams 310 to receive the SSB messages for each SSB burst cycle. As a result, the base station 105-c may determine an interference associated with various beams pairs of the base station 105-c and the base station 105-d, where a beam pair corresponds to a pairing of a transmit beam 310 at the base station 105-d and a receive beam 310 at the base station 105-c. The base station 105-c and the base station 105-c may perform the handshake procedure based on the interference and beam pair determinations (e.g., after the SSB monitoring by the base station 105-c).

In a third example, the base station 105-c and the base station 105-d may perform the handshake procedure periodically. For example, the handshake procedure may be associated with a period of time. That is, the base station 105-c and the base station 105-d may perform the handshake procedure to determine how to communicate during any asynchronous slot (e.g., including the slot 320 and the slot 325) that occurs within the period of time. Accordingly, at some time before the period of time expires or in response to the period of time expiring, the base station 105-c and the base station 105-d may initiate and perform the handshake procedure to determine how to communicate during asynchronous slots within a subsequent period of time.

In any example, the base station 105-c and the base station 105-d may perform the handshake procedure to determine a set of communication parameters for communicating over asynchronous slots. For example, the set of communication parameters may include a restriction associated with using one or more beam pairs during asynchronous slots (e.g., the slot 320 and the slot 325). For instance, based on the SSB monitoring and/or the interference determination by the base station 105-c, the base station 105-c and the base station 105-d may select which beam pairs may be used during asynchronous slots and restrict the use of other beam pairs (e.g., that suffer at least a threshold level of interference).

The set of communication parameters may additionally or alternatively include a transmission power of one or more beams 310. For example, the base station 105-c and/or the base station 105-c may reduce a transmission power of one or more interfering transmit beams 310 during asynchronous slots. In this way, the base stations 105 may communicate using the one or more transmit beams 310 during the asynchronous slots but may reduce interference caused by the one or more transmit beams 310 by reducing a transmission power of the one or more transmit beams.

The set of communication parameters may additionally or alternatively include a restriction associated with scheduling one or more uplink messages during asynchronous slots. For example, the base station 105-c may restrict or postpone the scheduling of one or more uplink messages during the slot 320. In some examples, the base station 105-c may instead schedule the one or more uplink messages during one or more synchronous uplink slots, for example, to increase a reliability associated with the one or more uplink messages.

The set of communication parameters may additionally or alternatively include a restriction associated with scheduling one or more downlink messages during asynchronous slots. For example, the base station 105-d may restrict or postpone the scheduling of one or more downlink messages during the slot 325. In some examples, the base station 105-d may instead schedule the one or more downlink messages during one or more synchronous downlink slots, for example, to increase a reliability associated with the one or more downlink messages.

The set of communication parameters may additionally or alternatively include a restriction associated with using one or more combining matrices and/or one or more precoding matrices during asynchronous slots. For example, different combining matrices may how a communication device (e.g., a base station 105, a UE 115) receives and processes (e.g., combines, demodulates) messages, which may affect how reliably the communication device may properly receive the messages using a given combining matrix. Additionally, in some cases, different precoding matrices may affect parameters associated with different beams 310 (e.g., gain, direction, or other beam parameters), which may affect (e.g., reduce, increase) the interference resulting from using a given precoding matrix. Accordingly, the base station 105-*c* and/or the base station 105-*d* may restrict the use of one or more combining matrices during one or more asynchronous slots in order to increase reliability during the asynchronous slots. Additionally or alternatively, the base station 105-*c* and/or the base station 105-*d* may restrict the use of one or more precoding matrices during one or more asynchronous slots in order to reduce interference during the asynchronous slots.

The set of communication parameters may additionally or alternatively include an indication (e.g., determination) to change a slot type of one or more asynchronous slots back to an original slot type of the one or more asynchronous slots. For example, if the base station 105-*c* and the base station 105-*d* determine that relatively few beam pairs are potentially usable (e.g., associated with an interference that is less than a threshold) during one or more asynchronous slots, the base station 105-*c* or the base station 105-*d* may change the one or more asynchronous slots back to synchronous slots (e.g., such that the types of communication during the synchronous slots are the same). The base station 105-*c* and the base station 105-*d* may communicate the decision to change the one or more slots back to synchronous slots as part of the handshake procedure.

In some examples, the base station 105-*c* and the base station 105-*d* may perform the handshake procedure over a backhaul link between the base station 105-*c* and the base station 105-*d*. For example, the base station 105-*c* and the base station 105-*d* may exchange information (e.g., a change indication, interference measurements, beam pair determinations, restriction decisions, or other information related to the handshake procedure) over the backhaul link to determine the set of communication parameters.

The base station 105-*c* and the base station 105-*c* may communicate during asynchronous slots (e.g., the slot 320 and the slot 325) in accordance with the set of communication parameters determined from the handshake procedure. For example, the base station 105-*c* and the base station 105-*d* may communicate messages during asynchronous slots using selected beam pairs, in accordance with uplink message or downlink message scheduling restrictions, using adjusted transmission powers, in accordance with combining matrix restrictions, in accordance with precoding matrix restrictions, by changing one or more asynchronous slots to synchronous slots, or a combination thereof.

Figure 3B:
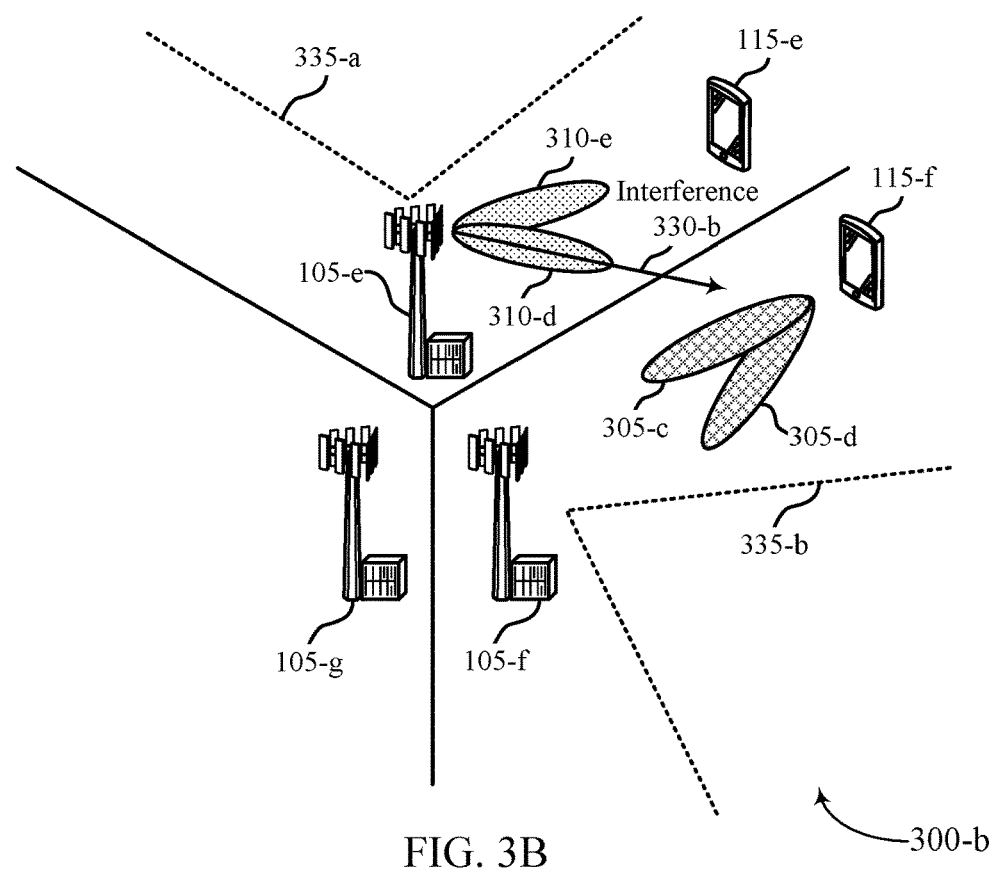

FIG. 3B illustrates an example of a wireless communications system 300-*b* that supports techniques for communicating over asynchronous slots in accordance with aspects of the present disclosure. The wireless communications system 300-*b* may implement aspects of the wireless communications systems 100, 200, and 300-*a* or may be implemented by aspects of the wireless communications systems 100, 200, and 300-*a*. For example, the wireless communications system 300-*b* may include multiple communication devices including a base station 105-*e*, a base station 105-*f*, a base station 105-*g*, a UE 115-*e*, and a UE 115-*f*, which may be examples of the corresponding devices described with reference to FIGS. 1 through 3A. In some examples, the wireless communications system 300-*b* may support multiple RATs including 4G systems such as LTE systems, LTE-A systems, or LTE-A Pro systems, and 5G systems which may be referred to as NR systems. In some cases, the communication devices may support managing communications during asynchronous slots to provide improvements to reliability, data rates, latency, coordination between the communication devices, spectral efficiency, and resource usage, among other benefits.

The wireless communications system 300-*b* may support beamformed communications. For example, the UE 115-*e* and the UE 115-*f* may transmit uplink messages or receive downlink messages using one or more beams 305. Additionally, the base station 105-*e*, the base station 105-*f*, and the base station 105-*g* may receive uplink messages or transmit downlink messages using one or more beams 310. That is, the beams 305 and the beams 310 may be examples of either transmit beams or receive beams. The example of FIG. 3B depicts the UE 115-*f* as transmitting uplink messages using a beam 305-*c* and a beam 305-*d*, and the base station 105-*e* as transmitting downlink messages using a beam 310-*d* and a beam 310-*e*. The base station 105-*f*, the base station 105-*g*, and the UE 115-*e* may respectively receive uplink and downlink messages using one or more corresponding beams 310 and beams 305 (not shown).

In some examples, the communication devices (e.g., the base stations 105 and the UEs 115) may be associated with different sectors of a cell. For example, the base station 105-*e* and the UE 115-*e* may be associated with and communicate in a first sector of a cell, the base station 105-*f* and the UE 115-*f* may be associated with and communicate in a second sector of the cell, and the base station 105-*g* may be associated with and communicate in a third sector of the cell.

The communication devices may support dynamic slot patterns that result in asynchronous communications over asynchronous slots. However, in some cases, asynchronous communications may result in cross link interference during the asynchronous slots. For example, the UE 115-*e* and the UE 115-*f* may be located relatively near a border of the first sector and the second sector. In some cases, downlink transmissions to the UE 115-*e* from the base station 105-*e* during an asynchronous slot may cause interference 330-*b* to uplink transmissions to the base station 105-*f* from the UE 115-*f* during the asynchronous slot.

To reduce cross link interference and increase a reliability of communications during asynchronous slots, the base station 105-*e*, the base station 105-*f*, and the base station 105-*g* may perform a handshake procedure to determine a set of communication parameters for communicating during the asynchronous slots. In some examples, the set of communication parameters may include a restriction associated with using one or more beam pairs during one or more asynchronous slots, a transmission power of one or more beams 310 during the one or more asynchronous slots, a restriction associated with scheduling one or more uplink messages during the one or more asynchronous slots, a restriction associated with scheduling one or more downlink messages during the one or more asynchronous slots, a restriction associated with using one or more combining matrices during the one or more asynchronous slots, a restriction associated with using one or more combining matrices during the one or more asynchronous slots, or an indication to change slot types of one or more asynchronous slots back to an original slot type of the respective slot, or any combination thereof.

In some cases, the set of communication parameters may additionally or alternatively include a coverage zone adjustment by one or more of the base station 105-e, the base station 105-f, and the base station 105-g. For example, each of the base station 105-e, the base station 105-f, and the base station 105-g may be associated with a coverage zone 335, where a coverage zone 335 corresponds to an area covered by a respective base station 105 (e.g., the first sector, the second sector, the third sector). In some examples, each coverage zone 335 may be associated with a degree of coverage such as a 120 degree coverage, among others. To reduce cross link interference, one or more of the base station 105-e, the base station 105-f, and the base station 105-g may reduce an associated coverage zone 335. For example, based on the handshake procedure, the base station 105-e may reduce a coverage zone 335-a (e.g., from 120 degrees to X degrees, where X is some positive integer less than 120) during asynchronous slots to reduce or eliminate the interference 330-b. Additionally or alternatively, the base station 105-f may reduce a coverage zone 335-b during asynchronous slots.

The base station 105-e, the base station, 105-f, and the base station 105-g may communicate during asynchronous slots in accordance with the set of communication parameters determined from the handshake procedure. For example, the base station 105-e, the base station, 105-f, and the base station 105-g may communicate messages during asynchronous slots using selected beam pairs, in accordance with uplink message or downlink message scheduling restrictions, using adjusted transmission powers, in accordance with combining matrix restrictions, in accordance with precoding matrix restrictions, using adjusted coverage zones 335, by changing one or more asynchronous slots to synchronous slots, or a combination thereof.

Figure 4:
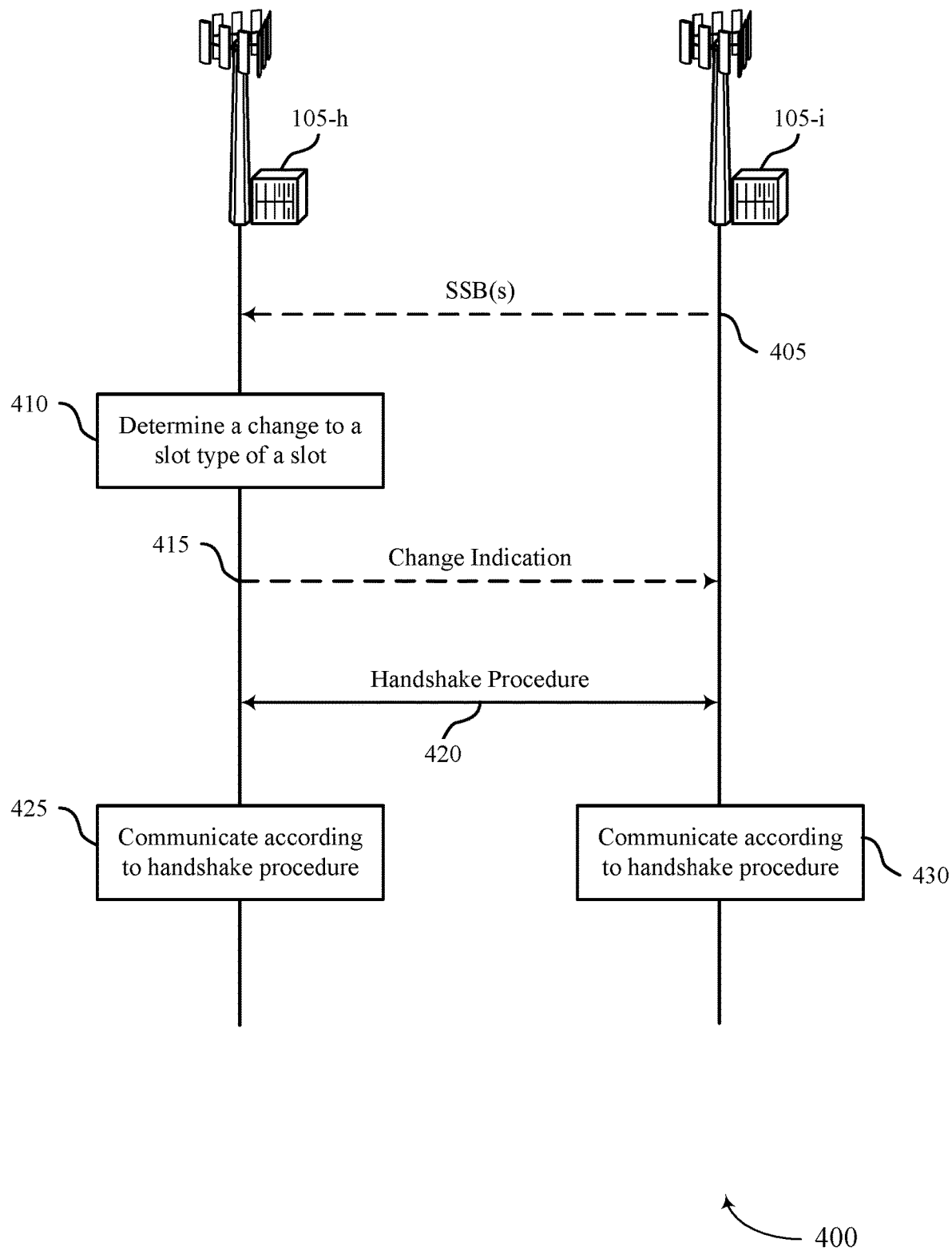
FIG. 4 illustrates an example of a process flow that supports techniques for communicating over asynchronous slots in accordance with aspects of the present disclosure.

FIG. 4 illustrates an example of a process flow 400 that supports techniques for communicating over asynchronous slots in accordance with aspects of the present disclosure. In some examples, the process flow 400 may be implemented by aspects of the wireless communications systems 100, 200, 300-a, and/or 300-b as described with reference to FIGS. 1 through 3B. For example, the process flow 400 may be implemented by a base station 105-h and a base station 105-i to support managing communications during asynchronous slots. The process flow 400 may further be implemented by the base station 105-h and the base station 105-i to provide improvements to reliability, latency, data rates, resource usage, spectral efficiency, power consumption, coordination between the base station 105-h and the base station 105-i, and processing capability, among other benefits.

The base station 105-h and the base station 105-i may be examples of a base station 105 described with reference to FIGS. 1 through 3B. In the following description of the process flow 400, the operations between the base station 105-h and the base station 105-i may be communicated in a different order than the example order shown, or the operations performed by the base station 105-h and the base station 105-i may be performed in different orders or at different times. Some operations may also be omitted from the process flow 400, and other operations may be added to the process flow 400.

At 405, the base station 105-h may optionally change one or more slots of a slot pattern configuration to full-duplex slots to receive one or more SSBs from the base station 105-i during the one or more slots. In some examples, the base station 105-h may change one or more slots over one or more SSB burst cycles. In some cases, the base station 105-h may receive the one or more SSBs using a set of receive beams (e.g., using one or more different receive beams for each SSB burst cycle).

At 410, the base station 105-h may determine a change to a slot type of a slot of a slot pattern configuration associated with the base station 105-h and the base station 105-i. In some examples, the slot pattern configuration is shared by the base station 105-h and the base station 105-i. In some examples, the base station 105-h and the base station 105-i may operate according to different slot pattern configurations, but the slot type of the slot for each slot pattern configuration may be the same. In any example, the change to the slot type of the slot may cause the base station 105-h and the base station 105-i to communicate asynchronously during the slot. In some examples, due to the slot changing to an asynchronous slot, a first beam (e.g., a receive beam) at the base station 105-h may be set to interfere with a second beam (e.g., a transmit beam) at the base station 105-i.

At 415, the base station 105-h may optionally transmit a change indication to the base station 105-i that indicates the change to the slot type of the slot. In some examples, the change indication may be a RIM reference signal, among other examples. In some cases, the change indication may include spatial information (e.g., a set of identifiers) that indicates a set of beams at the base station 105-i (e.g., a set of transmit beams set to interfere with one or more receive beams at the base station 105-h). In some examples, the spatial information may additionally or alternatively indicate a set of beams at the base station 105-h (e.g., a set of receive beams set to interfere with one or more transmit beams at the base station 105-i).

At 420, the base station 105-h and the base station 105-i may perform a handshake procedure to determine a set of communication parameters for communicating during the slot. In some examples, the set of communication parameters may include a restriction associated with using one or more beam pairs during the slot, a transmission power of one or more beams at the base station 105-h or the base station 105-i during the slot, a restriction associated with scheduling one or more uplink messages during the slot, a restriction associated with scheduling one or more downlink messages during the slot, a restriction associated with using one or more combining matrices during the slot, a restriction associated with using one or more precoding matrices during the slot, a coverage zone adjustment during the slot, or an indication to change the slot type of the slot back to an original slot type of the slot, or a combination thereof.

At 425, the base station 105-h may communicate one or more messages during the slot in accordance with the set of communication parameters. For example, the base station 105-h may transmit one or more downlink messages to or receive one or more uplink messages from a first UE 115 during the slot according to the set of communication parameters.

At 430, the base station 105-i may communicate one or more messages during the slot in accordance with the set of communication parameters. For example, the base station 105-i may transmit one or more downlink messages to or receive one or more uplink messages from a second UE 115 during the slot according to the set of communication parameters.

Figure 5:
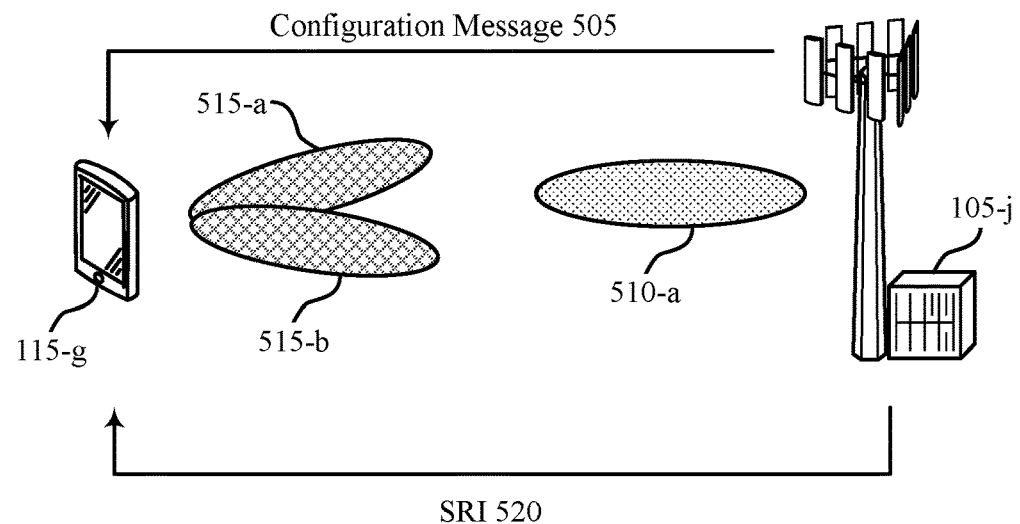
FIG. 5 illustrates an example of a wireless communications system that supports techniques for communicating over asynchronous slots in accordance with aspects of the present disclosure.
Figure 5:
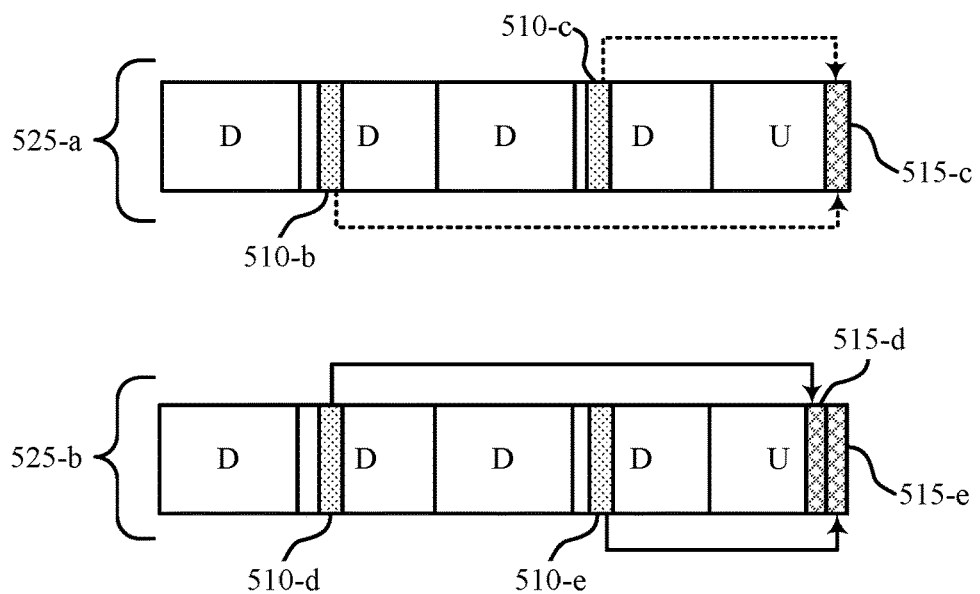
Figure 5:
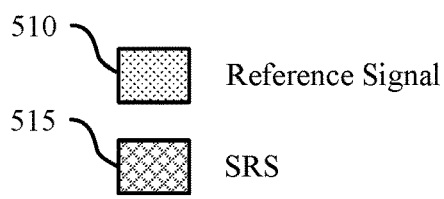

FIG. 5 illustrates an example of a wireless communications system 500 that supports techniques for communicating over asynchronous slots in accordance with aspects of the present disclosure. The wireless communications system 500 may implement aspects of the wireless communications systems 100, 200, 300-*a*, and 300-*b* or may be implemented by aspects of the wireless communications systems 100, 200, 300-*a*, and 300-*b*. For example, the wireless communications system 500 may include a base station 105-*j* and a UE 115-*g*, which may be examples of the corresponding devices described with reference to FIGS. 1 through 3B. In some examples, the wireless communications system 500 may support multiple RATs including 4G systems such as LTE systems, LTE-A systems, or LTE-A Pro systems, and 5G systems which may be referred to as NR systems. In some cases, the base station 105-*j* and the UE 115-*g* may support slot type dependent TCI state reporting to provide improvements to reliability, data rates, latency, coordination between the communication devices, spectral efficiency, and resource usage, among other benefits.

The wireless communications system 500 may support beamformed communications between the base station 105-*j* and the UE 115-*g*. For example, the base station 105-*j* may transmit downlink messages to or receive uplink messages from the UE 115-*g* using one or more beams, and the UE 115-*g* may transmit uplink messages to or receive downlink messages from the base station 105-*j* using one or more beams.

The wireless communications system 500 depicts example processes of reporting TCI states based on slot type. For example, the base station 105-*j* may transmit a configuration message 505 to the UE 115-*g* that indicates a first TCI state associated with a first slot type and a second TCI state associated with a second slot type. In some examples, the slot type may refer to whether a slot is a synchronous slot (e.g., corresponding to a same type of communications related to respective multiple devices such as base stations) or an asynchronous slot (e.g., corresponding to a different type of communications related to respective multiple devices such as base stations). For example, the first TCI state may be associated with synchronous slots and the second TCI state may be associated with asynchronous slots. In some examples, the base station 105-*j* may transmit the configuration message 505 via RRC signaling.

The base station 105-*j* may transmit a reference signal 510-*a* (e.g., an SSB message, a CSI-RS) to the UE 115-*g* that the UE 115-*g* may use to determine a transmit beam for transmitting uplink messages to the base station 105-*j*. For instance, the base station 105-*j* may configure (e.g., via RRC signaling) the UE 115-*g* with respective spatial relations between a reference signal 510 and corresponding transmit beams. For example, the UE 115-*g* may be configured such that a receive beam used to receive the reference signal 510-*a* may in turn be used by the UE 115-*g* as a transmit beam. Accordingly, the UE 115-*g* may receive the reference signal 510-*a* using one or more receive beams and may transmit one or more SRSs 515 (e.g., an SRS 515-*a* and an SRS 515-*b*) to the base station 105-*j* using corresponding transmit beams based on the one or more received beams used to receive reference signal 510-*a*. The base station 105-*j* may receive and measure the SRSs 515 and may select one or more of the corresponding transmit beams for the UE 115-*g* to use. The base station 105-*j* may transmit an SRS resource indicator (SRI) 520 to the UE 115-*g* to indicate the selected transmit beams for the UE 115-*g* to use, for example, for PUSCH transmissions.

The UE 115-*g* may transmit the one or more SRSs 515 based on, for example, a slot type of a slot over which the UE 115-*g* transmits the one or more SRSs 515. In a first example, the configuration message 505 may configure the UE 115-*g* with a set of SRS resources (e.g., time-frequency resources) associated with both the first TCI state and the second TCI state. The UE 115-*g* may use the set of SRS resources to transmit an SRS 515 that is associated with the first TCI state or the second TCI state based on a slot type of a slot over which the UE 115-*g* transmits the SRS 515 and a reference signal 510 received in a slot having the slot type.

For example, a communication sequence 525-*a* depicts an example of transmitting an SRS 515 associated with either the first TCI state of the second TCI based on slot type. For instance, the base station 105-*j* may transmit a reference signal 510-*b* in a synchronous downlink slot and a reference signal 510-*c* in an asynchronous downlink slot (or vice versa). The UE 115-*g* may filter the reference signals 510 for determining an SRS 515-*c* based on a slot type of the uplink slot. For example, if the uplink slot is a synchronous slot, the UE 115-*g* may use the reference signal 510-*b* to determine the SRS 515-*c* and the first TCI state (e.g., even though the reference signal 510-*c* may be a more temporally recent reference signal 510 with respect to the uplink slot). The UE 115-*g* may then transmit the SRS 515-*c* associated with the first TCI state (e.g., in accordance with QCL assumptions associated with the first TCI state) in the uplink slot based on the uplink slot being a synchronous slot. Alternatively, if the uplink slot is an asynchronous slot, the UE 115-*g* may use the reference signal 510-*c* to determine the SRS 515-*c* and the second TCI state. The UE 115-*g* may then transmit the SRS 515-*c* associated with the second TCI state (e.g., in accordance with QCL assumptions associated with the second TCI state) in the uplink slot based on the uplink slot being an asynchronous slot.

In a second example, the configuration message 505 may configure the UE 115-*g* with two sets of SRS resources that are each associated with a slot type. For example, a first set of SRS resources may be associated with (e.g., used to transmit SRSs 515 over) synchronous slots and a second set of SRS resources may be associated with (e.g., used to transmit SRSs 515 over) asynchronous slots. In some examples, the first set of SRS resources and the second set of SRS resources may at least partially overlap in a time domain (e.g., overlapping symbols, overlapping slots). The UE 115-*g* may use the first set of SRS resources or the second set of SRS resources to transmit an SRS 515 that is associated with the first TCI state or the second TCI state based on a slot type of a slot over which the UE 115-*g* transmits the SRS 515 and a reference signal 510 received in a slot having the slot type.

For example, a communication sequence 525-*b* depicts an example of transmitting one or more SRSs 515 associated with either the first TCI state of the second TCI based on slot type. For instance, the base station 105-*j* may transmit a reference signal 510-*d* in a synchronous downlink slot and a reference signal 510-*e* in an asynchronous downlink slot (or vice versa). The UE 115-*g* may determine a TCI state and a set of SRS resources based on a slot type of the uplink slot. For example, if the uplink slot is a synchronous slot, the UE 115-*g* may use the reference signal 510-*d* to determine an SRS 515-*d* and the first TCI state (e.g., even though the reference signal 510-*e* is a more temporally recent reference signal 510 with respect to the uplink slot). The UE 115-*g* may then transmit the SRS 515-*d* associated with the first TCI state (e.g., in accordance with QCL assumptions associated with the first TCI state) in the uplink slot using the first set of SRS resources based on the uplink slot being a synchronous slot. Alternatively, if the uplink slot is an asynchronous slot, the UE 115-*g* may use the reference signal 510-*e* to determine an SRS 515-*e* and the second TCI state. The UE 115-g may then transmit the SRS 515-e associated with the second TCI state (e.g., in accordance with QCL assumptions associated with the second TCI state) in the uplink slot using the second set of SRS resources based on the uplink slot being an asynchronous slot.

In some examples, the UE 115-g may drop the unused set of SRS resources. For example, if the UE 115-g transmits the SRS 515-d using the first set of SRS resources, the UE 115-g may drop the second set of SRS resources. Alternatively, if the UE 115-g transmits the SRS 515-e using the second set of SRS resources, the UE 115-g may drop the first set of SRS resources. In some examples, the UE 115-g may transmit both the SRS 515-d and the SRS 515-e using the respective sets SRS resources and the base station 105-j may filter the SRSs 515 based on a slot type of the uplink slot. For example, if the uplink slot is a synchronous slot, the base station 105-j may process the SRS 515-d and refrain from processing the SRS 515-e. Alternatively, if the uplink slot is an asynchronous slot, the base station 105-j may process the SRS 515-e and refrain from processing the SRS 515-d.

In some examples, the UE 115-g may determine the slot type of the uplink slot based on one or more control messages received from the base station 105-j. For example, the base station 105-j may transmit a MAC-control element (MAC-CE) that indicates a time-domain bit map. The time-domain bit map may indicate, for a set of slots in the time domain, whether each slot is a downlink slot or an uplink slot. Using the time-domain bit map, the UE 115-g (e.g., and the base station 105-j) may determine whether a given slot is an asynchronous slot or a synchronous slot. For example, the UE 115-g may compare the time-domain bit map to a slot pattern configuration according to which the UE 115-g is operating. If a slot is changed by the time-domain bit map, the UE 115-g may determine that the slot is an asynchronous slot. In another example, the UE 115-g may be configured with multiple time-domain bit maps, for example, via RRC signaling. In some examples, the base station 105-j may transmit a downlink control information (DCI) message indicating one of the configured time-domain bit maps, which the UE 115-g may use to determine whether a given slot is an asynchronous slot or a synchronous slot.

Transmitting an SRSs 515 associated with a TCI state based on slot type may improve uplink beam management and selection. For example, reference signals 510 transmitted in asynchronous slots may be subject to some downlink beam restrictions (e.g., to reduce interference), while reference signals 510 transmitted in synchronous slots may be free of such beam restrictions. Accordingly, uplink messages (e.g., SRSs 515, PUSCH transmissions) transmitted in asynchronous slots should be subject to similar beam restrictions, while uplink messages transmitted in synchronous slots should be free of such beam restrictions. By using reference signals 510 transmitted in a slot having a same slot type to determine an SRS 515 and an associated TCI state (e.g., rather than using a temporally most recent reference signal 510), the UE 115-g may transmit uplink messages in accordance with any beam restrictions (e.g. or the lack thereof) associated with the reference signals 510.

Figure 6:
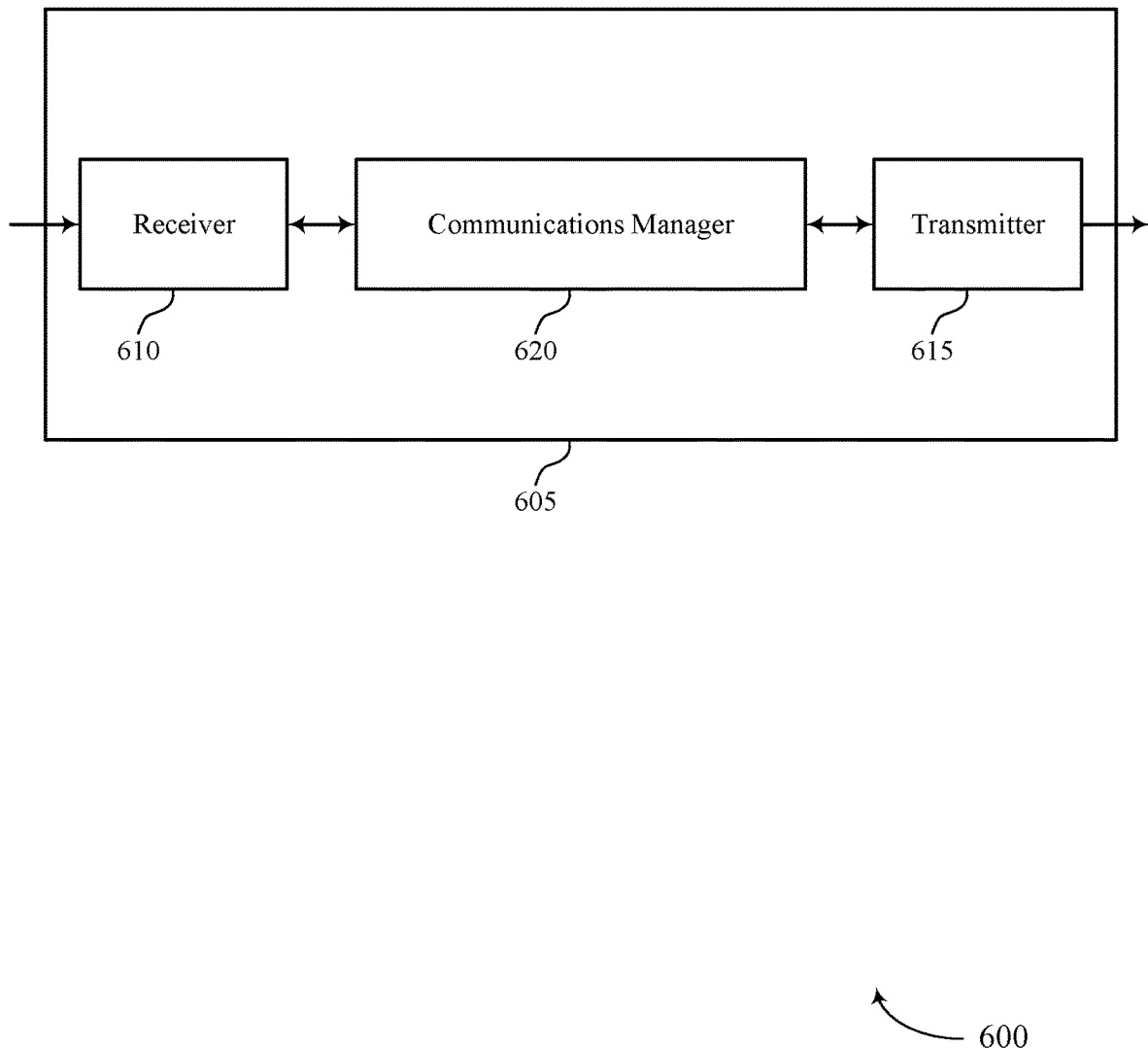
FIGS. 6 and 7 show block diagrams of devices that support techniques for communicating over asynchronous slots in accordance with aspects of the present disclosure.

FIG. 6 shows a block diagram 600 of a device 605 that supports techniques for communicating over asynchronous slots in accordance with aspects of the present disclosure. The device 605 may be an example of aspects of a base station 105 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to techniques for communicating over asynchronous slots). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to techniques for communicating over asynchronous slots). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of techniques for communicating over asynchronous slots as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 620 may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a first base station in accordance with examples as disclosed herein. For example, the communications manager 620 may be configured as or otherwise support a means for determining a change to a slot type of a slot of a slot pattern configuration associated with the first base station and a second base station, where a first beam at the first base station is set to interfere with a second beam at the second base station during the slot based on the change to the slot type of the slot. The communications manager 620 may be configured as or otherwise support a means for performing, based on determining the change to the slot type of the slot, a handshake procedure with the second base station to determine a set of communication parameters for communicating during the slot in accordance with the changed slot type. The communications manager 620 may be configured as or otherwise support a means for communicating one or more messages during the slot in accordance with the set of communication parameters based on the handshake procedure, the slot including an asynchronous slot.

Additionally or alternatively, the communications manager 620 may support wireless communication at a first base station in accordance with examples as disclosed herein. For example, the communications manager 620 may be configured as or otherwise support a means for receiving, from a second base station, a message indicating a change at the second base station to a slot type of a slot of a slot pattern configuration associated with the first base station and the second base station, where a first beam at the first base station is set to interfere with a second beam at the second base station during the slot based on the change to the slot type of the slot. The communications manager 620 may be configured as or otherwise support a means for performing, based on receiving the message indicating the change to the slot type of the slot, a handshake procedure with the second base station to determine a set of communication parameters for communicating during the slot in accordance with the changed slot type. The communications manager 620 may be configured as or otherwise support a means for communicating one or more messages during the slot in accordance with the set of communication parameters based on the handshake procedure, the slot including an asynchronous slot.

Additionally or alternatively, the communications manager 620 may support wireless communication at a base station in accordance with examples as disclosed herein. For example, the communications manager 620 may be configured as or otherwise support a means for transmitting, to a UE, a configuration message indicating a first TCI state associated with a first slot type and a second TCI state associated with a second slot type. The communications manager 620 may be configured as or otherwise support a means for transmitting, to the UE, a reference signal in a first slot associated with the first slot type. The communications manager 620 may be configured as or otherwise support a means for receiving, from the UE, an SRS associated with the first TCI state in a second slot associated with the first slot type based on the reference signal and the second slot being associated with the first slot type.

By including or configuring the communications manager 620 in accordance with examples as described herein, the device 605 (e.g., a processor controlling or otherwise coupled to the receiver 610, the transmitter 615, the communications manager 620, or a combination thereof) may support techniques for reduced processing and more efficient utilization of communication resources by managing asynchronous slot communications.

Figure 7:
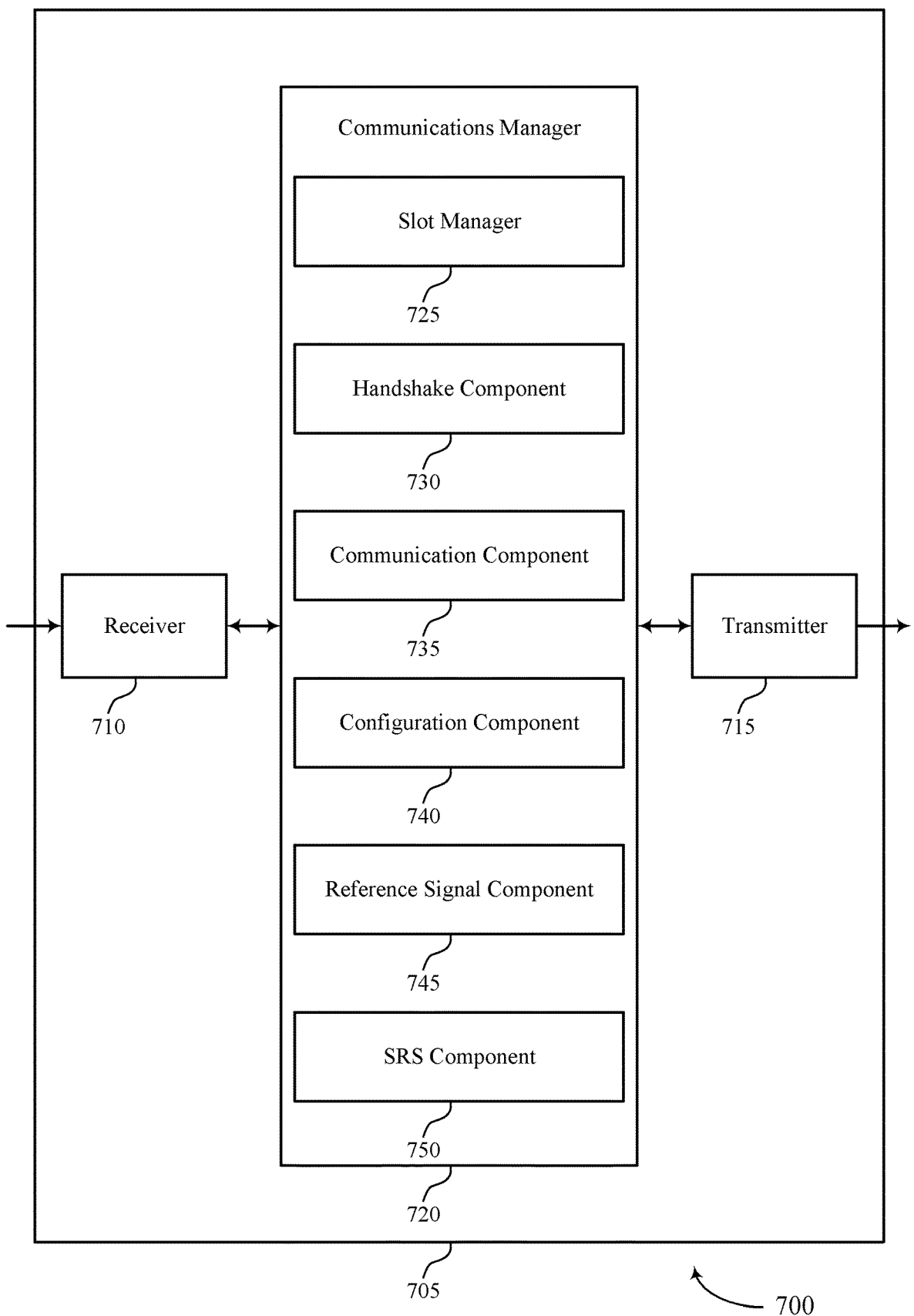

FIG. 7 shows a block diagram 700 of a device 705 that supports techniques for communicating over asynchronous slots in accordance with aspects of the present disclosure. The device 705 may be an example of aspects of a device 605 or a base station 105 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to techniques for communicating over asynchronous slots). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to techniques for communicating over asynchronous slots). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of techniques for communicating over asynchronous slots as described herein. For example, the communications manager 720 may include a slot manager 725, a handshake component 730, a communication component 735, a configuration component 740, a reference signal component 745, an SRS component 750, or any combination thereof. The communications manager 720 may be an example of aspects of a communications manager 620 as described herein. In some examples, the communications manager 720, or various components thereof, may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communication at a first base station in accordance with examples as disclosed herein. The slot manager 725 may be configured as or otherwise support a means for determining a change to a slot type of a slot of a slot pattern configuration associated with the first base station and a second base station, where a first beam at the first base station is set to interfere with a second beam at the second base station during the slot based on the change to the slot type of the slot. The handshake component 730 may be configured as or otherwise support a means for performing, based on determining the change to the slot type of the slot, a handshake procedure with the second base station to determine a set of communication parameters for communicating during the slot in accordance with the changed slot type. The communication component 735 may be configured as or otherwise support a means for communicating one or more messages during the slot in accordance with the set of communication parameters based on the handshake procedure, the slot including an asynchronous slot.

Additionally or alternatively, the communications manager 720 may support wireless communication at a first base station in accordance with examples as disclosed herein. The slot manager 725 may be configured as or otherwise support a means for receiving, from a second base station, a message indicating a change at the second base station to a slot type of a slot of a slot pattern configuration associated with the first base station and the second base station, where a first beam at the first base station is set to interfere with a second beam at the second base station during the slot based on the change to the slot type of the slot. The handshake component 730 may be configured as or otherwise support a means for performing, based on receiving the message indicating the change to the slot type of the slot, a handshake procedure with the second base station to determine a set of communication parameters for communicating during the slot in accordance with the changed slot type. The communication component 735 may be configured as or otherwise support a means for communicating one or more messages during the slot in accordance with the set of communication parameters based on the handshake procedure, the slot including an asynchronous slot.

Additionally or alternatively, the communications manager 720 may support wireless communication at a base station in accordance with examples as disclosed herein. The configuration component 740 may be configured as or otherwise support a means for transmitting, to a UE, a configuration message indicating a first TCI state associated with a first slot type and a second TCI state associated with a second slot type. The reference signal component 745 may be configured as or otherwise support a means for transmitting, to the UE, a reference signal in a first slot associated with the first slot type. The SRS component 750 may be configured as or otherwise support a means for receiving, from the UE, an SRS associated with the first TCI state in a second slot associated with the first slot type based on the reference signal and the second slot being associated with the first slot type.

Figure 8:
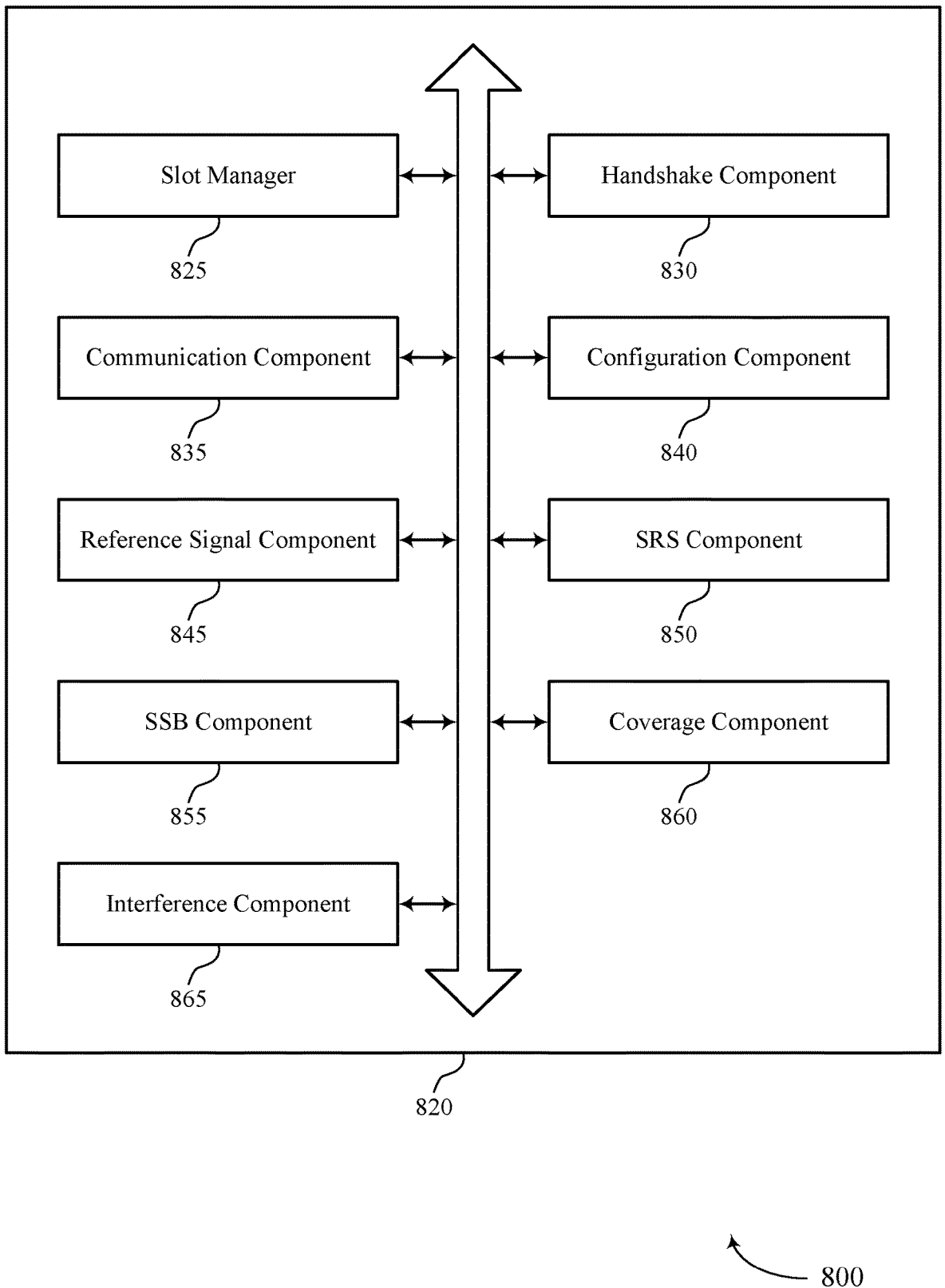
FIG. 8 shows a block diagram of a communications manager that supports techniques for communicating over asynchronous slots in accordance with aspects of the present disclosure.

FIG. 8 shows a block diagram 800 of a communications manager 820 that supports techniques for communicating over asynchronous slots in accordance with aspects of the present disclosure. The communications manager 820 may be an example of aspects of a communications manager 620, a communications manager 720, or both, as described herein. The communications manager 820, or various components thereof, may be an example of means for performing various aspects of techniques for communicating over asynchronous slots as described herein. For example, the communications manager 820 may include a slot manager 825, a handshake component 830, a communication component 835, a configuration component 840, a reference signal component 845, an SRS component 850, an SSB component 855, a coverage component 860, an interference component 865, or any combination thereof. Each of these components may communicate, directly or indirectly, with one another (e.g., via one or more buses).

The communications manager 820 may support wireless communication at a first base station in accordance with examples as disclosed herein. The slot manager 825 may be configured as or otherwise support a means for determining a change to a slot type of a slot of a slot pattern configuration associated with the first base station and a second base station, where a first beam at the first base station is set to interfere with a second beam at the second base station during the slot based on the change to the slot type of the slot. The handshake component 830 may be configured as or otherwise support a means for performing, based on determining the change to the slot type of the slot, a handshake procedure with the second base station to determine a set of communication parameters for communicating during the slot in accordance with the changed slot type. The communication component 835 may be configured as or otherwise support a means for communicating one or more messages during the slot in accordance with the set of communication parameters based on the handshake procedure, the slot including an asynchronous slot.

In some examples, the slot manager 825 may be configured as or otherwise support a means for transmitting, to the second base station, a message indicating the change to the slot type of the slot, where performing the handshake procedure is based on transmitting the message.

In some examples, the interference component 865 may be configured as or otherwise support a means for determining that an interference between a first set of beams at the first base station and a second set of beams at the second base station satisfies a threshold interference, the first set of beams including the first beam and the second set of beams including the second beam, where the message further indicates spatial information for at least some of the second set of beams.

In some examples, the message includes a set of beam identifiers each corresponding to a beam of the second set of beams.

In some examples, the message includes a RIM reference signal.

In some examples, the change to the slot type of the slot includes a change from a synchronous slot of the slot pattern configuration to the asynchronous slot.

In some examples, the slot manager 825 may be configured as or otherwise support a means for changing a slot type of one or more slots of the slot pattern configuration to a full-duplex mode. In some examples, the SSB component 855 may be configured as or otherwise support a means for receiving, from the second base station, one or more SSB messages during the one or more slots based on changing the slot type of the one or more slots to the full-duplex mode. In some examples, to perform the handshake procedure, the handshake component 830 may be configured as or otherwise support a means for selecting, based on the one or more SSB messages, one or more beam pairs associated with the first base station and the second base station for communicating during the slot.

In some examples, to support receiving the one or more SSB messages, the SSB component 855 may be configured as or otherwise support a means for receiving the one or more SSB messages using a set of beams at the first base station including the first beam, where one or more receive beams of the selected one or more beam pairs correspond to one or more beams of the set of beams.

In some examples, the set of communication parameters includes a restriction associated with using one or more beam pairs during the slot, a transmission power of the second beam during the slot, a restriction associated with scheduling one or more uplink messages during the slot, a restriction associated with using one or more combining matrices during the slot, or an indication to change the slot type of the slot back to an original slot type of the slot, or any combination thereof.

In some examples, the coverage component 860 may be configured as or otherwise support a means for adjusting a coverage zone associated with the first beam during the slot based on the handshake procedure and an interference between the first beam and the second beam satisfying a threshold interference.

In some examples, to support performing the handshake procedure with the second base station, the handshake component 830 may be configured as or otherwise support a means for initiating the handshake procedure in accordance with a periodicity associated with the handshake procedure to determine one or more beam pairs associated with the first base station and the second base station for communicating during asynchronous slots of the slot pattern configuration.

In some examples, the handshake procedure is performed over a backhaul link between the first base station and the second base station.

Additionally or alternatively, the communications manager 820 may support wireless communication at a first base station in accordance with examples as disclosed herein. In some examples, the slot manager 825 may be configured as or otherwise support a means for receiving, from a second base station, a message indicating a change at the second base station to a slot type of a slot of a slot pattern configuration associated with the first base station and the second base station, where a first beam at the first base station is set to interfere with a second beam at the second base station during the slot based on the change to the slot type of the slot. In some examples, the handshake component 830 may be configured as or otherwise support a means for performing, based on receiving the message indicating the change to the slot type of the slot, a handshake procedure with the second base station to determine a set of communication parameters for communicating during the slot in accordance with the changed slot type. In some examples, the communication component 835 may be configured as or otherwise support a means for communicating one or more messages during the slot in accordance with the set of communication parameters based on the handshake procedure, the slot including an asynchronous slot.

In some examples, the SSB component 855 may be configured as or otherwise support a means for transmitting, using a set of beams at the first base station including the first beam, one or more SSB messages during one or more slots. In some examples, to perform the handshake procedure, the handshake component 830 may be configured as or otherwise support a means for selecting, based on the one or more SSB messages, one or more beam pairs associated with the first base station and the second base station for communicating during the slot.

In some examples, the message further indicates a first set of beams at the first base station including the first beam based on an interference between the first set of beams and a second set of beams at the second base station satisfying a threshold interference, the second set of beams including the second beam.

In some examples, the message includes a set of beam identifiers each corresponding to a beam of the first set of beams.

In some examples, the set of communication parameters includes a restriction associated with using one or more beam pairs during the slot, a transmission power of the first beam during the slot, a restriction associated with scheduling one or more downlink messages during the slot, a restriction associated with using one or more precoding matrices during the slot, or an indication to change the slot type of the slot back to an original slot type of the slot, or any combination thereof.

In some examples, the coverage component 860 may be configured as or otherwise support a means for adjusting a coverage zone associated with the first beam during the slot based on the handshake procedure and an interference between the first beam and the second beam satisfying a threshold interference.

In some examples, the message includes a RIM reference signal.

Additionally or alternatively, the communications manager 820 may support wireless communication at a base station in accordance with examples as disclosed herein. The configuration component 840 may be configured as or otherwise support a means for transmitting, to a UE, a configuration message indicating a first TCI state associated with a first slot type and a second TCI state associated with a second slot type. The reference signal component 845 may be configured as or otherwise support a means for transmitting, to the UE, a reference signal in a first slot associated with the first slot type. The SRS component 850 may be configured as or otherwise support a means for receiving, from the UE, an SRS associated with the first TCI state in a second slot associated with the first slot type based on the reference signal and the second slot being associated with the first slot type.

In some examples, the configuration message further indicates a first set of SRS resources associated with the first slot type and a second set of SRS resources associated with the second slot type. In some examples, to support receiving the SRS, the SRS component 850 may be configured as or otherwise support a means for receiving the SRS using the first set of SRS resources based on the second slot being associated with the first slot type.

In some examples, the first set of SRS resources overlaps with the second set of SRS resources in a time domain.

In some examples, the reference signal component 845 may be configured as or otherwise support a means for transmitting, to the UE, a second reference signal in a third slot associated with the second slot type. In some examples, the SRS component 850 may be configured as or otherwise support a means for receiving, from the UE, a second SRS associated with the second TCI state in a fourth slot associated with the second slot type based on the second reference signal and the fourth slot being associated with the second slot type.

In some examples, the first slot type corresponds to a synchronous slot of a TDD slot pattern configuration and the second slot type corresponds to an asynchronous slot of the TDD slot pattern configuration.

In some examples, the first slot type corresponds to an asynchronous slot of a TDD slot pattern configuration and the second slot type corresponds to a synchronous slot of the TDD slot pattern configuration.

Figure 9:
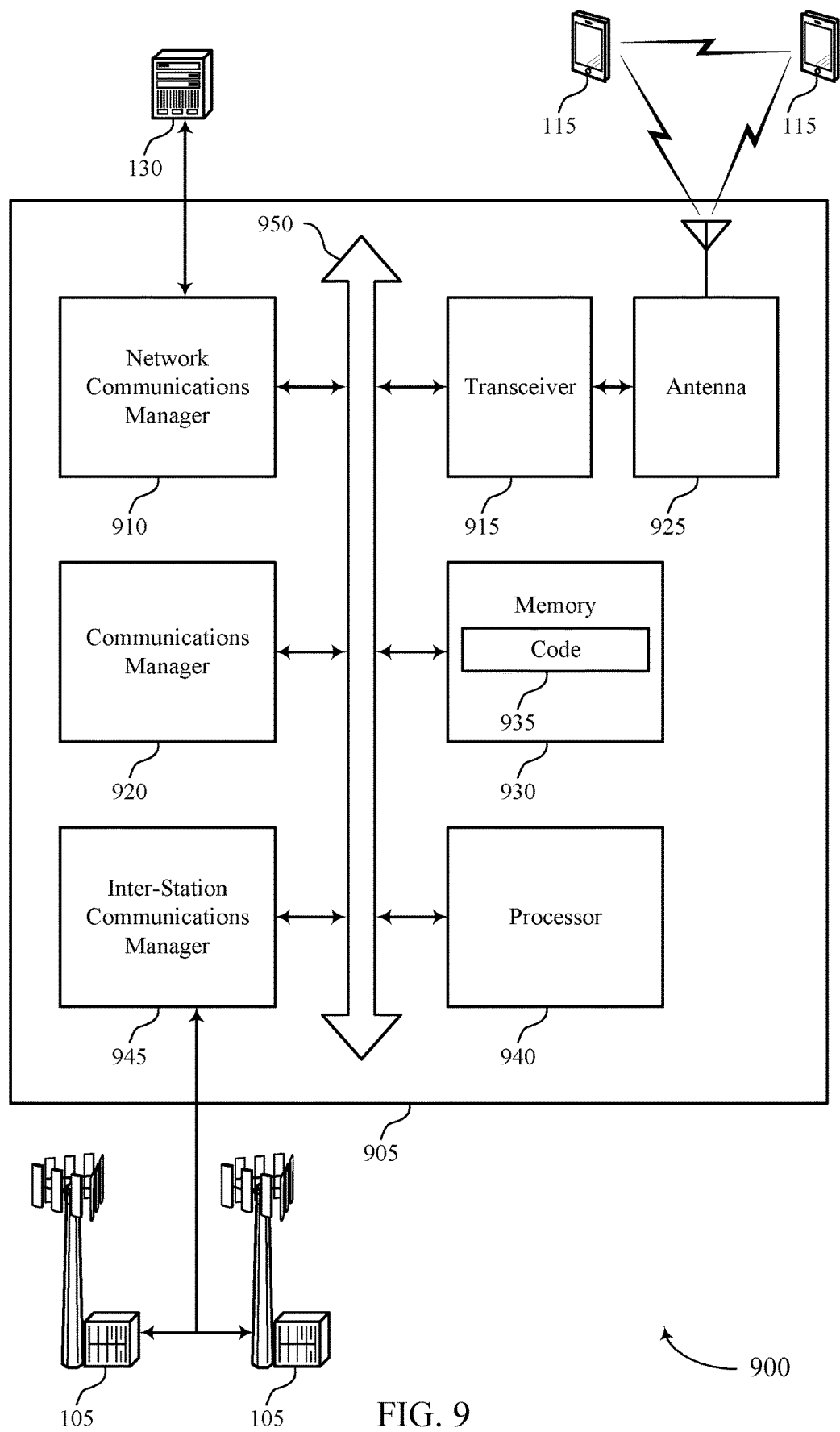
FIG. 9 shows a diagram of a system including a device that supports techniques for communicating over asynchronous slots in accordance with aspects of the present disclosure.

FIG. 9 shows a diagram of a system 900 including a device 905 that supports techniques for communicating over asynchronous slots in accordance with aspects of the present disclosure. The device 905 may be an example of or include the components of a device 605, a device 705, or a base station 105 as described herein. The device 905 may communicate wirelessly with one or more base stations 105, UEs 115, or any combination thereof. The device 905 may include components for bi-directional voice and data communications including components for transmitting and receiving communications, such as a communications manager 920, a network communications manager 910, a transceiver 915, an antenna 925, a memory 930, code 935, a processor 940, and an inter-station communications manager 945. These components may be in electronic communication or otherwise coupled (e.g., operatively, communicatively, functionally, electronically, electrically) via one or more buses (e.g., a bus 950).

The network communications manager 910 may manage communications with a core network 130 (e.g., via one or more wired backhaul links). For example, the network communications manager 910 may manage the transfer of data communications for client devices, such as one or more UEs 115.

In some cases, the device 905 may include a single antenna 925. However, in some other cases the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic input/output (I/O) system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting techniques for communicating over asynchronous slots). For example, the device 905 or a component of the device 905 may include a processor 940 and memory 930 coupled to the processor 940, the processor 940 and memory 930 configured to perform various functions described herein.

The inter-station communications manager 945 may manage communications with other base stations 105, and may include a controller or scheduler for controlling communications with UEs 115 in cooperation with other base stations 105. For example, the inter-station communications manager 945 may coordinate scheduling for transmissions to UEs 115 for various interference mitigation techniques such as beamforming or joint transmission. In some examples, the inter-station communications manager 945 may provide an X2 interface within an LTE/LTE-A wireless communications network technology to provide communication between base stations 105.

The communications manager 920 may support wireless communication at a first base station in accordance with examples as disclosed herein. For example, the communications manager 920 may be configured as or otherwise support a means for determining a change to a slot type of a slot of a slot pattern configuration associated with the first base station and a second base station, where a first beam at the first base station is set to interfere with a second beam at the second base station during the slot based on the change to the slot type of the slot. The communications manager 920 may be configured as or otherwise support a means for performing, based on determining the change to the slot type of the slot, a handshake procedure with the second base station to determine a set of communication parameters for communicating during the slot in accordance with the changed slot type. The communications manager 920 may be configured as or otherwise support a means for communicating one or more messages during the slot in accordance with the set of communication parameters based on the handshake procedure, the slot including an asynchronous slot.

Additionally or alternatively, the communications manager 920 may support wireless communication at a first base station in accordance with examples as disclosed herein. For example, the communications manager 920 may be configured as or otherwise support a means for receiving, from a second base station, a message indicating a change at the second base station to a slot type of a slot of a slot pattern configuration associated with the first base station and the second base station, where a first beam at the first base station is set to interfere with a second beam at the second base station during the slot based on the change to the slot type of the slot. The communications manager 920 may be configured as or otherwise support a means for performing, based on receiving the message indicating the change to the slot type of the slot, a handshake procedure with the second base station to determine a set of communication parameters for communicating during the slot in accordance with the changed slot type. The communications manager 920 may be configured as or otherwise support a means for communicating one or more messages during the slot in accordance with the set of communication parameters based on the handshake procedure, the slot including an asynchronous slot.

Additionally or alternatively, the communications manager 920 may support wireless communication at a base station in accordance with examples as disclosed herein. For example, the communications manager 920 may be configured as or otherwise support a means for transmitting, to a UE, a configuration message indicating a first TCI state associated with a first slot type and a second TCI state associated with a second slot type. The communications manager 920 may be configured as or otherwise support a means for transmitting, to the UE, a reference signal in a first slot associated with the first slot type. The communications manager 920 may be configured as or otherwise support a means for receiving, from the UE, an SRS associated with the first TCI state in a second slot associated with the first slot type based on the reference signal and the second slot being associated with the first slot type.

By including or configuring the communications manager 920 in accordance with examples as described herein, the device 905 may support techniques for improved reliability, latency, data rates, spectral efficiency, power consumption, resource utilization, coordination between devices, and processing capability, among other benefits.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of techniques for communicating over asynchronous slots as described herein, or the processor 940 and the memory 930 may be otherwise configured to perform or support such operations.

Figure 10:
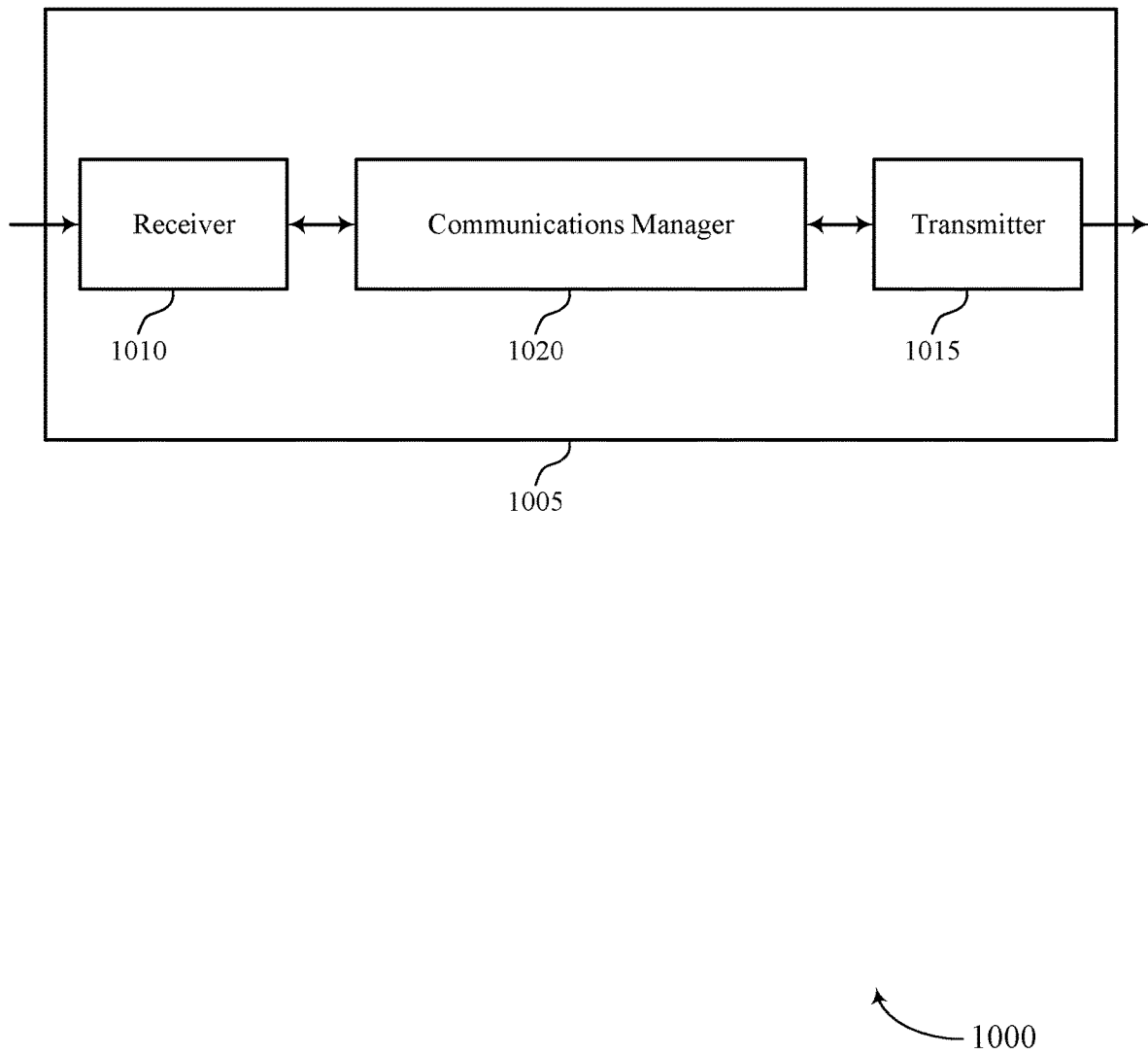
FIGS. 10 and 11 show block diagrams of devices that support techniques for communicating over asynchronous slots in accordance with aspects of the present disclosure.

FIG. 10 shows a block diagram 1000 of a device 1005 that supports techniques for communicating over asynchronous slots in accordance with aspects of the present disclosure. The device 1005 may be an example of aspects of a UE 115 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to techniques for communicating over asynchronous slots). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to techniques for communicating over asynchronous slots). In some examples, the transmitter 1015 may be co-located with a receiver 1010 in a transceiver module. The transmitter 1015 may utilize a single antenna or a set of multiple antennas.

The communications manager 1020, the receiver 1010, the transmitter 1015, or various combinations thereof or various components thereof may be examples of means for performing various aspects of techniques for communicating over asynchronous slots as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1020 may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communication at a UE in accordance with examples as disclosed herein. For example, the communications manager 1020 may be configured as or otherwise support a means for receiving, from a base station, a configuration message indicating a first TCI state associated with a first slot type and a second TCI state associated with a second slot type. The communications manager 1020 may be configured as or otherwise support a means for receiving, from the base station, a reference signal in a first slot associated with the first slot type. The communications manager 1020 may be configured as or otherwise support a means for transmitting an SRS associated with the first TCI state in a second slot associated with the first slot type based on the reference signal and the second slot being associated with the first slot type.

By including or configuring the communications manager 1020 in accordance with examples as described herein, the device 1005 (e.g., a processor controlling or otherwise coupled to the receiver 1010, the transmitter 1015, the communications manager 1020, or a combination thereof) may support techniques for reduced processing, reduced power consumption, and more efficient utilization of communication resources by communicating based on slot type.

Figure 11:
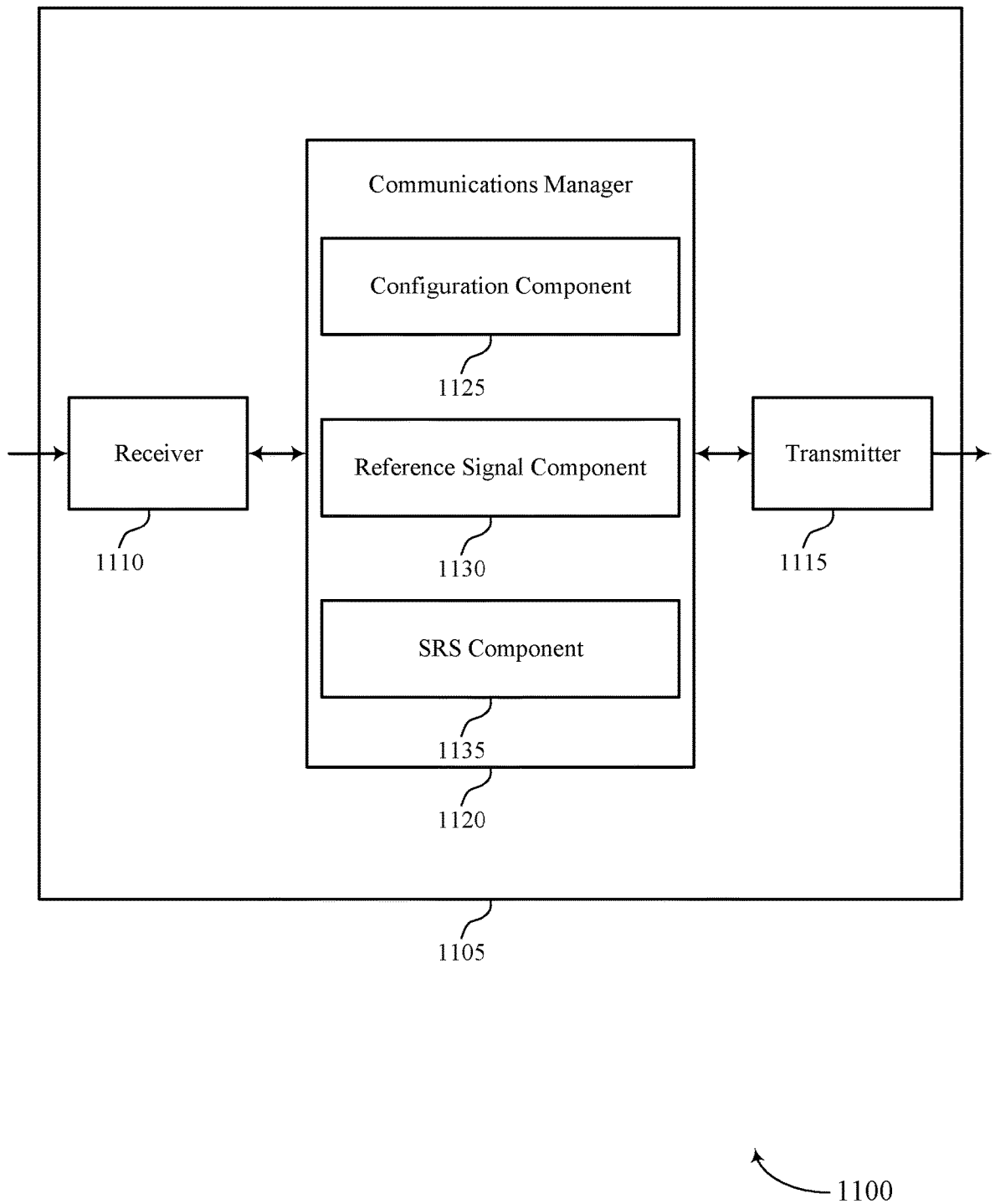

FIG. 11 shows a block diagram 1100 of a device 1105 that supports techniques for communicating over asynchronous slots in accordance with aspects of the present disclosure. The device 1105 may be an example of aspects of a device 1005 or a UE 115 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to techniques for communicating over asynchronous slots). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to techniques for communicating over asynchronous slots). In some examples, the transmitter 1115 may be co-located with a receiver 1110 in a transceiver module. The transmitter 1115 may utilize a single antenna or a set of multiple antennas.

The device 1105, or various components thereof, may be an example of means for performing various aspects of techniques for communicating over asynchronous slots as described herein. For example, the communications manager 1120 may include a configuration component 1125, a reference signal component 1130, an SRS component 1135, or any combination thereof. The communications manager 1120 may be an example of aspects of a communications manager 1020 as described herein. In some examples, the communications manager 1120, or various components thereof, may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communication at a UE in accordance with examples as disclosed herein. The configuration component 1125 may be configured as or otherwise support a means for receiving, from a base station, a configuration message indicating a first TCI state associated with a first slot type and a second TCI state associated with a second slot type. The reference signal component 1130 may be configured as or otherwise support a means for receiving, from the base station, a reference signal in a first slot associated with the first slot type. The SRS component 1135 may be configured as or otherwise support a means for transmitting an SRS associated with the first TCI state in a second slot associated with the first slot type based on the reference signal and the second slot being associated with the first slot type.

Figure 12:
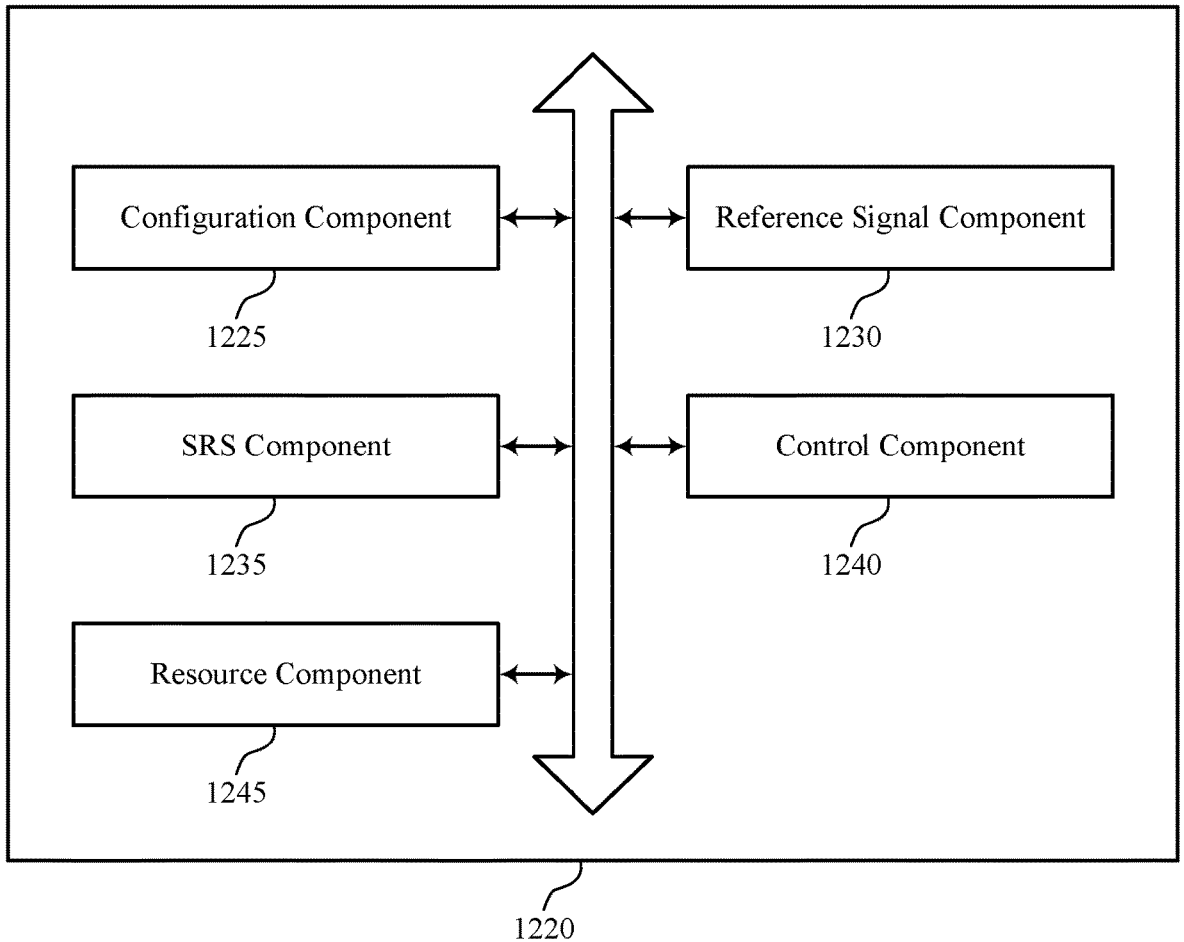
FIG. 12 shows a block diagram of a communications manager that supports techniques for communicating over asynchronous slots in accordance with aspects of the present disclosure.

FIG. 12 shows a block diagram 1200 of a communications manager 1220 that supports techniques for communicating over asynchronous slots in accordance with aspects of the present disclosure. The communications manager 1220 may be an example of aspects of a communications manager 1020, a communications manager 1120, or both, as described herein. The communications manager 1220, or various components thereof, may be an example of means for performing various aspects of techniques for communicating over asynchronous slots as described herein. For example, the communications manager 1220 may include a configuration component 1225, a reference signal component 1230, an SRS component 1235, a control component 1240, a resource component 1245, or any combination thereof. Each of these components may communicate, directly or indirectly, with one another (e.g., via one or more buses).

The communications manager 1220 may support wireless communication at a UE in accordance with examples as disclosed herein. The configuration component 1225 may be configured as or otherwise support a means for receiving, from a base station, a configuration message indicating a first TCI state associated with a first slot type and a second TCI state associated with a second slot type. The reference signal component 1230 may be configured as or otherwise support a means for receiving, from the base station, a reference signal in a first slot associated with the first slot type. The SRS component 1235 may be configured as or otherwise support a means for transmitting an SRS associated with the first TCI state in a second slot associated with the first slot type based on the reference signal and the second slot being associated with the first slot type.

In some examples, the configuration message further indicates a first set of SRS resources associated with the first slot type and a second set of SRS resources associated with the second slot type. In some examples, to support transmitting the SRS, the SRS component 1235 may be configured as or otherwise support a means for transmitting the SRS using the first set of SRS resources based on the second slot being associated with the first slot type.

In some examples, the resource component 1245 may be configured as or otherwise support a means for dropping the second set of SRS resources based on the second slot being associated with the first slot type.

In some examples, the first set of SRS resources overlaps with the second set of SRS resources in a time domain.

In some examples, the reference signal component 1230 may be configured as or otherwise support a means for receiving, from the base station, a second reference signal in a third slot associated with the second slot type. In some examples, the SRS component 1235 may be configured as or otherwise support a means for transmitting a second SRS associated with the second TCI state in a fourth slot associated with the second slot type based on the second reference signal and the fourth slot being associated with the second slot type.

In some examples, to support transmitting the second SRS, the SRS component 1235 may be configured as or otherwise support a means for transmitting the second SRS in the fourth slot using a first resource associated with a same time-frequency location within a slot as a second resource used to transmit the SRS in the second slot.

In some examples, the control component 1240 may be configured as or otherwise support a means for receiving, from the base station, a control message indicating that the first slot is associated with the first slot type and the second slot is associated with the second slot type.

In some examples, the reference signal component 1230 may be configured as or otherwise support a means for selecting, based on the second slot being associated with the first slot type, the reference signal from a set of reference signals received from the base station to determine the first TCI state.

In some examples, the first slot type corresponds to a synchronous slot of a TDD slot pattern configuration and the second slot type corresponds to an asynchronous slot of the TDD slot pattern configuration.

In some examples, the first slot type corresponds to an asynchronous slot of a TDD slot pattern configuration and the second slot type corresponds to a synchronous slot of the TDD slot pattern configuration.

Figure 13:
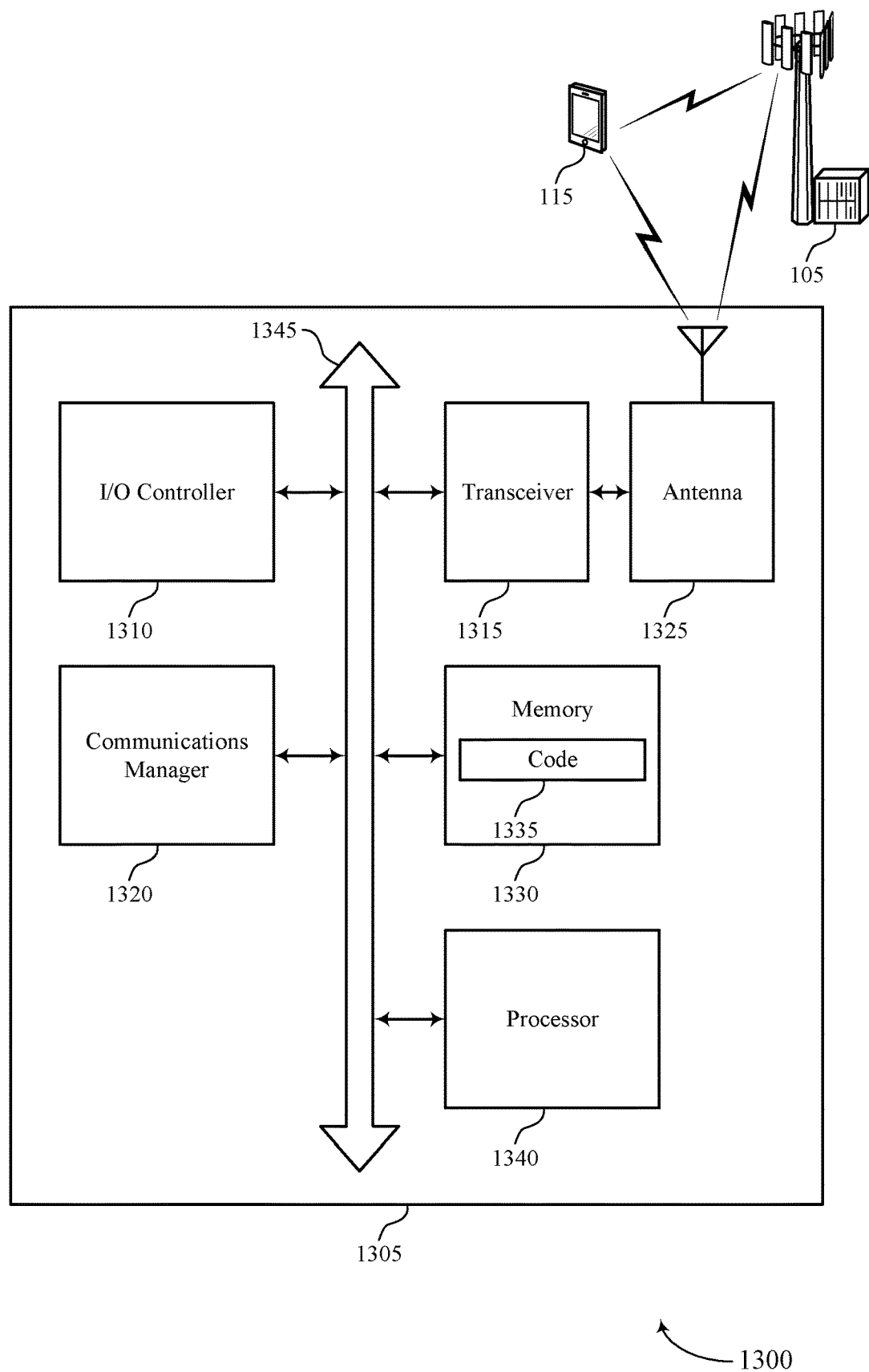
FIG. 13 shows a diagram of a system including a device that supports techniques for communicating over asynchronous slots in accordance with aspects of the present disclosure.

FIG. 13 shows a diagram of a system 1300 including a device 1305 that supports techniques for communicating over asynchronous slots in accordance with aspects of the present disclosure. The device 1305 may be an example of or include the components of a device 1005, a device 1105, or a UE 115 as described herein. The device 1305 may communicate wirelessly with one or more base stations 105, UEs 115, or any combination thereof. The device 1305 may include components for bi-directional voice and data communications including components for transmitting and receiving communications, such as a communications manager 1320, an I/O controller 1310, a transceiver 1315, an antenna 1325, a memory 1330, code 1335, and a processor 1340. These components may be in electronic communication or otherwise coupled (e.g., operatively, communicatively, functionally, electronically, electrically) via one or more buses (e.g., a bus 1345).

The I/O controller 1310 may manage input and output signals for the device 1305. The I/O controller 1310 may also manage peripherals not integrated into the device 1305. In some cases, the I/O controller 1310 may represent a physical connection or port to an external peripheral. In some cases, the I/O controller 1310 may utilize an operating system such as iOS®, ANDROID®, MS-DOS®, MS-WINDOWS®, OS/2®, UNIX®, LINUX®, or another known operating system. Additionally or alternatively, the I/O controller 1310 may represent or interact with a modem, a keyboard, a mouse, a touchscreen, or a similar device. In some cases, the I/O controller 1310 may be implemented as part of a processor, such as the processor 1340. In some cases, a user may interact with the device 1305 via the I/O controller 1310 or via hardware components controlled by the I/O controller 1310.

In some cases, the device 1305 may include a single antenna 1325. However, in some other cases, the device 1305 may have more than one antenna 1325, which may be capable of concurrently transmitting or receiving multiple wireless transmissions. The transceiver 1315 may communicate bi-directionally, via the one or more antennas 1325, wired, or wireless links as described herein. For example, the transceiver 1315 may represent a wireless transceiver and may communicate bi-directionally with another wireless transceiver. The transceiver 1315 may also include a modem to modulate the packets, to provide the modulated packets to one or more antennas 1325 for transmission, and to demodulate packets received from the one or more antennas 1325. The transceiver 1315, or the transceiver 1315 and one or more antennas 1325, may be an example of a transmitter 1015, a transmitter 1115, a receiver 1010, a receiver 1110, or any combination thereof or component thereof, as described herein.

The memory 1330 may include RAM and ROM. The memory 1330 may store computer-readable, computer-executable code 1335 including instructions that, when executed by the processor 1340, cause the device 1305 to perform various functions described herein. The code 1335 may be stored in a non-transitory computer-readable medium such as system memory or another type of memory. In some cases, the code 1335 may not be directly executable by the processor 1340 but may cause a computer (e.g., when compiled and executed) to perform functions described herein. In some cases, the memory 1330 may contain, among other things, a BIOS which may control basic hardware or software operation such as the interaction with peripheral components or devices.

The processor 1340 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some other cases, a memory controller may be integrated into the processor 1340. The processor 1340 may be configured to execute computer-readable instructions stored in a memory (e.g., the memory 1330) to cause the device 1305 to perform various functions (e.g., functions or tasks supporting techniques for communicating over asynchronous slots). For example, the device 1305 or a component of the device 1305 may include a processor 1340 and memory 1330 coupled to the processor 1340, the processor 1340 and memory 1330 configured to perform various functions described herein.

The communications manager 1320 may support wireless communication at a UE in accordance with examples as disclosed herein. For example, the communications manager 1320 may be configured as or otherwise support a means for receiving, from a base station, a configuration message indicating a first TCI state associated with a first slot type and a second TCI state associated with a second slot type. The communications manager 1320 may be configured as or otherwise support a means for receiving, from the base station, a reference signal in a first slot associated with the first slot type. The communications manager 1320 may be configured as or otherwise support a means for transmitting an SRS associated with the first TCI state in a second slot associated with the first slot type based on the reference signal and the second slot being associated with the first slot type.

By including or configuring the communications manager 1320 in accordance with examples as described herein, the device 1305 may support techniques for improved reliability, latency, data rates, spectral efficiency, power consumption, resource utilization, coordination between devices, battery life, and processing capability, among other benefits.

In some examples, the communications manager 1320 may be configured to perform various operations (e.g., receiving, monitoring, transmitting) using or otherwise in cooperation with the transceiver 1315, the one or more antennas 1325, or any combination thereof. Although the communications manager 1320 is illustrated as a separate component, in some examples, one or more functions described with reference to the communications manager 1320 may be supported by or performed by the processor 1340, the memory 1330, the code 1335, or any combination thereof. For example, the code 1335 may include instructions executable by the processor 1340 to cause the device 1305 to perform various aspects of techniques for communicating over asynchronous slots as described herein, or the processor 1340 and the memory 1330 may be otherwise configured to perform or support such operations.

Figure 14:
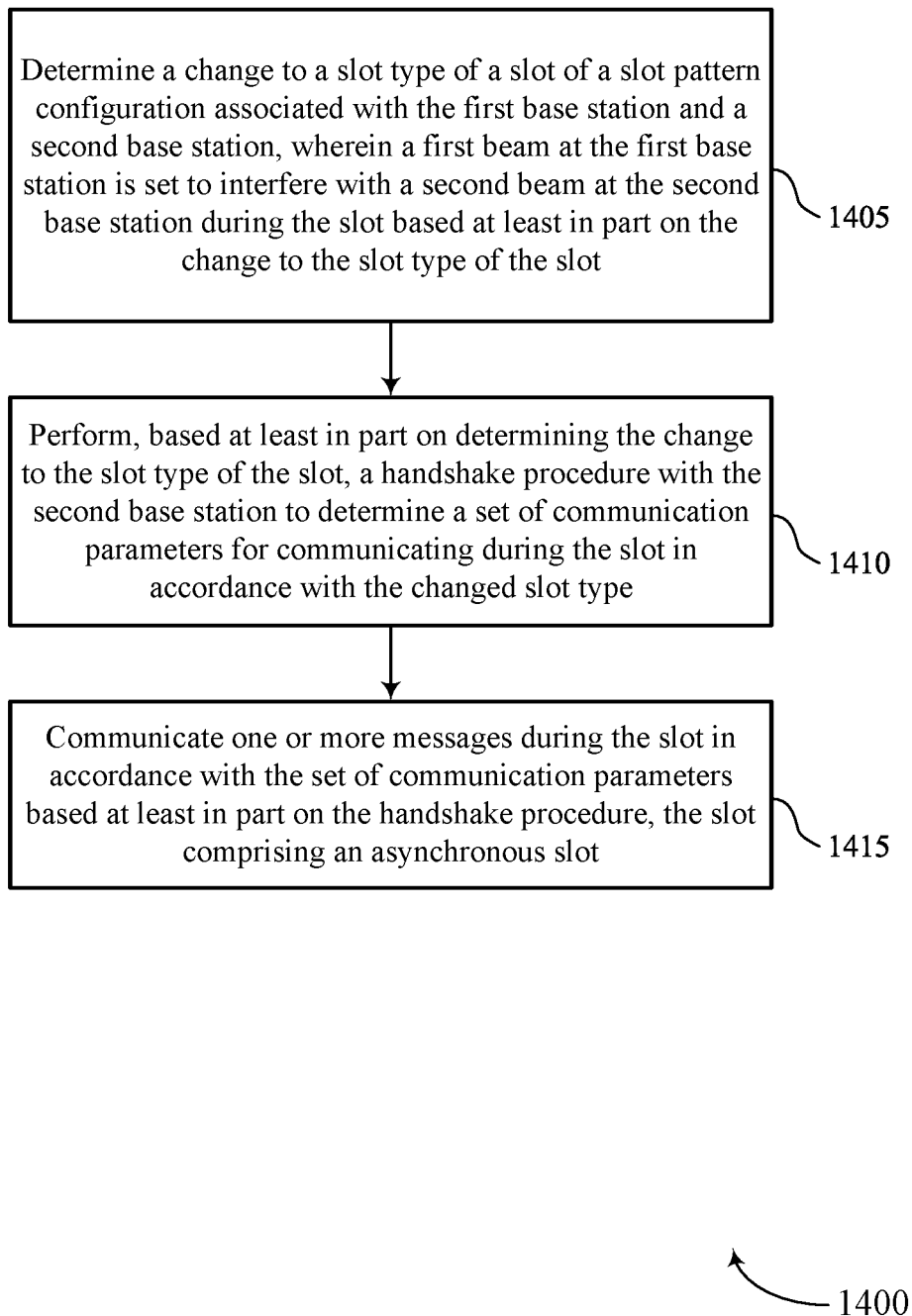
FIGS. 14 through 23 show flowcharts illustrating methods that support techniques for communicating over asynchronous slots in accordance with aspects of the present disclosure.

FIG. 14 shows a flowchart illustrating a method 1400 that supports techniques for communicating over asynchronous slots in accordance with aspects of the present disclosure. The operations of the method 1400 may be implemented by a base station or its components as described herein. For example, the operations of the method 1400 may be performed by a first base station 105 as described with reference to FIGS. 1 through 9. In some examples, a base station may execute a set of instructions to control the functional elements of the base station to perform the described functions. Additionally or alternatively, the base station may perform aspects of the described functions using special-purpose hardware.

At 1405, the method may include determining a change to a slot type of a slot of a slot pattern configuration associated with the first base station and a second base station, where a first beam at the first base station is set to interfere with a second beam at the second base station during the slot based on the change to the slot type of the slot. The operations of 1405 may be performed in accordance with examples as disclosed herein. In some examples, aspects of the operations of 1405 may be performed by a slot manager 825 as described with reference to FIG. 8.

At 1410, the method may include performing, based on determining the change to the slot type of the slot, a handshake procedure with the second base station to determine a set of communication parameters for communicating during the slot in accordance with the changed slot type. The operations of 1410 may be performed in accordance with examples as disclosed herein. In some examples, aspects of the operations of 1410 may be performed by a handshake component 830 as described with reference to FIG. 8.

At 1415, the method may include communicating one or more messages during the slot in accordance with the set of communication parameters based on the handshake procedure, the slot including an asynchronous slot. The operations of 1415 may be performed in accordance with examples as disclosed herein. In some examples, aspects of the operations of 1415 may be performed by a communication component 835 as described with reference to FIG. 8.

Figure 15:
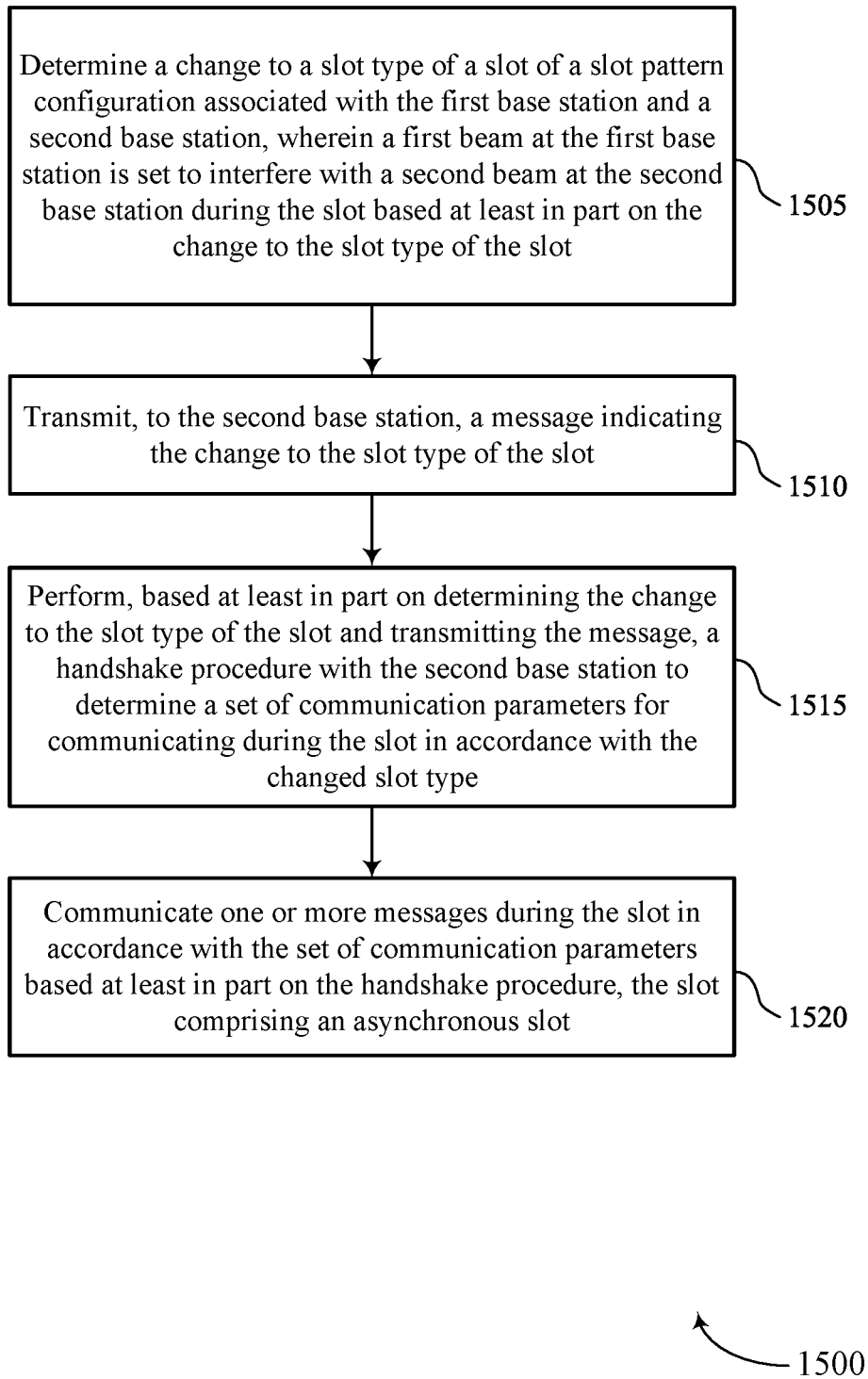

FIG. 15 shows a flowchart illustrating a method 1500 that supports techniques for communicating over asynchronous slots in accordance with aspects of the present disclosure. The operations of the method 1500 may be implemented by a base station or its components as described herein. For example, the operations of the method 1500 may be performed by a first base station 105 as described with reference to FIGS. 1 through 9. In some examples, a base station may execute a set of instructions to control the functional elements of the base station to perform the described functions. Additionally or alternatively, the base station may perform aspects of the described functions using special-purpose hardware.

At 1505, the method may include determining a change to a slot type of a slot of a slot pattern configuration associated with the first base station and a second base station, where a first beam at the first base station is set to interfere with a second beam at the second base station during the slot based on the change to the slot type of the slot. The operations of 1505 may be performed in accordance with examples as disclosed herein. In some examples, aspects of the operations of 1505 may be performed by a slot manager 825 as described with reference to FIG. 8.

At 1510, the method may include transmitting, to the second base station, a message indicating the change to the slot type of the slot. The operations of 1510 may be performed in accordance with examples as disclosed herein. In some examples, aspects of the operations of 1510 may be performed by a slot manager 825 as described with reference to FIG. 8.

At 1515, the method may include performing, based on determining the change to the slot type of the slot and transmitting the message, a handshake procedure with the second base station to determine a set of communication parameters for communicating during the slot in accordance with the changed slot type. The operations of 1515 may be performed in accordance with examples as disclosed herein. In some examples, aspects of the operations of 1515 may be performed by a handshake component 830 as described with reference to FIG. 8.

At 1520, the method may include communicating one or more messages during the slot in accordance with the set of communication parameters based on the handshake procedure, the slot including an asynchronous slot. The operations of 1520 may be performed in accordance with examples as disclosed herein. In some examples, aspects of the operations of 1520 may be performed by a communication component 835 as described with reference to FIG. 8.

Figure 16:
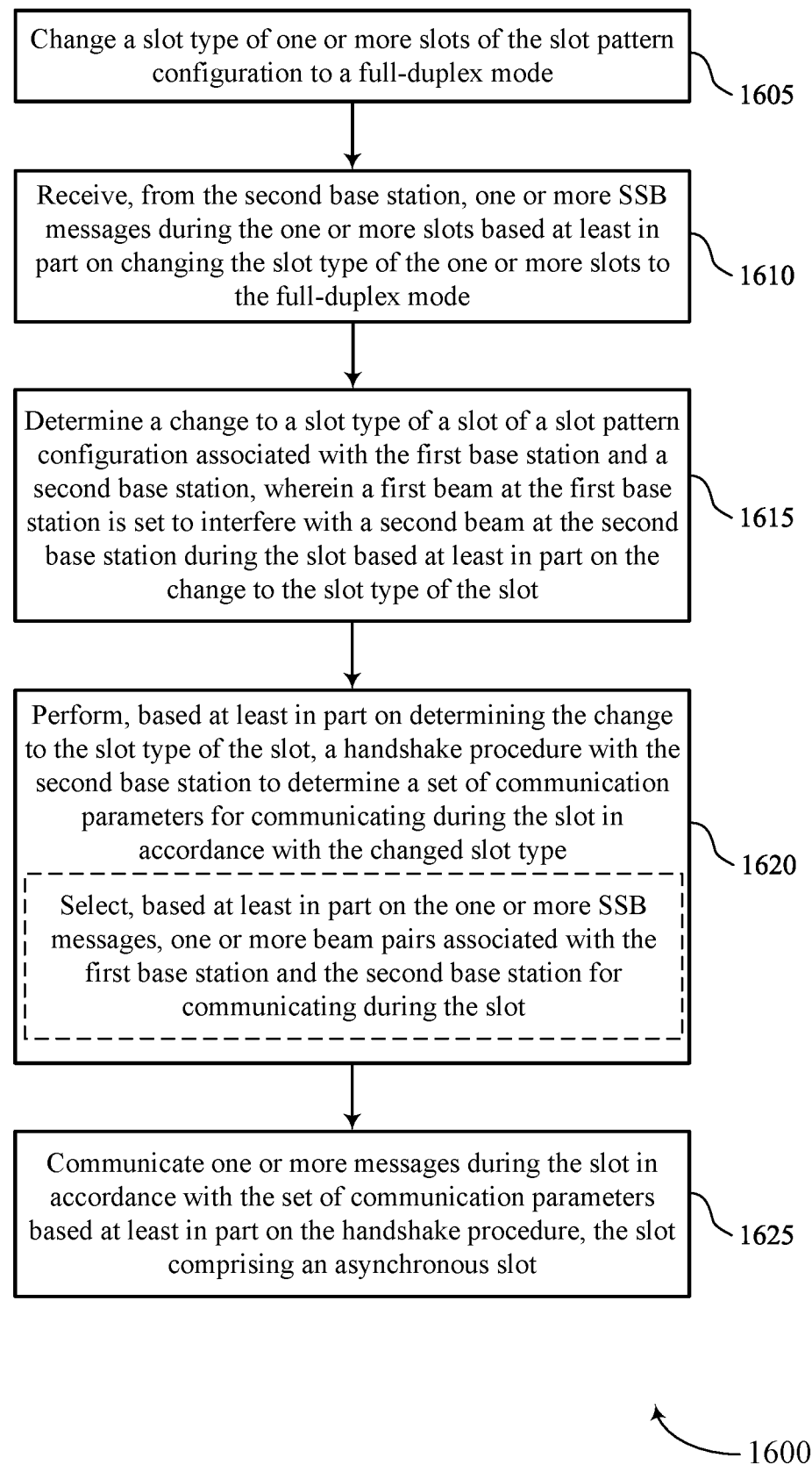

FIG. 16 shows a flowchart illustrating a method 1600 that supports techniques for communicating over asynchronous slots in accordance with aspects of the present disclosure. The operations of the method 1600 may be implemented by a base station or its components as described herein. For example, the operations of the method 1600 may be performed by a first base station 105 as described with reference to FIGS. 1 through 9. In some examples, a base station may execute a set of instructions to control the functional elements of the base station to perform the described functions. Additionally or alternatively, the base station may perform aspects of the described functions using special-purpose hardware.

At 1605, the method may include changing a slot type of one or more slots of the slot pattern configuration to a full-duplex mode. The operations of 1605 may be performed in accordance with examples as disclosed herein. In some examples, aspects of the operations of 1605 may be performed by a slot manager 825 as described with reference to FIG. 8.

At 1610, the method may include receiving, from the second base station, one or more SSB messages during the one or more slots based on changing the slot type of the one or more slots to the full-duplex mode. The operations of 1610 may be performed in accordance with examples as disclosed herein. In some examples, aspects of the operations of 1610 may be performed by an SSB component 855 as described with reference to FIG. 8.

At 1615, the method may include determining a change to a slot type of a slot of a slot pattern configuration associated with the first base station and a second base station, where a first beam at the first base station is set to interfere with a second beam at the second base station during the slot based on the change to the slot type of the slot. The operations of 1615 may be performed in accordance with examples as disclosed herein. In some examples, aspects of the operations of 1615 may be performed by a slot manager 825 as described with reference to FIG. 8.

At 1620, the method may include performing, based on determining the change to the slot type of the slot, a handshake procedure with the second base station to determine a set of communication parameters for communicating during the slot in accordance with the changed slot type. In some examples, performing the handshake procedure may include selecting, based on the one or more SSB messages, one or more beam pairs associated with the first base station and the second base station for communicating during the slot. The operations of 1620 may be performed in accordance with examples as disclosed herein. In some examples, aspects of the operations of 1620 may be performed by a handshake component 830 as described with reference to FIG. 8.

At 1625, the method may include communicating one or more messages during the slot in accordance with the set of communication parameters based on the handshake procedure, the slot including an asynchronous slot. The operations of 1625 may be performed in accordance with examples as disclosed herein. In some examples, aspects of the operations of 1625 may be performed by a communication component 835 as described with reference to FIG. 8.

Figure 17:
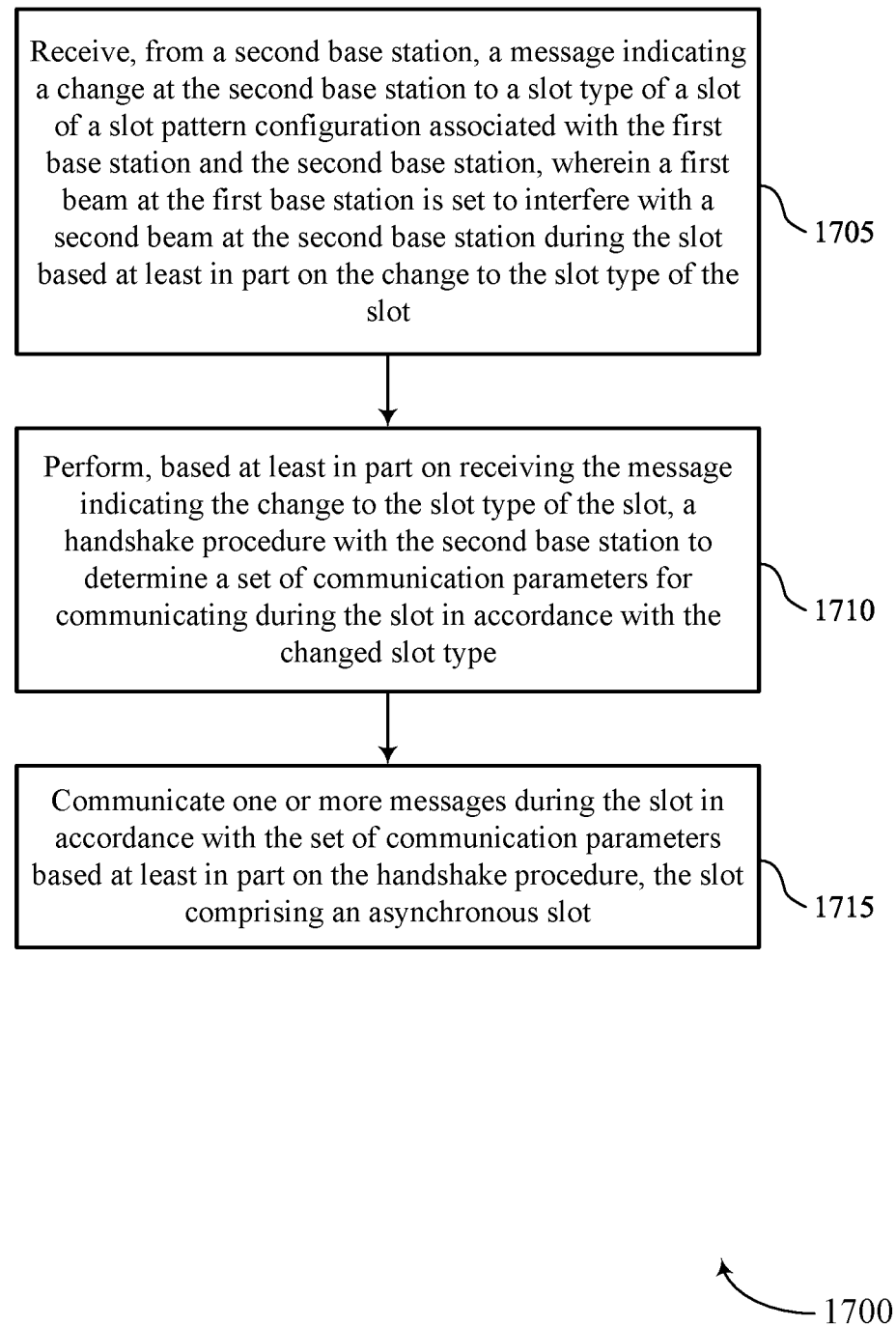

FIG. 17 shows a flowchart illustrating a method 1700 that supports techniques for communicating over asynchronous slots in accordance with aspects of the present disclosure. The operations of the method 1700 may be implemented by a base station or its components as described herein. For example, the operations of the method 1700 may be performed by a first base station 105 as described with reference to FIGS. 1 through 9. In some examples, a base station may execute a set of instructions to control the functional elements of the base station to perform the described functions. Additionally or alternatively, the base station may perform aspects of the described functions using special-purpose hardware.

At 1705, the method may include receiving, from a second base station, a message indicating a change at the second base station to a slot type of a slot of a slot pattern configuration associated with the first base station and the second base station, where a first beam at the first base station is set to interfere with a second beam at the second base station during the slot based on the change to the slot type of the slot. The operations of 1705 may be performed in accordance with examples as disclosed herein. In some examples, aspects of the operations of 1705 may be performed by a slot manager 825 as described with reference to FIG. 8.

At 1710, the method may include performing, based on receiving the message indicating the change to the slot type of the slot, a handshake procedure with the second base station to determine a set of communication parameters for communicating during the slot in accordance with the changed slot type. The operations of 1710 may be performed in accordance with examples as disclosed herein. In some examples, aspects of the operations of 1710 may be performed by a handshake component 830 as described with reference to FIG. 8.

At 1715, the method may include communicating one or more messages during the slot in accordance with the set of communication parameters based on the handshake procedure, the slot including an asynchronous slot. The operations of 1715 may be performed in accordance with examples as disclosed herein. In some examples, aspects of the operations of 1715 may be performed by a communication component 835 as described with reference to FIG. 8.

Figure 18:
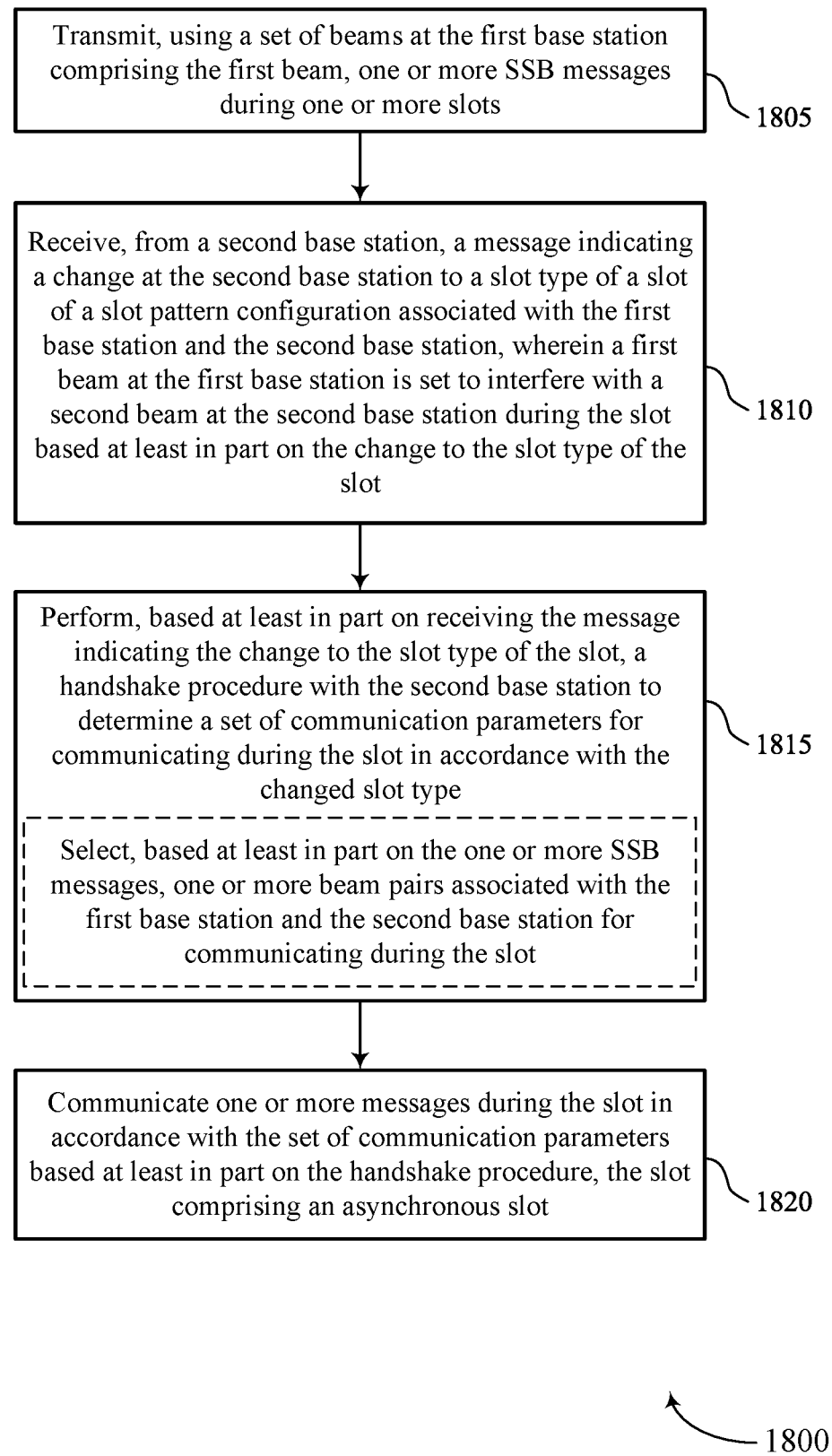

FIG. 18 shows a flowchart illustrating a method 1800 that supports techniques for communicating over asynchronous slots in accordance with aspects of the present disclosure. The operations of the method 1800 may be implemented by a base station or its components as described herein. For example, the operations of the method 1800 may be performed by a base station 105 as described with reference to FIGS. 1 through 9. In some examples, a base station may execute a set of instructions to control the functional elements of the base station to perform the described functions. Additionally or alternatively, the base station may perform aspects of the described functions using special-purpose hardware.

At 1805, the method may include transmitting, using a set of beams at the first base station including the first beam, one or more SSB messages during one or more slots. The operations of 1805 may be performed in accordance with examples as disclosed herein. In some examples, aspects of the operations of 1805 may be performed by an SSB component 855 as described with reference to FIG. 8.

At 1810, the method may include receiving, from a second base station, a message indicating a change at the second base station to a slot type of a slot of a slot pattern configuration associated with the first base station and the second base station, where a first beam at the first base station is set to interfere with a second beam at the second base station during the slot based on the change to the slot type of the slot. The operations of 1810 may be performed in accordance with examples as disclosed herein. In some examples, aspects of the operations of 1810 may be performed by a slot manager 825 as described with reference to FIG. 8.

At 1815, the method may include performing, based on receiving the message indicating the change to the slot type of the slot, a handshake procedure with the second base station to determine a set of communication parameters for communicating during the slot in accordance with the changed slot type. In some examples, performing the handshake procedure may include selecting, based on the one or more SSB messages, one or more beam pairs associated with the first base station and the second base station for communicating during the slot. The operations of 1815 may be performed in accordance with examples as disclosed herein. In some examples, aspects of the operations of 1815 may be performed by a handshake component 830 as described with reference to FIG. 8.

At 1820, the method may include communicating one or more messages during the slot in accordance with the set of communication parameters based on the handshake procedure, the slot including an asynchronous slot. The operations of 1820 may be performed in accordance with examples as disclosed herein. In some examples, aspects of the operations of 1820 may be performed by a communication component 835 as described with reference to FIG. 8.

Figure 19:
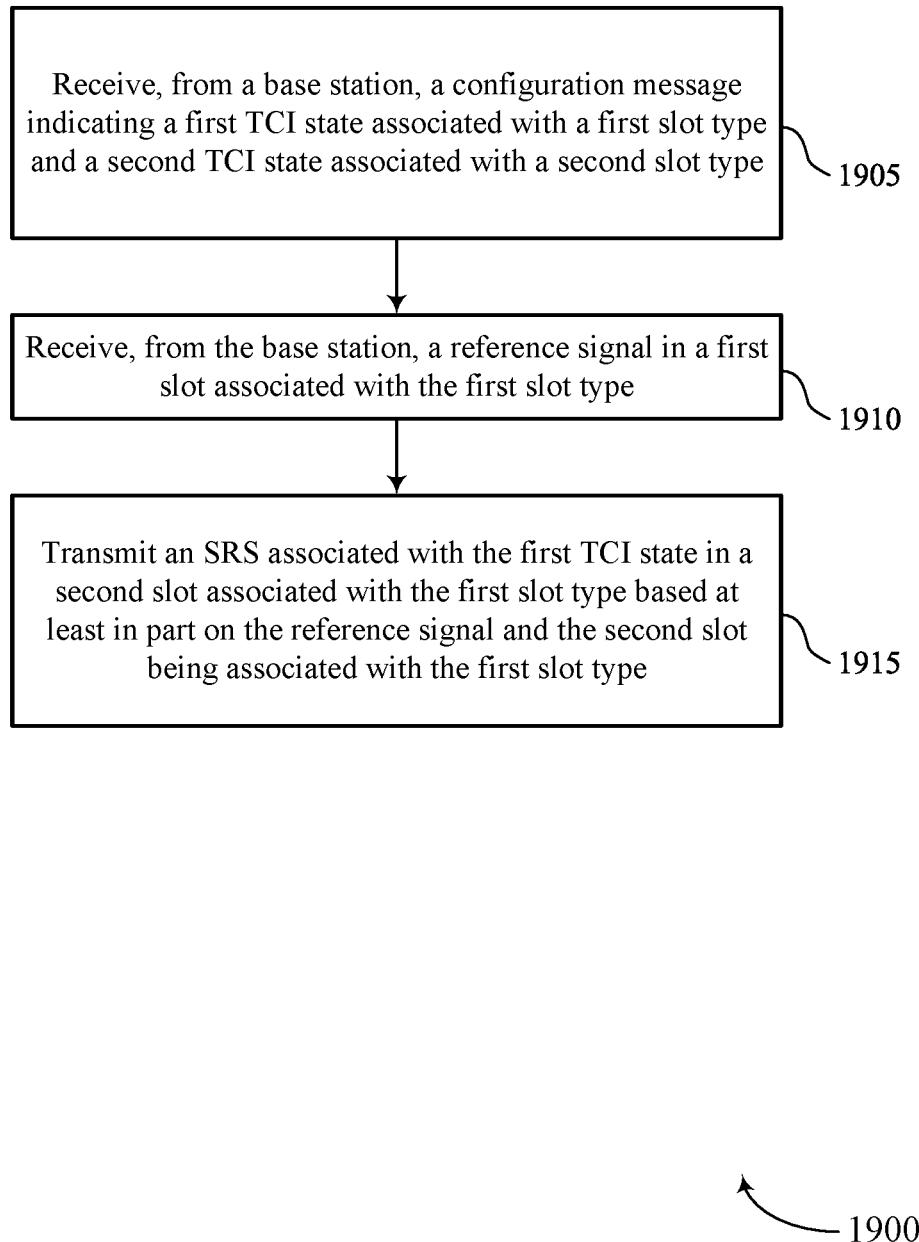

FIG. 19 shows a flowchart illustrating a method 1900 that supports techniques for communicating over asynchronous slots in accordance with aspects of the present disclosure. The operations of the method 1900 may be implemented by a UE or its components as described herein. For example, the operations of the method 1900 may be performed by a UE 115 as described with reference to FIGS. 1 through 5 and 10 through 13. In some examples, a UE may execute a set of instructions to control the functional elements of the UE to perform the described functions. Additionally or alternatively, the UE may perform aspects of the described functions using special-purpose hardware.

At 1905, the method may include receiving, from a base station, a configuration message indicating a first TCI state associated with a first slot type and a second TCI state associated with a second slot type. The operations of 1905 may be performed in accordance with examples as disclosed herein. In some examples, aspects of the operations of 1905 may be performed by a configuration component 1225 as described with reference to FIG. 12.

At 1910, the method may include receiving, from the base station, a reference signal in a first slot associated with the first slot type. The operations of 1910 may be performed in accordance with examples as disclosed herein. In some examples, aspects of the operations of 1910 may be performed by a reference signal component 1230 as described with reference to FIG. 12.

At 1915, the method may include transmitting an SRS associated with the first TCI state in a second slot associated with the first slot type based on the reference signal and the second slot being associated with the first slot type. The operations of 1915 may be performed in accordance with examples as disclosed herein. In some examples, aspects of the operations of 1915 may be performed by an SRS component 1235 as described with reference to FIG. 12.

Figure 20:
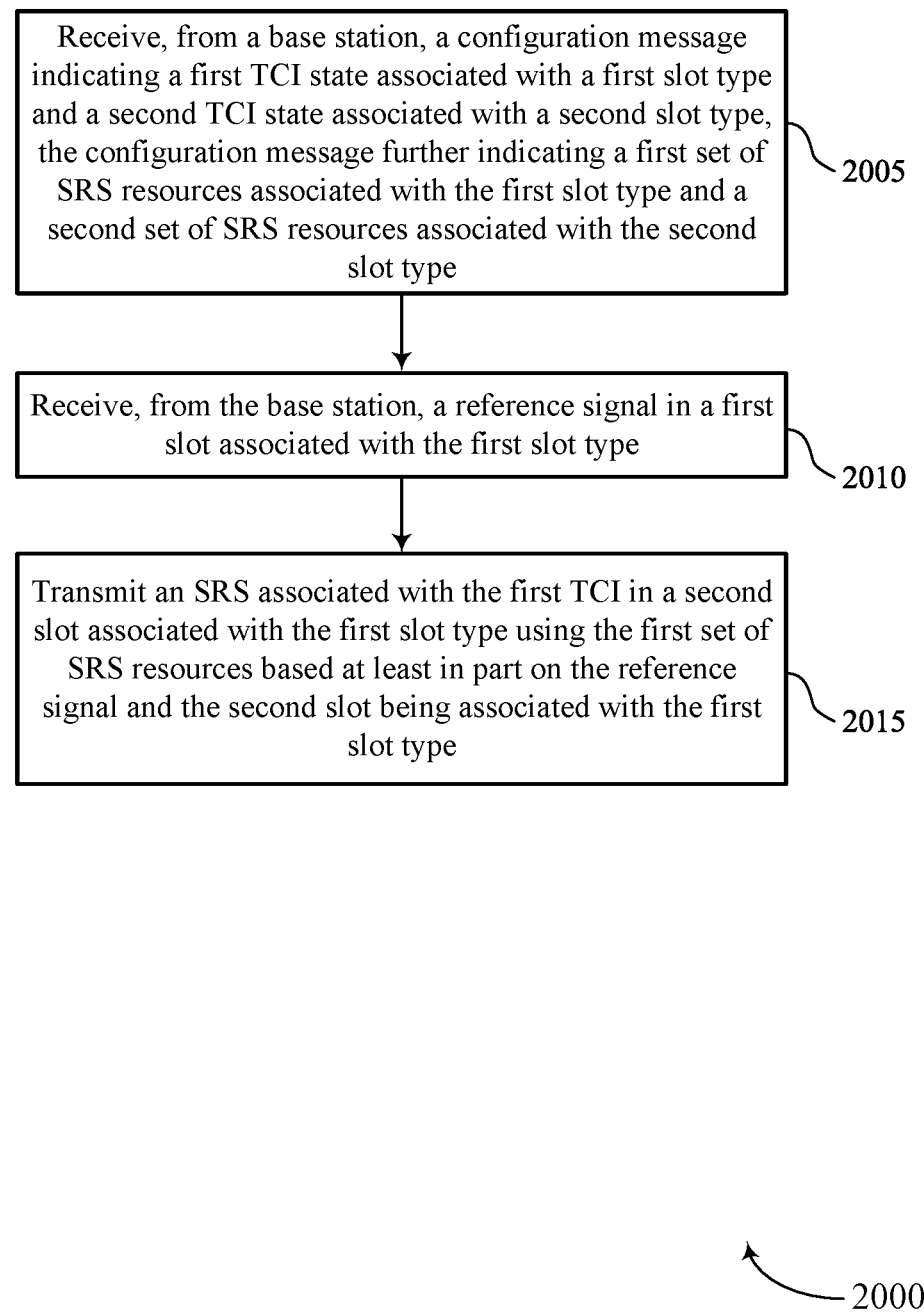

FIG. 20 shows a flowchart illustrating a method 2000 that supports techniques for communicating over asynchronous slots in accordance with aspects of the present disclosure. The operations of the method 2000 may be implemented by a UE or its components as described herein. For example, the operations of the method 2000 may be performed by a UE 115 as described with reference to FIGS. 1 through 5 and 10 through 13. In some examples, a UE may execute a set of instructions to control the functional elements of the UE to perform the described functions. Additionally or alternatively, the UE may perform aspects of the described functions using special-purpose hardware.

At 2005, the method may include receiving, from a base station, a configuration message indicating a first TCI state associated with a first slot type and a second TCI state associated with a second slot type, the configuration message further indicating a first set of SRS resources associated with the first slot type and a second set of SRS resources associated with the second slot type. The operations of 2005 may be performed in accordance with examples as disclosed herein. In some examples, aspects of the operations of 2005 may be performed by a configuration component 1225 as described with reference to FIG. 12.

At 2010, the method may include receiving, from the base station, a reference signal in a first slot associated with the first slot type. The operations of 2010 may be performed in accordance with examples as disclosed herein. In some examples, aspects of the operations of 2010 may be performed by a reference signal component 1230 as described with reference to FIG. 12.

At 2015, the method may include transmitting an SRS associated with the first TCI state in a second slot associated with the first slot type using the first set of SRS resources based on the reference signal and the second slot being associated with the first slot type. The operations of 2015 may be performed in accordance with examples as disclosed herein. In some examples, aspects of the operations of 2015 may be performed by an SRS component 1235 as described with reference to FIG. 12.

Figure 21:
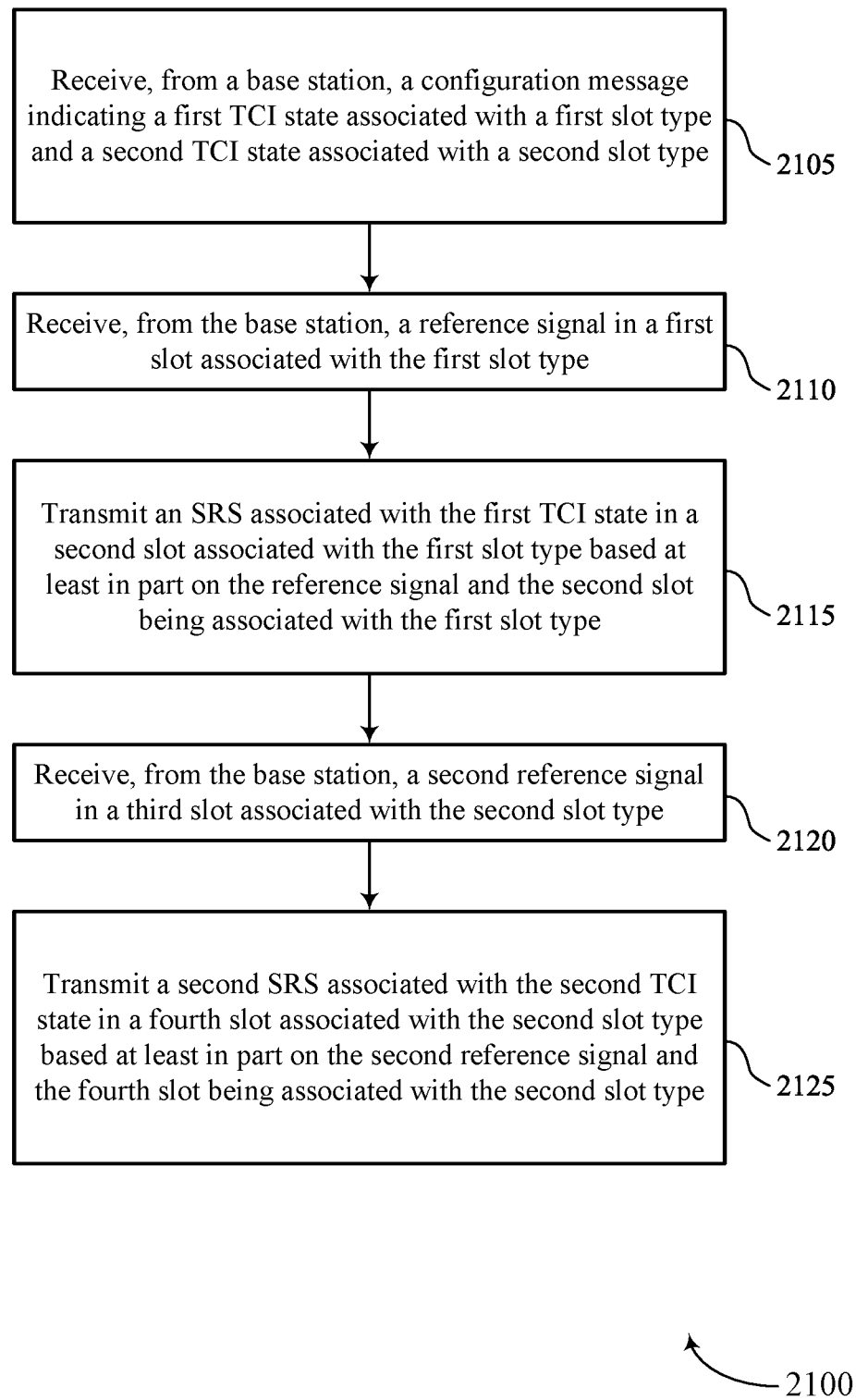

FIG. 21 shows a flowchart illustrating a method 2100 that supports techniques for communicating over asynchronous slots in accordance with aspects of the present disclosure. The operations of the method 2100 may be implemented by a UE or its components as described herein. For example, the operations of the method 2100 may be performed by a UE 115 as described with reference to FIGS. 1 through 5 and 10 through 13. In some examples, a UE may execute a set of instructions to control the functional elements of the UE to perform the described functions. Additionally or alternatively, the UE may perform aspects of the described functions using special-purpose hardware.

At 2105, the method may include receiving, from a base station, a configuration message indicating a first TCI state associated with a first slot type and a second TCI state associated with a second slot type. The operations of 2105 may be performed in accordance with examples as disclosed herein. In some examples, aspects of the operations of 2105 may be performed by a configuration component 1225 as described with reference to FIG. 12.

At 2110, the method may include receiving, from the base station, a reference signal in a first slot associated with the first slot type. The operations of 2110 may be performed in accordance with examples as disclosed herein. In some examples, aspects of the operations of 2110 may be performed by a reference signal component 1230 as described with reference to FIG. 12.

At 2115, the method may include transmitting an SRS associated with the first TCI state in a second slot associated with the first slot type based on the reference signal and the second slot being associated with the first slot type. The operations of 2115 may be performed in accordance with examples as disclosed herein. In some examples, aspects of the operations of 2115 may be performed by an SRS component 1235 as described with reference to FIG. 12.

At 2120, the method may include receiving, from the base station, a second reference signal in a third slot associated with the second slot type. The operations of 2120 may be performed in accordance with examples as disclosed herein. In some examples, aspects of the operations of 2120 may be performed by a reference signal component 1230 as described with reference to FIG. 12.

At 2125, the method may include transmitting a second SRS associated with the second TCI state in a fourth slot associated with the second slot type based on the second reference signal and the fourth slot being associated with the second slot type. The operations of 2125 may be performed in accordance with examples as disclosed herein. In some examples, aspects of the operations of 2125 may be performed by an SRS component 1235 as described with reference to FIG. 12.

Figure 22:
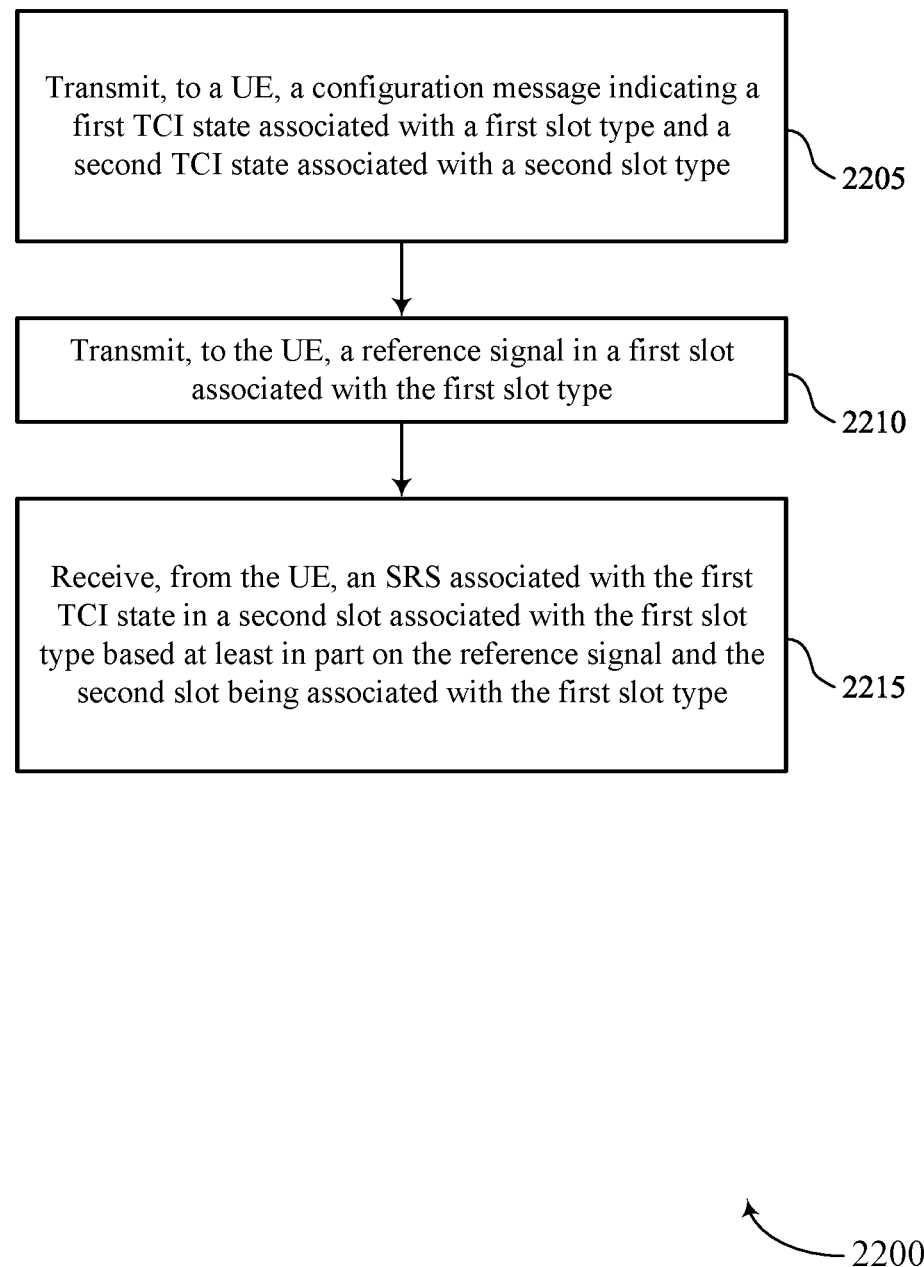

FIG. 22 shows a flowchart illustrating a method 2200 that supports techniques for communicating over asynchronous slots in accordance with aspects of the present disclosure. The operations of the method 2200 may be implemented by a base station or its components as described herein. For example, the operations of the method 2200 may be performed by a base station 105 as described with reference to FIGS. 1 through 9. In some examples, a base station may execute a set of instructions to control the functional elements of the base station to perform the described functions. Additionally or alternatively, the base station may perform aspects of the described functions using special-purpose hardware.

At 2205, the method may include transmitting, to a UE, a configuration message indicating a first TCI state associated with a first slot type and a second TCI state associated with a second slot type. The operations of 2205 may be performed in accordance with examples as disclosed herein. In some examples, aspects of the operations of 2205 may be performed by a configuration component 840 as described with reference to FIG. 8.

At 2210, the method may include transmitting, to the UE, a reference signal in a first slot associated with the first slot type. The operations of 2210 may be performed in accordance with examples as disclosed herein. In some examples, aspects of the operations of 2210 may be performed by a reference signal component 845 as described with reference to FIG. 8.

At 2215, the method may include receiving, from the UE, an SRS associated with the first TCI state in a second slot associated with the first slot type based on the reference signal and the second slot being associated with the first slot type. The operations of 2215 may be performed in accordance with examples as disclosed herein. In some examples, aspects of the operations of 2215 may be performed by an SRS component 850 as described with reference to FIG. 8.

Figure 23:
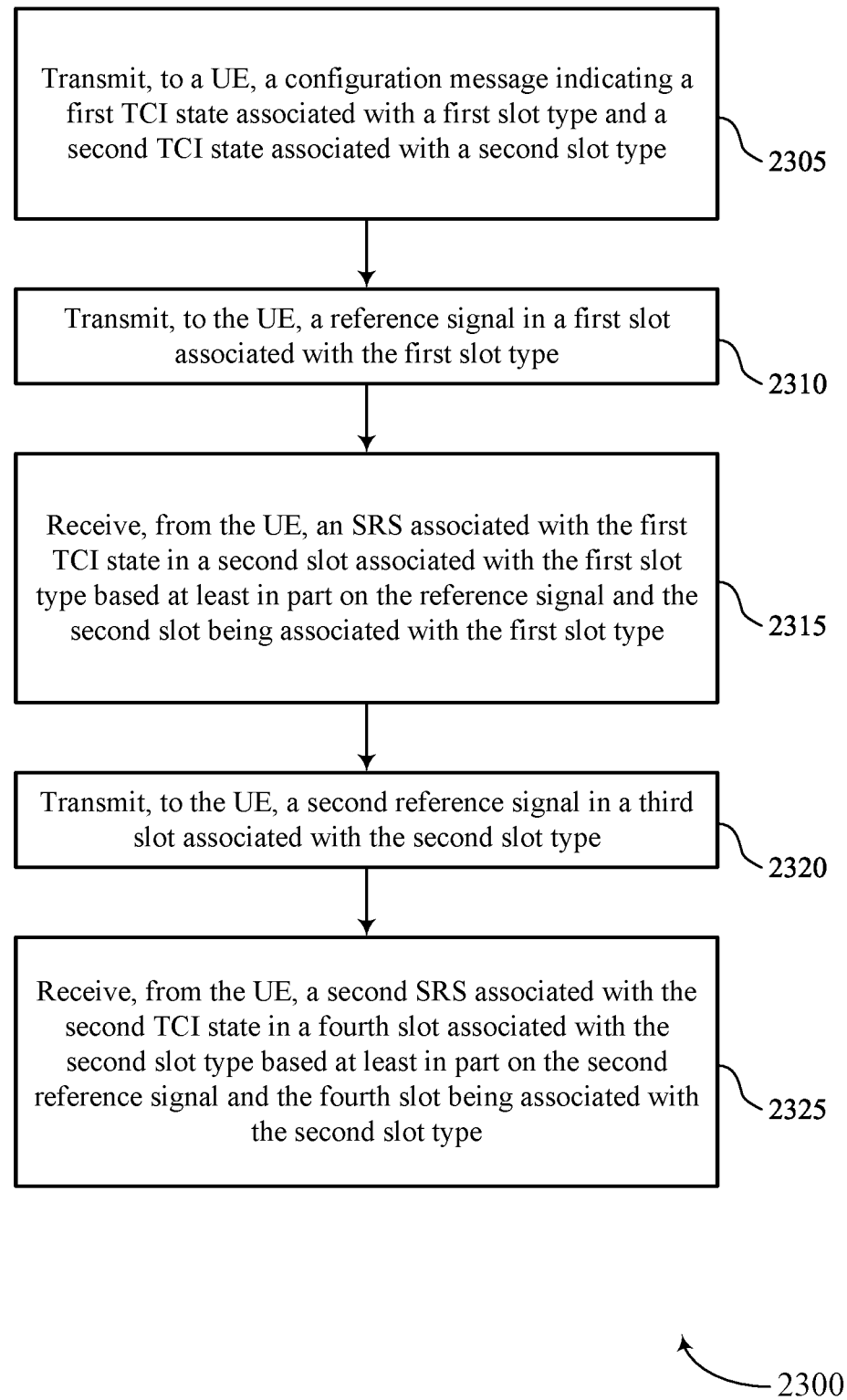

FIG. 23 shows a flowchart illustrating a method 2300 that supports techniques for communicating over asynchronous slots in accordance with aspects of the present disclosure. The operations of the method 2300 may be implemented by a base station or its components as described herein. For example, the operations of the method 2300 may be performed by a base station 105 as described with reference to FIGS. 1 through 9. In some examples, a base station may execute a set of instructions to control the functional elements of the base station to perform the described functions. Additionally or alternatively, the base station may perform aspects of the described functions using special-purpose hardware.

At 2305, the method may include transmitting, to a UE, a configuration message indicating a first TCI state associated with a first slot type and a second TCI state associated with a second slot type. The operations of 2305 may be performed in accordance with examples as disclosed herein. In some examples, aspects of the operations of 2305 may be performed by a configuration component 840 as described with reference to FIG. 8.

At 2310, the method may include transmitting, to the UE, a reference signal in a first slot associated with the first slot type. The operations of 2310 may be performed in accordance with examples as disclosed herein. In some examples, aspects of the operations of 2310 may be performed by a reference signal component 845 as described with reference to FIG. 8.

At 2315, the method may include receiving, from the UE, an SRS associated with the first TCI state in a second slot associated with the first slot type based on the reference signal and the second slot being associated with the first slot type. The operations of 2315 may be performed in accordance with examples as disclosed herein. In some examples, aspects of the operations of 2315 may be performed by an SRS component 850 as described with reference to FIG. 8.

At 2320, the method may include transmitting, to the UE, a second reference signal in a third slot associated with the second slot type. The operations of 2320 may be performed in accordance with examples as disclosed herein. In some examples, aspects of the operations of 2320 may be performed by a reference signal component 845 as described with reference to FIG. 8.

At 2325, the method may include receiving, from the UE, a second SRS associated with the second TCI state in a fourth slot associated with the second slot type based on the second reference signal and the fourth slot being associated with the second slot type. The operations of 2325 may be performed in accordance with examples as disclosed herein. In some examples, aspects of the operations of 2325 may be performed by an SRS component 850 as described with reference to FIG. 8.

The following provides an overview of aspects of the present disclosure:

Aspect 1: A method for wireless communication at a first base station, comprising: determining a change to a slot type of a slot of a slot pattern configuration associated with the first base station and a second base station, wherein a first beam at the first base station is set to interfere with a second beam at the second base station during the slot based at least in part on the change to the slot type of the slot; performing, based at least in part on determining the change to the slot type of the slot, a handshake procedure with the second base station to determine a set of communication parameters for communicating during the slot in accordance with the changed slot type; and communicating one or more messages during the slot in accordance with the set of communication parameters based at least in part on the handshake procedure, the slot comprising an asynchronous slot.

Aspect 2: The method of aspect 1, further comprising: transmitting, to the second base station, a message indicating the change to the slot type of the slot, wherein performing the handshake procedure is based at least in part on transmitting the message.

Aspect 3: The method of aspect 2, further comprising: determining that an interference between a first set of beams at the first base station and a second set of beams at the second base station satisfies a threshold interference, the first set of beams comprising the first beam and the second set of beams comprising the second beam, wherein the message further indicates spatial information for at least some of the second set of beams.

Aspect 4: The method of aspect 3, wherein the message comprises a set of beam identifiers each corresponding to a beam of the second set of beams.

Aspect 5: The method of any of aspects 2 through 4, wherein the message comprises a RIM reference signal.

Aspect 6: The method of any of aspects 1 through 5, wherein the change to the slot type of the slot comprises a change from a synchronous slot of the slot pattern configuration to the asynchronous slot.

Aspect 7: The method of any of aspects 1 through 6, further comprising: changing a slot type of one or more slots of the slot pattern configuration to a full-duplex mode; and receiving, from the second base station, one or more SSB messages during the one or more slots based at least in part on changing the slot type of the one or more slots to the full-duplex mode, wherein performing the handshake procedure comprises: selecting, based at least in part on the one or more SSB messages, one or more beam pairs associated with the first base station and the second base station for communicating during the slot.

Aspect 8: The method of aspect 7, wherein receiving the one or more SSB messages comprises: receiving the one or more SSB messages using a set of beams at the first base station comprising the first beam, wherein one or more receive beams of the selected one or more beam pairs correspond to one or more beams of the set of beams.

Aspect 9: The method of any of aspects 1 through 8, wherein the set of communication parameters comprises a restriction associated with using one or more beam pairs during the slot, a transmission power of the second beam during the slot, a restriction associated with scheduling one or more uplink messages during the slot, a restriction associated with using one or more combining matrices during the slot, or an indication to change the slot type of the slot back to an original slot type of the slot, or any combination thereof.

Aspect 10: The method of any of aspects 1 through 9, further comprising: adjusting a coverage zone associated with the first beam during the slot based at least in part on the handshake procedure and an interference between the first beam and the second beam satisfying a threshold interference.

Aspect 11: The method of any of aspects 1 through 10, wherein performing the handshake procedure with the second base station comprises: initiating the handshake procedure in accordance with a periodicity associated with the handshake procedure to determine one or more beam pairs associated with the first base station and the second base station for communicating during asynchronous slots of the slot pattern configuration.

Aspect 12: The method of any of aspects 1 through 11, wherein the handshake procedure is performed over a backhaul link between the first base station and the second base station.

Aspect 13: A method for wireless communication at a first base station, comprising: receiving, from a second base station, a message indicating a change at the second base station to a slot type of a slot of a slot pattern configuration associated with the first base station and the second base station, wherein a first beam at the first base station is set to interfere with a second beam at the second base station during the slot based at least in part on the change to the slot type of the slot; performing, based at least in part on receiving the message indicating the change to the slot type of the slot, a handshake procedure with the second base station to determine a set of communication parameters for communicating during the slot in accordance with the changed slot type; and communicating one or more messages during the slot in accordance with the set of communication parameters based at least in part on the handshake procedure, the slot comprising an asynchronous slot.

Aspect 14: The method of aspect 13, wherein transmitting, using a set of beams at the first base station comprising the first beam, one or more SSB messages during one or more slots, wherein performing the handshake procedure comprises: selecting, based at least in part on the one or more SSB messages, one or more beam pairs associated with the first base station and the second base station for communicating during the slot.

Aspect 15: The method of any of aspects 13 through 14, wherein the message further indicates a first set of beams at the first base station comprising the first beam based at least in part on an interference between the first set of beams and a second set of beams at the second base station satisfying a threshold interference, the second set of beams comprising the second beam.

Aspect 16: The method of aspect 15, wherein the message comprises a set of beam identifiers each corresponding to a beam of the first set of beams.

Aspect 17: The method of any of aspects 13 through 16, wherein the set of communication parameters comprises a restriction associated with using one or more beam pairs during the slot, a transmission power of the first beam during the slot, a restriction associated with scheduling one or more downlink messages during the slot, a restriction associated with using one or more precoding matrices during the slot, or an indication to change the slot type of the slot back to an original slot type of the slot, or any combination thereof.

Aspect 18: The method of any of aspects 13 through 17, further comprising: adjusting a coverage zone associated with the first beam during the slot based at least in part on the handshake procedure and an interference between the first beam and the second beam satisfying a threshold interference.

Aspect 19: The method of any of aspects 13 through 18, wherein the message comprises a RIM signal.

Aspect 20: A method for wireless communication at a UE, comprising: receiving, from a base station, a configuration message indicating a first TCI state associated with a first slot type and a second TCI state associated with a second slot type; receiving, from the base station, a reference signal in a first slot associated with the first slot type; and transmitting an SRS associated with the first TCI state in a second slot associated with the first slot type based at least in part on the reference signal and the second slot being associated with the first slot type.

Aspect 21: The method of aspect 20, further comprising: the configuration message further indicates a first set of SRS resources associated with the first slot type and a second set of SRS resources associated with the second slot type; and transmitting the SRS comprises transmitting the SRS using the first set of SRS resources based at least in part on the second slot being associated with the first slot type.

Aspect 22: The method of aspect 21, further comprising: dropping the second set of SRS resources based at least in part on the second slot being associated with the first slot type.

Aspect 23: The method of any of aspects 21 through 22, wherein the first set of SRS resources overlaps with the second set of SRS resources in a time domain.

Aspect 24: The method of any of aspects 20 through 23, further comprising: receiving, from the base station, a second reference signal in a third slot associated with the second slot type; and transmitting a second SRS associated with the second TCI state in a fourth slot associated with the second slot type based at least in part on the second reference signal and the fourth slot being associated with the second slot type.

Aspect 25: The method of aspect 24, wherein transmitting the second SRS comprises: transmitting the second SRS in the fourth slot using a first resource associated with a same time-frequency location within a slot as a second resource used to transmit the SRS in the second slot.

Aspect 26: The method of any of aspects 20 through 25, further comprising: receiving, from the base station, a control message indicating that the first slot is associated with the first slot type and the second slot is associated with the second slot type.

Aspect 27: The method of any of aspects 20 through 26, further comprising: selecting, based at least in part on the second slot being associated with the first slot type, the reference signal from a set of reference signals received from the base station to determine the first TCI state.

Aspect 28: The method of any of aspects 20 through 27, wherein the first slot type corresponds to a synchronous slot of a TDD slot pattern configuration and the second slot type corresponds to an asynchronous slot of the TDD slot pattern configuration.

Aspect 29: The method of any of aspects 20 through 28, wherein the first slot type corresponds to an asynchronous slot of a TDD slot pattern configuration and the second slot type corresponds to a synchronous slot of the TDD slot pattern configuration.

Aspect 30: A method for wireless communication at a base station, comprising: transmitting, to a UE, a configuration message indicating a first TCI state associated with a first slot type and a second TCI state associated with a second slot type; transmitting, to the UE, a reference signal in a first slot associated with the first slot type; and receiving, from the UE, an SRS associated with the first TCI state in a second slot associated with the first slot type based at least in part on the reference signal and the second slot being associated with the first slot type.

Aspect 31: The method of aspect 30, further comprising: the configuration message further indicates a first set of SRS resources associated with the first slot type and a second set of SRS resources associated with the second slot type; and receiving the SRS comprises receiving the SRS using the first set of SRS resources based at least in part on the second slot being associated with the first slot type.

Aspect 32: The method of any of aspects 30 through 31, further comprising: transmitting, to the UE, a second reference signal in a third slot associated with the second slot type; and receiving, from the UE, a second SRS associated with the second TCI state in a fourth slot associated with the second slot type based at least in part on the second reference signal and the fourth slot being associated with the second slot type.

Aspect 33: An apparatus for wireless communication at a first base station, comprising a processor; memory coupled with the processor; and instructions stored in the memory and executable by the processor to cause the apparatus to perform a method of any of aspects 1 through 12.

Aspect 34: An apparatus for wireless communication at a first base station, comprising at least one means for performing a method of any of aspects 1 through 12.

Aspect 35: A non-transitory computer-readable medium storing code for wireless communication at a first base station, the code comprising instructions executable by a processor to perform a method of any of aspects 1 through 12.

Aspect 36: An apparatus for wireless communication at a first base station, comprising a processor; memory coupled with the processor; and instructions stored in the memory and executable by the processor to cause the apparatus to perform a method of any of aspects 13 through 19.

Aspect 37: An apparatus for wireless communication at a first base station, comprising at least one means for performing a method of any of aspects 13 through 19.

Aspect 38: A non-transitory computer-readable medium storing code for wireless communication at a first base station, the code comprising instructions executable by a processor to perform a method of any of aspects 13 through 19.

Aspect 39: An apparatus for wireless communication at a UE, comprising a processor; memory coupled with the processor; and instructions stored in the memory and executable by the processor to cause the apparatus to perform a method of any of aspects 20 through 29.

Aspect 40: An apparatus for wireless communication at a UE, comprising at least one means for performing a method of any of aspects 20 through 29.

Aspect 41: A non-transitory computer-readable medium storing code for wireless communication at a UE, the code comprising instructions executable by a processor to perform a method of any of aspects 20 through 29.

Aspect 42: An apparatus for wireless communication at a base station, comprising a processor; memory coupled with the processor; and instructions stored in the memory and executable by the processor to cause the apparatus to perform a method of any of aspects 30 through 32.

Aspect 43: An apparatus for wireless communication at a base station, comprising at least one means for performing a method of any of aspects 30 through 32.

Aspect 44: A non-transitory computer-readable medium storing code for wireless communication at a base station, the code comprising instructions executable by a processor to perform a method of any of aspects 30 through 32.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A first network node for wireless communication, comprising:
    a memory; and
    at least one processor coupled to the memory, wherein the at least one processor is configured to:
        determine a change to a slot type of a slot of a slot pattern configuration associated with the first network node and a second network node, wherein a first beam at the first network node is set to interfere with a second beam at the second network node during the slot based at least in part on the change to the slot type of the slot;
        perform, based at least in part on the determination of the change to the slot type of the slot, a handshake procedure with the second network node to determine a set of communication parameters for communication during the slot in accordance with the changed slot type; and
        communicate one or more messages during the slot in accordance with the set of communication parameters based at least in part on the handshake procedure, wherein the slot comprises an asynchronous slot.

2. The first network node of claim 1, wherein the at least one processor is configured to:
    transmit, to the second network node, a message that indicates the change to the slot type of the slot, wherein performance of the handshake procedure is based at least in part on the transmission of the message.

3. The first network node of claim 2, wherein the at least one processor is configured to:
    determine that an interference between a first set of beams at the first network node and a second set of beams at the second network node satisfies a threshold interference, wherein the first set of beams comprises the first beam and the second set of beams comprises the second beam,
    wherein the message further indicates spatial information for at least some of the second set of beams.

4. The first network node of claim 3, wherein the message comprises a set of beam identifiers that each correspond to a beam of the second set of beams.

5. The first network node of claim 2, wherein the message comprises a remote interference management reference signal.

6. The first network node of claim 1, wherein the change to the slot type of the slot comprises a change from a synchronous slot of the slot pattern configuration to the asynchronous slot.

7. The first network node of claim 1, wherein the at least one processor is configured to:
    change a slot type of one or more slots of the slot pattern configuration to a full-duplex mode; and
    receive, from the second network node, one or more synchronization signal block messages during the one or more slots based at least in part on the change of the slot type of the one or more slots to the full-duplex mode, wherein to perform the handshake procedure, the at least one processor is configured to:
        select, based at least in part on the one or more synchronization signal block messages, one or more beam pairs associated with the first network node and the second network node for communication during the slot.

8. The first network node of claim 7, wherein, to receive the one or more synchronization signal block messages, the at least one processor is configured to:
    receive the one or more synchronization signal block messages using a set of beams at the first network node that comprises the first beam, wherein one or more receive beams of the selected one or more beam pairs correspond to one or more beams of the set of beams.

9. The first network node of claim 1, wherein the set of communication parameters comprises a restriction associated with using one or more beam pairs during the slot, a transmission power of the second beam during the slot, a restriction associated with scheduling one or more uplink messages during the slot, a restriction associated with using one or more combining matrices during the slot, or an indication to change the slot type of the slot back to an original slot type of the slot, or any combination thereof.

10. The first network node of claim 1, wherein the at least one processor is configured to:
    adjust a coverage zone associated with the first beam during the slot based at least in part on the handshake procedure and a satisfaction of a threshold interference by an interference between the first beam and the second beam.

11. The first network node of claim 1, wherein, to perform the handshake procedure with the second network node, the at least one processor is configured to:
  initiate the handshake procedure in accordance with a periodicity associated with the handshake procedure to determine one or more beam pairs associated with the first network node and the second network node for communication during asynchronous slots of the slot pattern configuration.

12. The first network node of claim 1, wherein the handshake procedure is performed over a backhaul link between the first network node and the second network node.

13. A first network node for wireless communication, comprising:
  a memory; and
  at least one processor coupled to the memory, wherein the at least one processor is configured to:
    receive, from a second network node, a message that indicates a change at the second network node to a slot type of a slot of a slot pattern configuration associated with the first network node and the second network node, wherein a first beam at the first network node is set to interfere with a second beam at the second network node during the slot based at least in part on the change to the slot type of the slot;
    perform, based at least in part on the reception of the message that indicates the change to the slot type of the slot, a handshake procedure with the second network node to determine a set of communication parameters for communication during the slot in accordance with the changed slot type; and
    communicate one or more messages during the slot in accordance with the set of communication parameters based at least in part on the handshake procedure, wherein the slot comprises an asynchronous slot.

14. The first network node of claim 13, further comprising:
  transmit, using a set of beams at the first network node that comprises the first beam, one or more synchronization signal block messages during one or more slots, wherein, to perform the handshake procedure, the at least one processor is configured to:
  select, based at least in part on the one or more synchronization signal block messages, one or more beam pairs associated with the first network node and the second network node for communication during the slot.

15. The first network node of claim 13, wherein the message further indicates a first set of beams at the first network node that comprises the first beam based at least in part on an interference between the first set of beams and a second set of beams at the second network node that satisfies a threshold interference, wherein the second set of beams comprises the second beam.

16. The first network node of claim 13, wherein the set of communication parameters comprises a restriction associated with using one or more beam pairs during the slot, a transmission power of the first beam during the slot, a restriction associated with scheduling one or more downlink messages during the slot, a restriction associated with using one or more precoding matrices during the slot, or an indication to change the slot type of the slot back to an original slot type of the slot, or any combination thereof.

17. The first network node of claim 13, wherein the at least one processor is configured to:
  adjust a coverage zone associated with the first beam during the slot based at least in part on the handshake procedure and a satisfaction of a threshold interference by an interference between the first beam and the second.

18. The first network node of claim 13, wherein the message comprises a remote interference management reference signal.

19. A method of wireless communication performed by a first network node, comprising:
  determining a change to a slot type of a slot of a slot pattern configuration associated with the first network node and a second network node, wherein a first beam at the first network node is set to interfere with a second beam at the second network node during the slot based at least in part on the change to the slot type of the slot;
  performing, based at least in part on determining the change to the slot type of the slot, a handshake procedure with the second network node to determine a set of communication parameters for communicating during the slot in accordance with the changed slot type; and
  communicating one or more messages during the slot in accordance with the set of communication parameters based at least in part on the handshake procedure, the slot comprising an asynchronous slot.

20. The method of claim 19, further comprising:
  transmitting, to the second network node, a message indicating the change to the slot type of the slot, wherein performing the handshake procedure is based at least in part on transmitting the message.

21. The method of claim 20, further comprising:
  determining that an interference between a first set of beams at the first network node and a second set of beams at the second network node satisfies a threshold interference, the first set of beams comprising the first beam and the second set of beams comprising the second beam,
  wherein the message further indicates spatial information for at least some of the second set of beams.

22. The method of claim 21, wherein the message comprises a set of beam identifiers each corresponding to a beam of the second set of beams.

23. The method of claim 20, wherein the message comprises a remote interference management reference signal.

24. The method of claim 19, wherein the change to the slot type of the slot comprises a change from a synchronous slot of the slot pattern configuration to the asynchronous slot.

25. The method of claim 19, further comprising:
  changing a slot type of one or more slots of the slot pattern configuration to a full-duplex mode; and
  receiving, from the second network node, one or more synchronization signal block messages during the one or more slots based at least in part on changing the slot type of the one or more slots to the full-duplex mode, wherein performing the handshake procedure comprises:
    selecting, based at least in part on the one or more synchronization signal block messages, one or more beam pairs associated with the first network node and the second network node for communicating during the slot.

26. The method of claim 25, wherein receiving the one or more synchronization signal block messages comprises:
  receiving the one or more synchronization signal block messages using a set of beams at the first network node comprising the first beam, wherein one or more receive beams of the selected one or more beam pairs correspond to one or more beams of the set of beams.

27. A method of wireless communication performed by a first network node, comprising:
- receiving, from a second network node, a message indicating a change at the second network node to a slot type of a slot of a slot pattern configuration associated with the first network node and the second network node, wherein a first beam at the first network node is set to interfere with a second beam at the second network node during the slot based at least in part on the change to the slot type of the slot;
- performing, based at least in part on receiving the message indicating the change to the slot type of the slot, a handshake procedure with the second network node to determine a set of communication parameters for communicating during the slot in accordance with the changed slot type; and
- communicating one or more messages during the slot in accordance with the set of communication parameters based at least in part on the handshake procedure, the slot comprising an asynchronous slot.

28. The method of claim 27, further comprising:
- transmitting, using a set of beams at the first network node comprising the first beam, one or more synchronization signal block messages during one or more slots, wherein performing the handshake procedure comprises:
  - selecting, based at least in part on the one or more synchronization signal block messages, one or more beam pairs associated with the first network node and the second network node for communicating during the slot.

29. The method of claim 27, wherein the message further indicates a first set of beams at the first network node comprising the first beam based at least in part on an interference between the first set of beams and a second set of beams at the second network node satisfying a threshold interference, the second set of beams comprising the second beam.

30. The method of claim 27, wherein the set of communication parameters comprises a restriction associated with using one or more beam pairs during the slot, a transmission power of the first beam during the slot, a restriction associated with scheduling one or more downlink messages during the slot, a restriction associated with using one or more precoding matrices during the slot, or an indication to change the slot type of the slot back to an original slot type of the slot, or any combination thereof.

* * * * *